United States Patent
Ishii et al.

(10) Patent No.: US 8,154,474 B2
(45) Date of Patent: Apr. 10, 2012

(54) DRIVING METHOD OF MEMORY ACCESS

(75) Inventors: Fusao Ishii, Menlo Park, CA (US); Naoya Sugimoto, Tokyo (JP); Yoshihiro Maeda, Tokyo (JP)

(73) Assignees: Silicon Quest Kabushiki Kaisha (JP); Olympus Corporation (JP)

( * ) Notice: Subject to any disclaimer, the term of this patent is extended or adjusted under 35 U.S.C. 154(b) by 536 days.

(21) Appl. No.: 12/383,621

(22) Filed: Mar. 25, 2009

(65) Prior Publication Data

US 2009/0219279 A1   Sep. 3, 2009

Related U.S. Application Data

(63) Continuation-in-part of application No. 12/005,501, filed on Dec. 26, 2007, now Pat. No. 7,982,690, which is a continuation-in-part of application No. 11/121,543, filed on May 4, 2005, now Pat. No. 7,268,932, and a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/072,015, filed on Mar. 26, 2008.

(51) Int. Cl.
G09G 3/00 (2006.01)

(52) U.S. Cl. ........................................... 345/32; 345/84

(58) Field of Classification Search .................. 345/32, 345/55, 84, 87–89, 98–100, 103, 690
See application file for complete search history.

(56) References Cited

U.S. PATENT DOCUMENTS

| | | |
|---|---|---|
| 4,229,732 A | 10/1980 | Hartstein et al. |
| 4,571,603 A | 2/1986 | Hornbeck et al. |
| 4,969,730 A | 11/1990 | van den Brandt |
| 5,061,049 A | 10/1991 | Hornbeck |
| 5,214,420 A | 5/1993 | Thompson et al. |
| 5,285,407 A | 2/1994 | Gale et al. |
| 5,293,511 A | 3/1994 | Poradish et al. |
| 5,452,024 A | 9/1995 | Sampsell |
| 5,612,713 A | 3/1997 | Bhuva et al. |
| 5,673,139 A | 9/1997 | Johnson |
| 5,686,939 A | 11/1997 | Millward et al. |
| 5,903,383 A | 5/1999 | Bernstein et al. |
| 6,128,121 A | 10/2000 | Choi et al. |
| 6,388,661 B1 | 5/2002 | Richards |
| 6,538,800 B2 | 3/2003 | Huibers |
| 6,552,840 B2 | 4/2003 | Knipe |
| 6,809,977 B1 | 10/2004 | Richards |
| 6,856,447 B2 | 2/2005 | Richards et al. |
| 6,888,521 B1 | 5/2005 | Richards |
| 7,012,592 B2 | 3/2006 | Richards |
| 7,022,249 B2 | 4/2006 | Valette |
| 7,027,205 B2 | 4/2006 | Richards |
| 2003/0011863 A1 | 1/2003 | Muller |
| 2006/0279496 A1 | 12/2006 | Ogikubo et al. |
| 2007/0041078 A1 | 2/2007 | Pan |
| 2007/0126759 A1 | 6/2007 | Hwang |
| 2007/0258124 A1 | 11/2007 | Chen et al. |
| 2007/0258130 A1 | 11/2007 | Chen et al. |

*Primary Examiner* — Ricardo L Osorio

(74) *Attorney, Agent, or Firm* — Bo-In Lin

(57) ABSTRACT

The present invention provides a spatial light modulator, comprising: a plurality of pixel elements wherein each of the pixel elements comprises at least a switching element; a plurality of control lines connected to at least one of the switching elements; and a controller for generating and transmitting a control signal through the control line for controlling the switching element, wherein the controller starts transmitting the control signal to a first switching element through a first control line before the control signal applied to a second switching element through a second control line is turned off at a low voltage level.

20 Claims, 61 Drawing Sheets

| COMBINA-TION NO. | PIXEL PITCH | TRANSISTOR | CAPACITOR |
|---|---|---|---|
| G1 | 8 μm | WITHSTAND. VOLTAGE 12V; 2 PCS. | ALUMINUM CAPACITOR; 2 PCS. |
| G2 | 8 μm | WITHSTAND. VOLTAGE 12V; 1PC. | POLY-CAPACITOR 1 PC. |
| G3 | 8 μm | WITHSTAND. VOLTAGE 24V; 1 PC. | ALUMINUM CAPACITOR 1 PC. |
| G4 | 6 μm | WITHSTAND. VOLTAGE 6V; 2 PCS. | ALUMINUM CAPACITOR; 2 PCS. |
| G5 | 6 μm | WITHSTAND. VOLTAGE 6V; 1 PC. | POLY-CAPACITOR 1 PC. |
| G6 | 6 μm | WITHSTAND. VOLTAGE 12V; 1 PC. | ALUMINUM CAPACITOR 1 PC. |

Fig. 5A

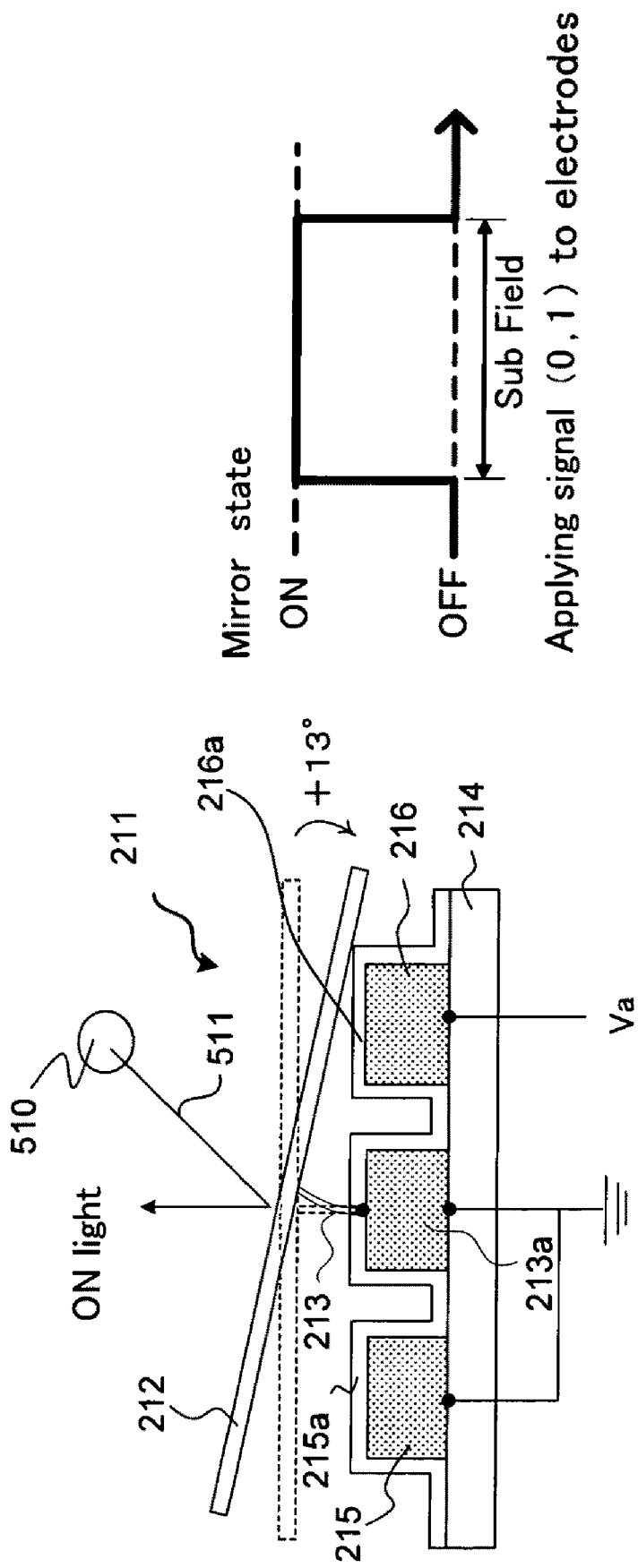

| FRAME SEQUENCE COLOR SEQUENTIAL | | LENGTH OF ONE timeslot (ts) | | | GRAY SCALE |
| --- | --- | --- | --- | --- | --- |
| | | 8bit | 10bit | 12bit | |
| ONE FRAME | 60Hz 16.66667 mesc | 255 | 1024 | 4095 | |
| SUBFIELD (ONE COLOR PERIOD) (SHORTEST) | 30% 5.00 mesc | 19.61 | 4.88 | 1.22 | μ sec |
| SUBFIELD (ONE COLOR PERIOD) (LONGEST) | 60% 10.00 mesc | 39.22 | 9.77 | 2.44 | μ sec |

Fig. 35

DRIVING METHOD OF MEMORY ACCESS

CROSS REFERENCE TO RELATED APPLICATIONS

This application is a Non-Provisional Application of a Provisional Application 61/072,015 filed on Mar. 26, 2008 and a Continuation in Part application of another patent application Ser. No. 12/005,501 filed on Dec. 26, 2007 now U.S. Pat. No. 7,982,690. The application Ser. No. 12/005,501 is a Continuation in Part (CIP) Application of a U.S. patent application Ser. No. 11/121,543 filed on May 4, 2005, now issued into U.S. Pat. No. 7,268,932. The application Ser. No. 12/005, 501 is further a Continuation in Part (CIP) Application of three previously filed Applications. These three Applications are Ser. No. 10/698,620 filed on Nov. 1, 2003 now abandoned; Ser. No. 10/699,140 filed on Nov. 1, 2003 and issued into U.S. Pat. No. 6,862,127; and Ser. No. 10/699,143 filed on Nov. 1, 2003 and issued into U.S. Pat. No. 6,903,860 by one of the Applicant of this Patent Applications. The disclosures made in these Patent Applications are hereby incorporated by reference in this Patent Application.

BACKGROUND OF THE INVENTION

1. Field of the Invention

The present invention relates generally to an image projection system implemented with a spatial light modulator. More particularly, this invention related to control line connection configuration and signal generation and transmission control processes to the pixel elements in a spatial light modulator to achieve higher quality of image display.

2. Description of the Related Art

After the dominance of CRT technology in the display industry for over 100 years, Flat Panel Display (FPD) and Projection Display have gained popularity because of their space efficiency and larger screen size. Projection displays using micro-display technology are gaining popularity among consumers because of their high picture quality and lower cost. There are two types of micro-displays used for projection displays in the market. One is micro-LCD (Liquid Crystal Display) and the other is micro-mirror technology. Because a micro-mirror device uses un-polarized light, it produces better brightness than micro-LCD, which uses polarized light.

Although significant advances have been made in technologies of implementing electromechanical micro-mirror devices as spatial light modulators, there are still limitations in their high quality images display. Specifically, when display images are digitally controlled, image quality is adversely due to an insufficient number of gray scales.

Electromechanical micro-mirror devices have drawn considerable interest because of their application as spatial light modulators (SLMs). A spatial light modulator requires an array of a relatively large number of micro-mirror devices. In general, the number of required devices ranges from 60,000 to several million for each SLM. Referring to FIG. 1A, an image display system 1 including a screen 2 is disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme, as that implemented in the U.S. Pat. No. 5,214,420 and in most conventional display systems, impose a limitation on the quality of the display. Specifically, applying the conventional configuration of a control circuit limits the gray scale gradations produced in a conventional system (PWM between ON and OFF states), limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of the gray scale lead to a degradation of the display image Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states that include a state 1 when is Node A high and Node B low, and a state 2 when Node A is low and Node B is high.

The control circuit positions the micro-mirrors to be at either an ON or an OFF angular orientation, as that shown in FIG. 1A. The brightness, i.e., the number of gray scales of display for a digitally control image system, is determined by the length of time the micro-mirror stays at an ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

More specifically, as described in FIG. 1C above, a plurality of FETs, such as the transistor M9 are connected to the word line for driving each pixel. Due to the parasitic capacitance of the gate terminal of each FET and the parasitic capacitance and resistance of the word line that has an extended length and all these factors cause a delay for transmitting the ON pulse signal to the gate. Furthermore, the ON pulse signal transmitted through the word line has a distorted and flattened waveform. The delay of the signal transmission and the distorted waveforms limit the speed and the control accuracy in sequentially driving ROW lines.

Accordingly, U.S. Pat. No. 5,745,193 has disclosed a configuration that tries to improve the operation speed by means of a high speed drive of word lines by equipping each word line with two word line decoders and two bit-line decoders to drive the word line divided into two parts. However, this configuration is faced with the technical problem of an increased scale of the control circuit used for controlling a spatial light modulator because the number of the word line decoders and that of the bit line decoders are doubled.

SUMMARY OF THE INVENTION

One aspect of the present invention is to provide a signal line connections and control process to increase the signal access and switching speed for attaining a higher level of gray scale of a display image without increasing the scale of a control circuit used for controlling a spatial light modulator in a technique for displaying an image employing the spatial light modulation control processes.

A first exemplary embodiment of the present invention provides a spatial light modulator, comprising: a plurality of pixel elements wherein each of the pixel elements comprises at least a switching element; a plurality of control lines connected to at least one of the switching elements; and a controller for generating and transmitting a control signal through the control line for controlling the switching element, wherein the controller starts transmitting the control signal to a first switching element through a first control line before the control signal applied to a second switching element through a second control line is turned off at a low voltage level.

A second exemplary embodiment of the present invention provides the spatial light modulator according to the first exemplary embodiment, wherein the controller controls the low voltage level substantially at a threshold voltage for operating the switching element.

A third exemplary embodiment of the present invention provides the spatial light modulator according to the first exemplary embodiment, wherein the controller generates the output signals for transmitting therefrom with an interval less than or equal to 20 nanoseconds.

A fourth exemplary embodiment of the present invention provides the spatial light modulator according to the first exemplary embodiment, further comprising a timing adjuster for adjusting an interval of the control signals output from the controller to the control line in order to control the switching element of the pixel elements.

A fifth exemplary embodiment of the present invention provides the spatial light modulator according to the fourth exemplary embodiment, further comprising a detector for detecting a result of adjustment amount of the switching elements; and the timing adjuster further receives and applies the result of adjustment amount from the detector to automatically adjust the interval of the control signals.

A sixth exemplary embodiment of the present invention provides the spatial light modulator according to the fourth exemplary embodiment, wherein the timing adjuster further receives and applies a signal representing a temperature of the spatial light modulator to adjust the interval of the control signals.

A seventh exemplary embodiment of the present invention provides the spatial light modulator according to the fourth exemplary embodiment, wherein the timing adjuster further receives and applies a signal representing a number of gray scale levels of the spatial light modulator to adjust the interval of the control signals.

An eighth exemplary embodiment of the present invention provides the spatial light modulator according to the fourth exemplary embodiment, further comprising a second control line for transmitting control signals to control the pixel element independently from the control signals transmitted on the plurality of control lines, and a second unit of the controller for generating and transmitting a second control signal to the second control line, wherein the timing adjuster further adjusts the interval of the second control transmitted from the second unit of the controller.

A ninth exemplary embodiment of the present invention provides the spatial light modulator according to the fourth exemplary embodiment, further comprising a data setup circuit for setting data to the pixel element through the switching element, wherein the timing adjuster further adjusts the interval of operations between setting data to the pixel element.

A tenth exemplary embodiment of the present invention provides the spatial light modulator according to the fourth exemplary embodiment, wherein the timing adjuster further applies a number of the control lines connected to the switching elements to adjust the interval of the control signals.

An eleventh exemplary embodiment of the present invention provides the mirror array device according to the first exemplary embodiment, comprising a data setup circuit for transmitting data to a plurality of control units of the controller and to the pixel element through the switching element.

A twelfth exemplary embodiment of the present invention provides the mirror array device according to the first exemplary embodiment, wherein: the controller comprises at least two control units, wherein at least two control units are connected to a same control line.

A thirteenth exemplary embodiment of the present invention provides the spatial light modulator according to the first exemplary embodiment, wherein the controller further comprises at least two control units, wherein the control units are placed on an upper and a lower sides surrounding the spatial light modulator, or surrounding a left and a right sides of the spatial light modulator to sandwich a region for placement of the plurality of pixel elements.

A fourteenth exemplary embodiment of the present invention provides the spatial light modulator according to the first exemplary embodiment, wherein the controller further comprises at least two control units, and a plurality of the control units further comprise a data setup circuit for setting data to the pixel element through the switching element.

A fifteenth exemplary embodiment of the present invention provides the spatial light modulator according to the first exemplary embodiment, wherein the controller starts to transmitting the control signal to the first switching element through the first control line before the control signal applied to the second switching element through the second control line is turned off at a low voltage level during a time slot for a grayscale representation of a least significant bit (LSB) in applying a pulse width modulation to control the spatial light modulator for displaying an image with gray scales represented by a data comprising several bits.

A sixteenth exemplary embodiment of the present invention provides the spatial light modulator according to the first exemplary embodiment, wherein the pixel elements arranged as a pixel array comprising more than 921,600 pixel elements.

A seventeenth exemplary embodiment of the present invention provides the spatial light modulator according to the first exemplary embodiment, further comprising a plurality of the control lines connected to and transmitting signals to control pixel elements extended along a horizontal direction of the spatial light modulator.

An eighteenth exemplary embodiment of the present invention provides the spatial light modulator according to the first exemplary embodiment, wherein a digital micromirror device (DMD).

A nineteenth exemplary embodiment of the present invention provides a spatial light modulator, comprising: a plurality of pixel elements wherein each of the pixel elements comprises at least a switching element; a plurality of control lines connected to at least one of the switching elements; a plurality of data setup lines connected to at least one of the switching elements; a controller for generating and transmitting a control signal through the control line, for controlling the switching element; and a data setup circuit comprises a plurality of setup units for setting data to the switching element through the data setup line, wherein the setup units are connected is sequentially connected according to an order of each control line connected to the controller for sequentially receiving a data setup timing clock signal from the controller.

A twentieth exemplary embodiment of the present invention provides a spatial light modulator, comprising: a plurality of pixel elements wherein each of the pixel elements further comprises at least a switching element; a plurality of control lines connected to at least one of the switching elements; a plurality of data setup lines connected to at least one of the switching elements; a controller for generating and transmitting a control sign al through the control line for controlling the switching element; and a data setup circuit comprising a plurality of setup units for setting data to the switching element through the data setup line, wherein of the setup units drive the data setup lines sequentially according to an order of each control line connected to the controller.

A twenty-first exemplary embodiment of the present invention provides the spatial light modulator according to the first exemplary embodiment, further comprising a plurality of data setup lines connected to at least one of the switching elements, and a data setup circuit comprises a plurality of setup units for setting data to the switching element through the data setup line, wherein the setup units are connected is sequentially connected according to an order of each control line connected to the controller for sequentially receiving a data setup timing clock signal from the controller.

A twenty-second exemplary embodiment of the present invention provides the spatial light modulator according to the first exemplary embodiment, further comprising a plurality of data setup lines connected to at least one of the switching elements, and a data setup circuit comprises a plurality of setup units for setting data to the switching element through the data setup line, wherein of the setup units drive the data setup lines sequentially according to an order of each control line connected to the controller.

Specifically, the present invention discloses a control process for inputting an ON pulse signal to the next word line by changing over the data of a bit line when the electric potential of a word line is changed from an ON state (i.e., high level) to an OFF state (i.e., low level) by the word line driver wherein the voltage of the word line is reduced to a voltage that is equal to or less than the threshold voltage Vt. The threshold voltage Vt is a voltage with which a current starts to flow in the drain according to the VGS-ID characteristic of a switching element in an electronic device of a field-effect transistor (FET). The signal transmission on the word line begins even if the aforementioned potential is not reduced to an OFF potential (e.g., a ground potential (GND) or a negative potential) and the word lines are driven in sequence by the word line driver (i.e., a controller).

Furthermore, the operation of transmitting a control signals on the word line is carried out even before a current flows in the drain of the FET connected to the preceding word line.

Another aspect of the present invention is to provide a bit line driver that sets data drives the bit line in accordance with the operation state of a word line by wiring the supply line for a bit line clock to the bit line driver along the sequence of supplying a signal to the pixel on the word line and by using a plurality of bit line clocks.

The configurations and the control processes improve the access speed to the ROW lines to increase the number of gray scale levels for a spatial light modulator (e.g., a DMD) for modulating the light intensities to generated images with a gray scale display by applying a PWM control process to the configuration and control process further reduce the number of auxiliary circuits and input/output (I/O) for a spatial light modulator (e.g., an LCD) performing a gray scale display in analog.

The increase in the access speed decreases the capacitance of the capacitor of a pixel element thus providing additional benefit when miniaturizing a spatial light modulator and/or increasing the number of pixels (e.g., dots per inch (DPI)) in a spatial light modulator.

BRIEF DESCRIPTION OF THE DRAWINGS

The present invention is described in detail below with reference to the following Figures.

FIG. 5A is a table showing an exemplary specification of the structure of a spatial light modulation element constituting a display system according to a preferred embodiment of the present invention.

FIG. 7A is a cross-sectional diagram showing the ON state of a micromirror.

FIG. 7B is a timing diagram showing the intensity of light projected in the ON state of a micromirror.

FIG. 35 is a table showing the exemplary specifications of frame, subfield and time slot of a spatial light modulator according to a preferred embodiment of the present invention;

DESCRIPTION OF THE PREFERRED EMBODIMENTS

The following is a description, in detail, of the preferred embodiment of the present invention with reference to the accompanying drawings.

Embodiment 1

Figure 1A:
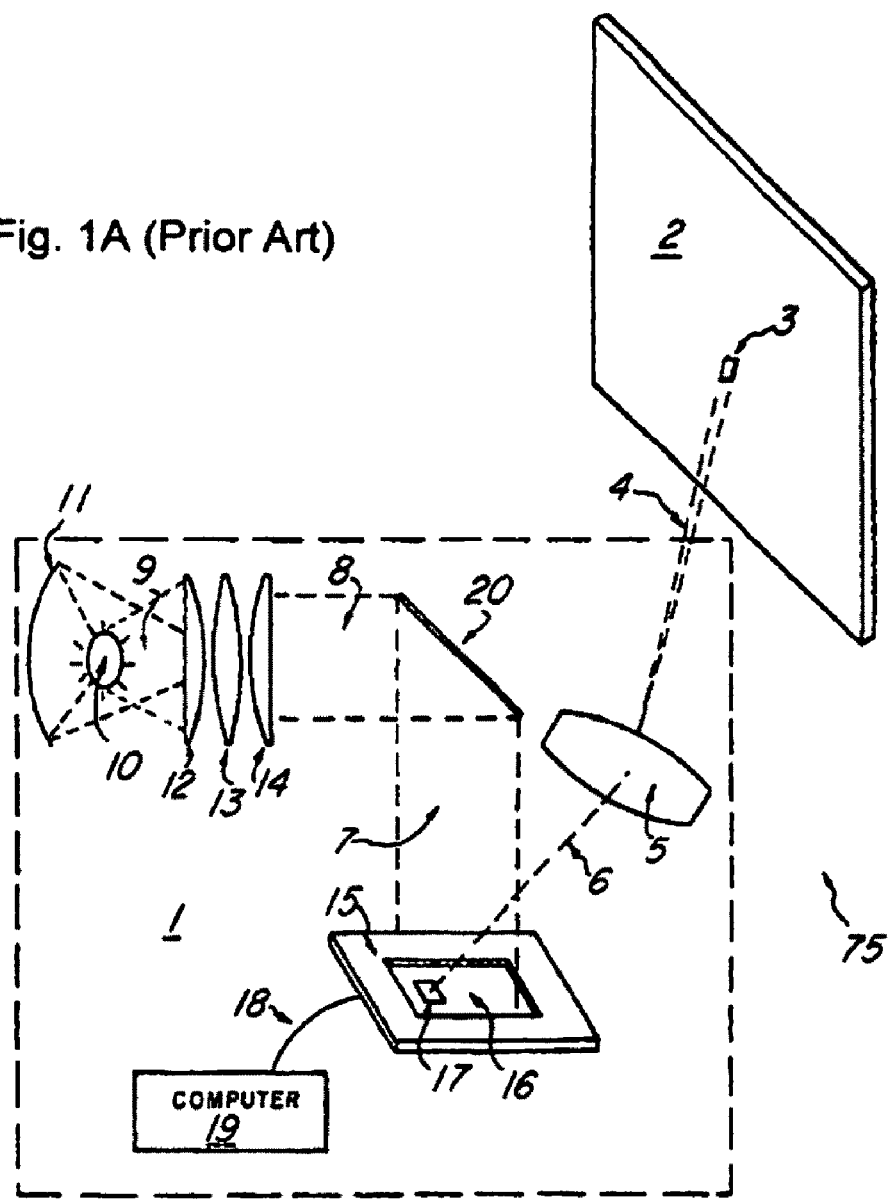
FIG. 1A illustrates the basic principle of a projection display using a micromirror device, as disclosed in a prior art patent.
Figure 1B:
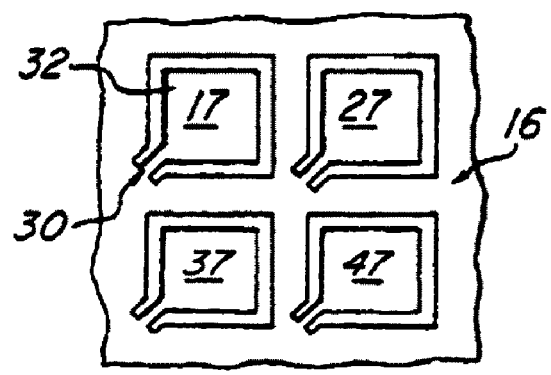
FIG. 1B is a top view diagram showing the configuration of mirror elements of a portion of a micromirror array of a projection apparatus disclosed in a prior art patent.
Figure 1C:
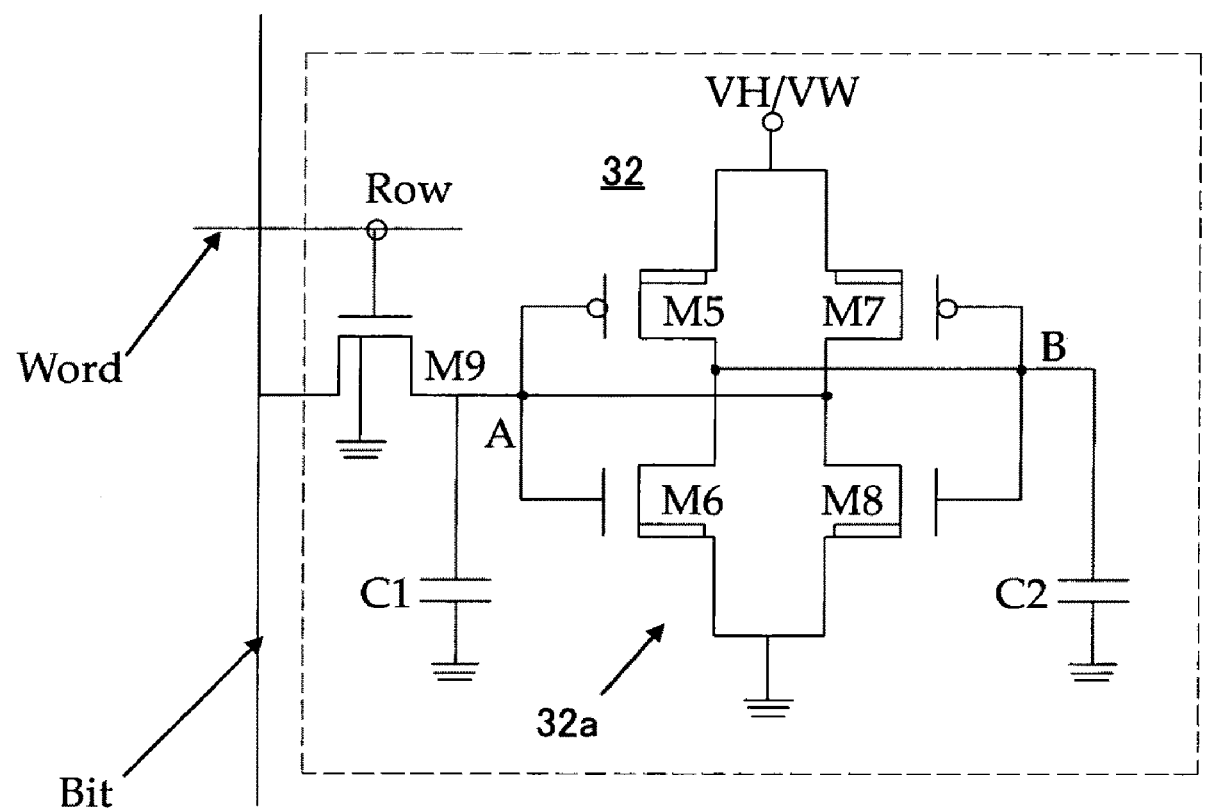
FIG. 1C is a circuit diagram showing the configuration of a drive circuit of mirror elements of a projection apparatus disclosed in a prior art patent.
Figure 1D:
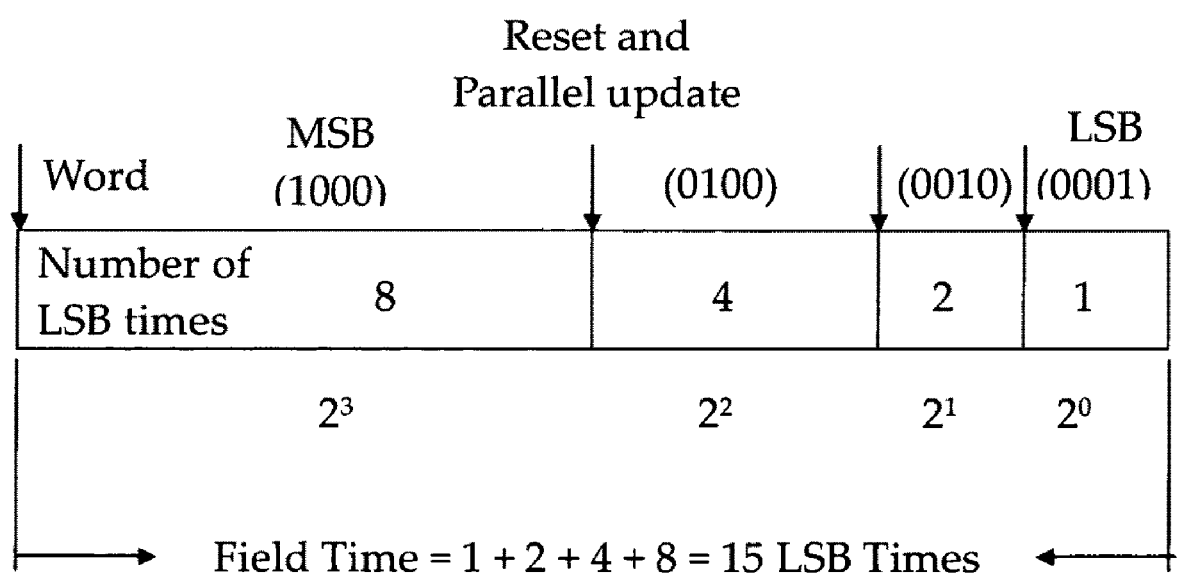
FIG. 1D shows the scheme of Binary Pulse Width Modulation (Binary PWM) of conventional digital micromirrors for generating a grayscale.
Figure 2:
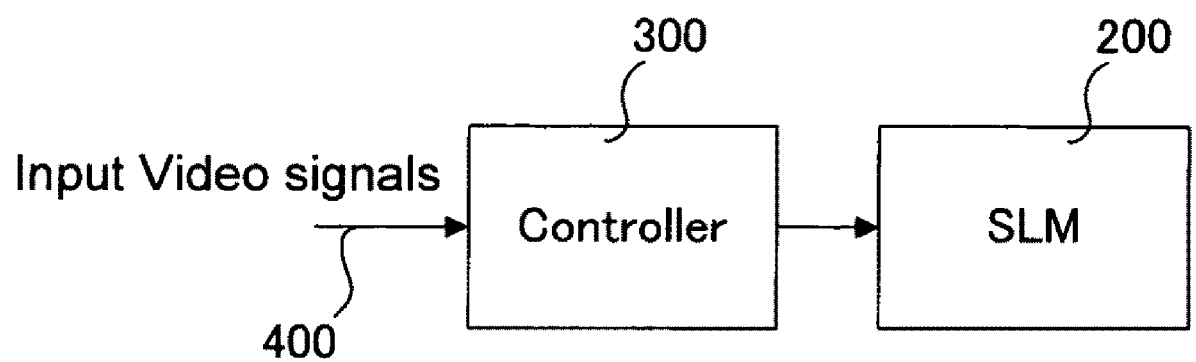
FIG. 2 is a functional block diagram showing an exemplary configuration of a display system comprising a spatial light modulator according to a preferred embodiment of the present invention.
Figure 3:
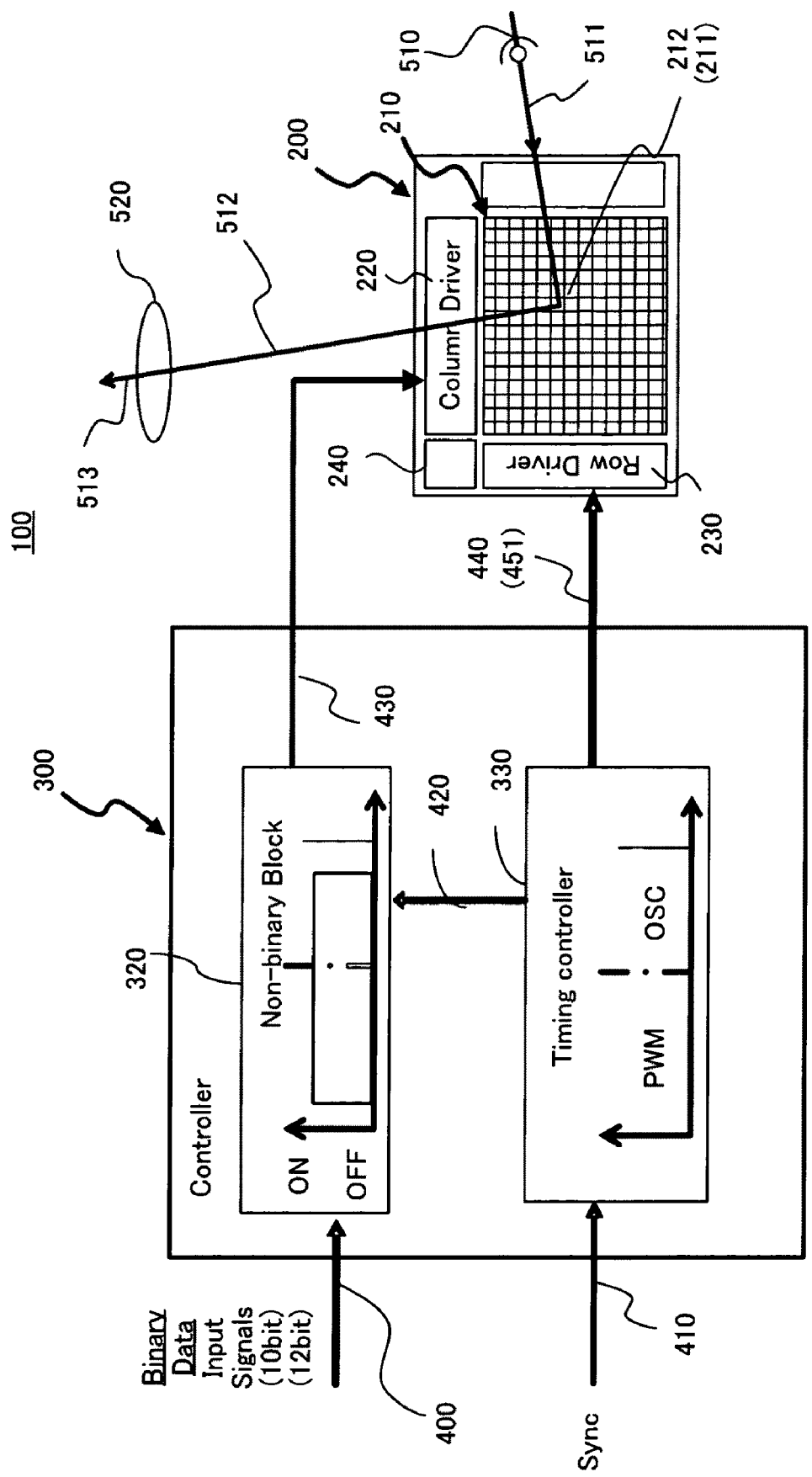
FIG. 3 is a functional block diagram showing an exemplary configuration of a display system according to a preferred embodiment of the present invention.

FIG. 2 is a functional block diagram showing an exemplary configuration of a display system comprising a spatial light modulator according to a preferred embodiment of the present invention. FIG. 3 is also a functional block diagram showing an exemplary configuration of a display system according to a preferred embodiment of the present invention.

As exemplified in FIG. 2, a display system according to the present embodiment comprises a spatial light modulator 200 and a control apparatus 300, which controls the spatial light modulator 200 according to an externally inputted binary and/or analog video signal 400.

The spatial light modulator implemented in the present embodiment may be any component, provided that it is capable of controlling a capacitor in a pixel constituting a spatial light modulator 200 with a transistor or FET. Examples of this type of spatial light modulator include digital micromirror devices (DMD), transmissive liquid crystals, reflective liquid crystals, and ferroelectric liquid crystal.

The following description is provided by exemplifying the case of applying the present invention to a DMD.

FIG. 3 more specifically shows the configuration of the above described display system shown in the FIG. 2.

The configuration of a projection apparatus 100, according to the present embodiment, will be described here. The projection apparatus 100 comprises the spatial light modulator 200, control apparatus 300, a light source 510 and a projection optical system 520.

The spatial light modulator 200 comprises a pixel array 210, a bit line driver unit 220 and a word line driver unit 230.

The control apparatus 300 comprises a non-binary block 320 and a timing control unit 330.

The non-binary block 320 generates non-binary data 430 from a binary video signal 400 and outputs the generated data to the bit line driver unit 220.

The timing control unit 330 generates a drive timing 420 from a synchronous signal 410 and outputs the generated timing to the non-binary block 320, and also outputs a PWM drive timing 440 to the word line driver unit 230.

The pixel array 210 comprises a plurality of pixel units 211 configured, as described later.

The present embodiment is further configured such that the spatial light modulator 200 is equipped with a timing adjustment unit 240 for implementing a control, as described later.

Figure 4:
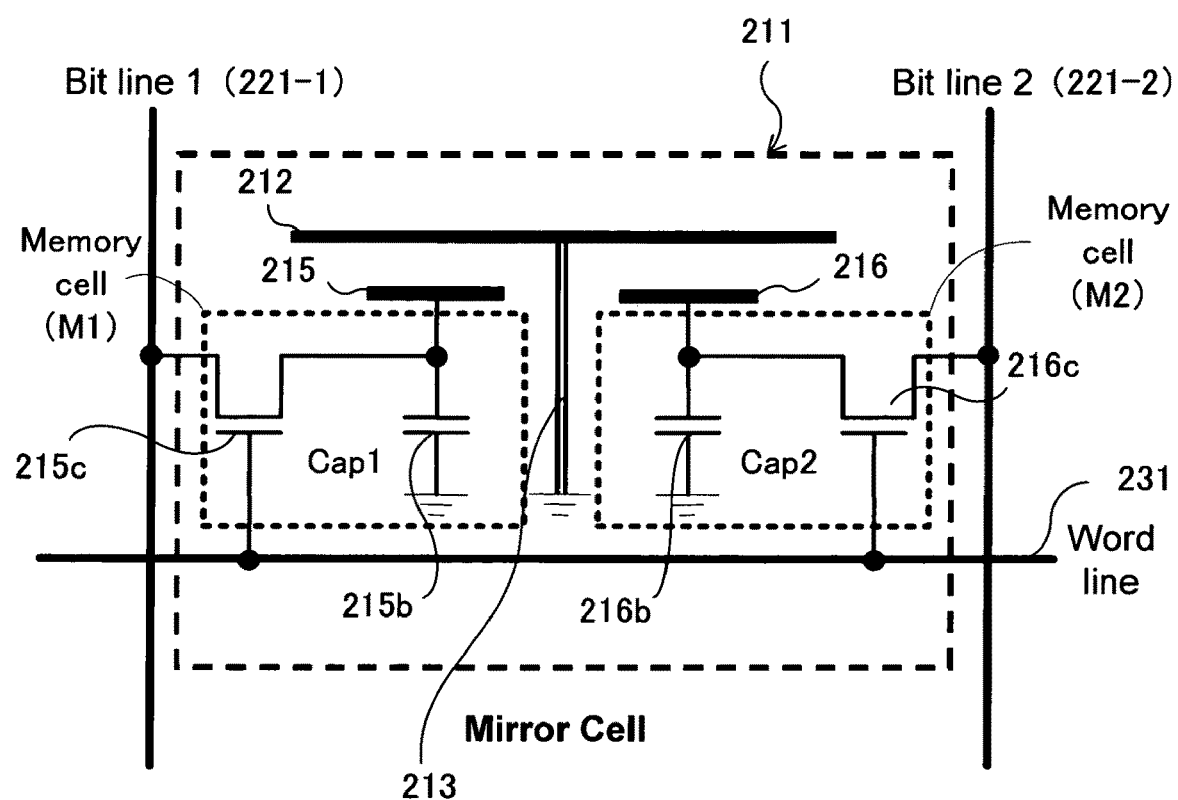
FIG. 4 is an illustrative diagram of the cross-section of one mirror element along the line II-II of the spatial light modulator shown in FIG. 5.

FIG. 4 is a conceptual diagram showing an exemplary configuration of a pixel unit 211 constituting a spatial light modulator according to the present embodiment.

Figure 5:
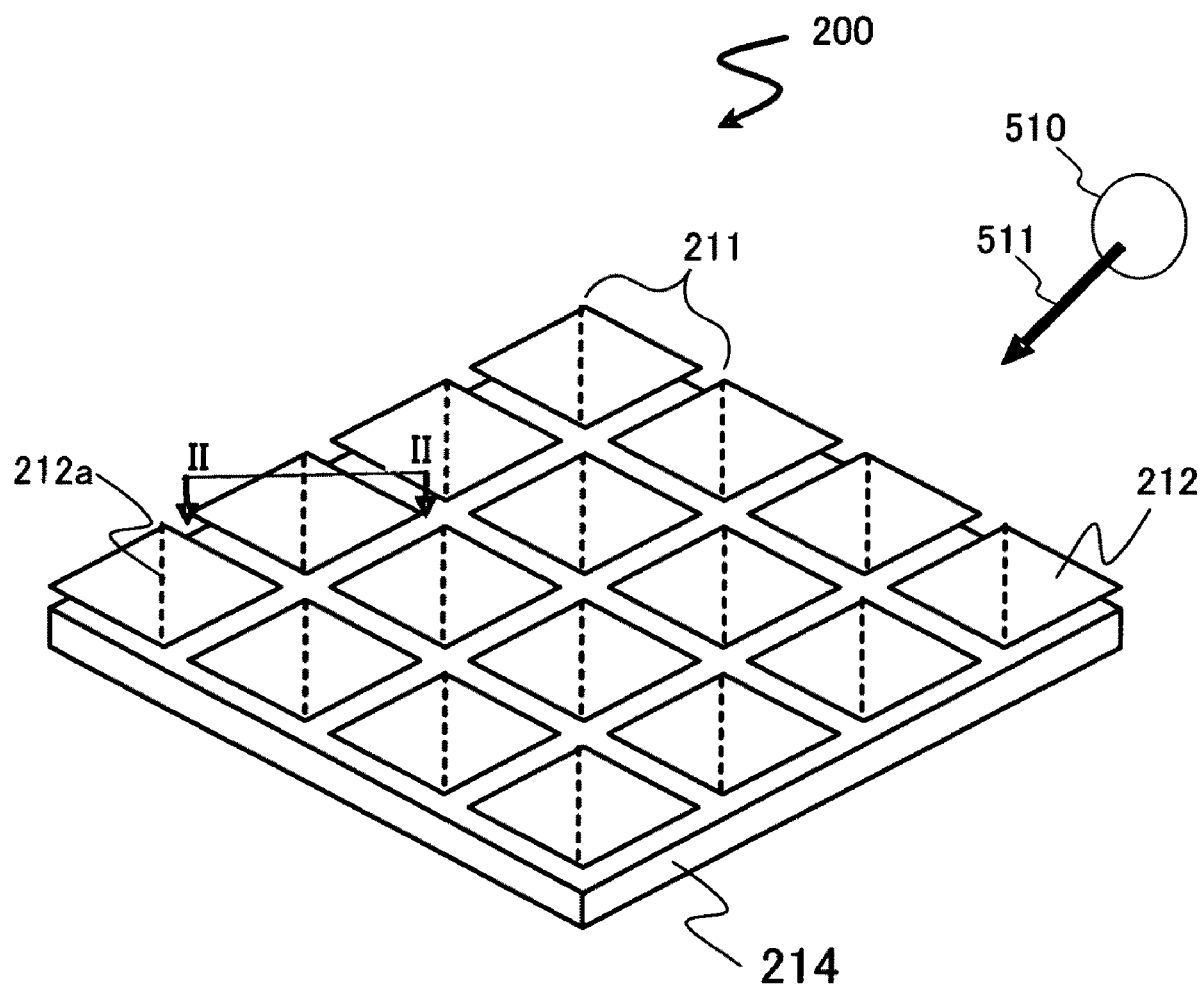
FIG. 5 is a top view for showing a diagonal perspective view of a mirror device comprised of, in two dimensions on a device substrate, a plurality of mirror elements, each controlling the reflecting direction of an incident light by the deflection a mirror.

FIG. 5 is a top view diagram showing a diagonal perspective of a spatial light modulator in which multiple mirror elements (i.e., pixel units), which control the reflecting direction of incident light by the deflection of the mirrors, are arrayed in two dimensions on a device substrate.

As shown in FIG. 5, the spatial light modulator 200 is configured by arraying pixel units 211, each of which comprises an address electrode (not shown in the drawing), an elastic hinge (not shown in the drawing), and a square mirror 212 supported by the elastic hinge, in a two-dimensional array on a substrate 214.

The mirror 212 of one pixel unit 211 is controlled by applying a voltage to an address electrode placed on the substrate 214.

Meanwhile, the pitch (i.e., the interval) between adjacent mirrors 212 is preferably set anywhere between 4 μm and 14 μm, or more preferably between 5 μm and 10 μm, in consideration of the number of pixels ranging from a super high definition television (i.e., a full HD TV) (e.g., 2048 by 4096 pixels) to a non-full HD TV, and of the sizes of mirror devices. Specifically, the pitch is defined as the distance between the deflection axes of adjacent mirrors 212.

Specifically, the area size of a mirror 212 may be anywhere between 16 square micrometers ($\mu m^2$) and 196 $\mu m^2$, more preferably anywhere between 25 $\mu m^2$ and 100 $\mu m^2$.

FIG. 5A is a table showing an exemplary specification of the structural elements of a spatial light modulation element constituting a display system according to a preferred embodiment of the present invention.

The relationship between the pixel pitch and the transistor and capacitor of a pixel includes the combinations shown in FIG. 5A to show the relative ranges of size. The withstanding voltage of a transistor is proportional to the size as that listed in Table 5A. As for the capacitor, in a comparison between an aluminum capacitor, in which the plate is made of aluminum, and a poly-capacitor, in which the plate is made of polysilicon, the latter has a larger capacitance for the same plate area size.

Figure 24:
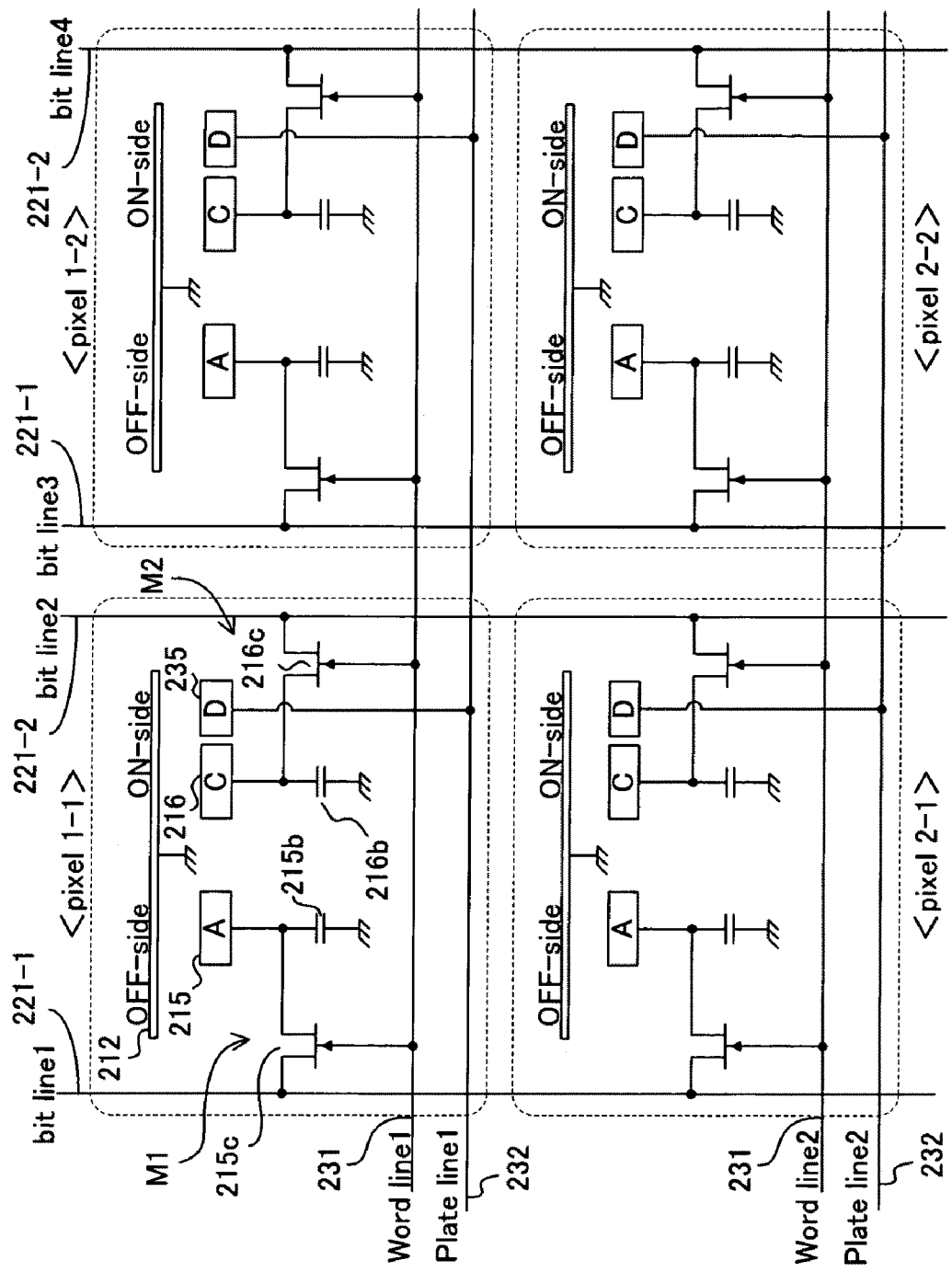
FIG. 24 is a functional circuit diagram showing an exemplary configuration of a pixel unit constituting a pixel array of a spatial light modulator according to a preferred embodiment of the present invention.

Referring to the combination number G1 shown in FIG. 5A, if one piece of dynamic random access memory (DRAM) is comprised for each of the ON and OFF zones of a mirror 212 with an 8-μm pixel pitch, two transistors possessing a 12-volt withstanding voltage will occupy the MOS substrate of the pixel zone. Therefore, the capacitors (i.e., OFF capacitor 215b and ON capacitor 216b) of the memory (i.e., memory cells M1 and M2) are exemplarily configured to place two aluminum capacitors between the transistors (i.e., gate transistors 215c and 216c) and the MEMS unit (i.e., mirror 212, hinge 213 and address electrodes (i.e., OFF electrode 215 and ON electrode 216)). FIG. 24 shows an example of the circuit configuration of such pixels.

Figure 38:
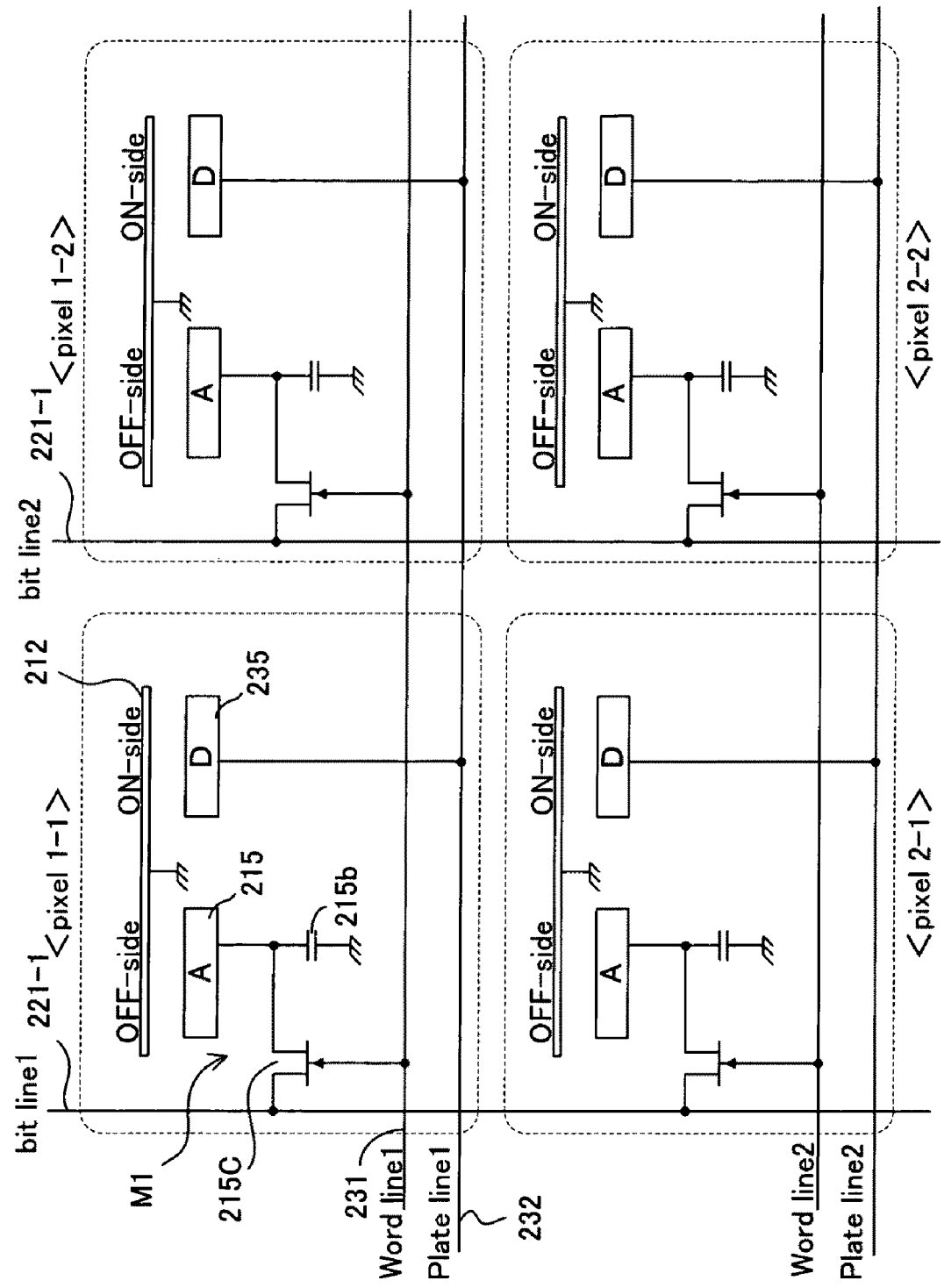
FIG. 38 is a functional circuit diagram showing an exemplary modification of the circuit configuration of the pixel unit shown in FIG. 24.

The combination number G2 shown in FIG. 5A is an exemplary configuration comprising one piece of DRAM memory in only the OFF zone of an 8 μm pixel pitch mirror and placing one transistor having a 12-volt withstanding voltage and one capacitor for a piece of memory on the substrate in the pixel zone. This circuit configuration is described later for FIG. 34. Compared to the configuration of G1, the configuration of G2 has the advantages of reducing the number of masks used in the photolithography process and reducing the number of transistors by half thus improving the production yield. FIG. 38 shows an example of the circuit configuration of such pixels.

The configuration of the combination number G3 shown in FIG. 5A is the result of changing, from that of G2, the withstanding voltage of the transistor to 24 volts and using an aluminum capacitor. The increase in the withstanding voltage of the transistor can further strengthen a hinge that may be required as a countermeasure to achieve the purpose of antistiction. FIG. 38 shows an example of the circuit configuration of such pixels.

The respective configurations of the other combination numbers G4, G5 and G6 which are shown in FIG. 5A are obtained by reducing the sizes of the respective configurations of the above described G1, G2 and G3.

Note that the form of the mirror 212 or the pitch between the adjacent mirrors is arbitrary.

In FIG. 5, the dotted line shows the deflection axis 212a for deflecting the mirror 212. An incident light 511 emitted from a coherent light source 510 is incident along a perpendicular or diagonal direction relative to the deflection axis 212a of the mirror 212. The light source 510 may be implemented with a laser light source to emit a coherent characteristic.

The following are descriptions of the configuration and operation of one pixel unit 211 with reference to the cross-sectional diagram, along the line II-II, of the pixel unit 211 of the spatial light modulator 200 shown in FIG. 5.

FIG. 4 is an outline diagram of the cross-section, along the line II-II, of one mirror element of the spatial light modulator shown in FIG. 5.

As shown in FIG. 4 and other figures, the spatial light modulator 200 according to the present embodiment comprises the pixel array 210, bit line driver unit 220 and word line driver unit 230.

In the pixel array 210, pixel units 211 are positioned in a grid where individual bit lines 221 extending vertically from the bit line driver unit 220 cross individual word lines 231 extending horizontally from the word line driver unit 230.

As shown in FIG. 4, each pixel unit 211 comprises a mirror 212 which tilts freely while supported on the substrate 214 by a hinge 213.

An OFF electrode 215 (and an OFF stopper 215a) and the ON electrode 216 (and an ON stopper 216a) are positioned symmetrically across the hinge 213 that comprises a hinge electrode 213a on the substrate 214.

When a predetermined voltage is applied to the OFF electrode 215, it attracts the mirror 212 with a Coulomb force and tilts the mirror 212 so that it abuts the OFF stopper 215a. This causes the incident light 511 to be reflected to the light path of an OFF position, which is not aligned with the optical axis of the projection optical system 130.

When a predetermined voltage is applied to the ON electrode 216, it attracts the mirror 212 with a Coulomb force and tilts the mirror 212 so that it abuts the ON stopper 216a. This causes the incident light 311 to be reflected to the light path of an ON position, which is aligned with the optical axis of the projection optical system 130.

An OFF capacitor 215b is connected to the OFF electrode 215 and to the bit line 221-1 by way of a gate transistor 215c that is constituted by a field effect transistor (FET) and the like.

Further, an ON capacitor 216b is connected to the ON electrode 216, and to the bit line 221-2 by way of a gate transistor 216c, which is constituted by a field effect transistor (FET) and the like. The opening and closing of the gate transistor 215c and gate transistor 216c are controlled with the word line 231.

Specifically, one horizontal row of pixel units 211 that are lined up with an arbitrary word line 231 are simultaneously selected, and the charging and discharging of capacitance to and from the OFF capacitor 215b and ON capacitor 216b are controlled by way of the bit lines 221-1 and 221-2, and thereby the individual ON/OFF controls of the micromirrors 212 of the respective pixel units 211 of one horizontal row are carried out.

In other words, the OFF capacitor 215b and gate transistor 215c on the side of the OFF electrode 215 constitute a memory cell M1 that is a so called DRAM structure.

Likewise, the ON capacitor 216b and gate transistor 216c on the side of the ON electrode 216 constitute a DRAM-structured memory cell M2.

With this configuration, the tilting operation of the mirror 212 is controlled in accordance with the presence and absence of writing data to the respective memory cells of the OFF electrode 215 and ON electrode 216.

As shown in FIG. 3, the light source 510 illuminates the spatial light modulator 200 with the incident light 511, which is reflected by the individual micromirrors 212 as a reflection light 512. The reflection light 512 then passes through a projection optical system 520 and is projected, as projection light 513.

A control apparatus 300, according to the present embodiment, controlling the spatial light modulator 200 uses the ON/OFF states (i.e., an ON/OFF modulation) and oscillating state (i.e., an oscillation modulation) of the mirror 212, thereby attaining an intermediate gray scale. It is, of course, also possible to use only the ON/OFF states (i.e., the ON/OFF modulation) of the mirror 212 of the conventional spatial light modulator 200.

A non-binary block 320 generates non-binary data 430 used for controlling the mirror 212 by converting an externally inputted binary video signal 400 into non-binary data. In this event, one LSB is different between the period of ON/OFF states of the mirror 212 and the period of intermediate oscillating state.

A timing control unit 330 generates, on the basis of a synchronous signal 410 (Sync), a drive timing 420, which is used for the non-binary block 320, and also generates a PWM drive timing 440 and an OSC drive timing 441, both of which are used for the mirror 212.

Figure 6:
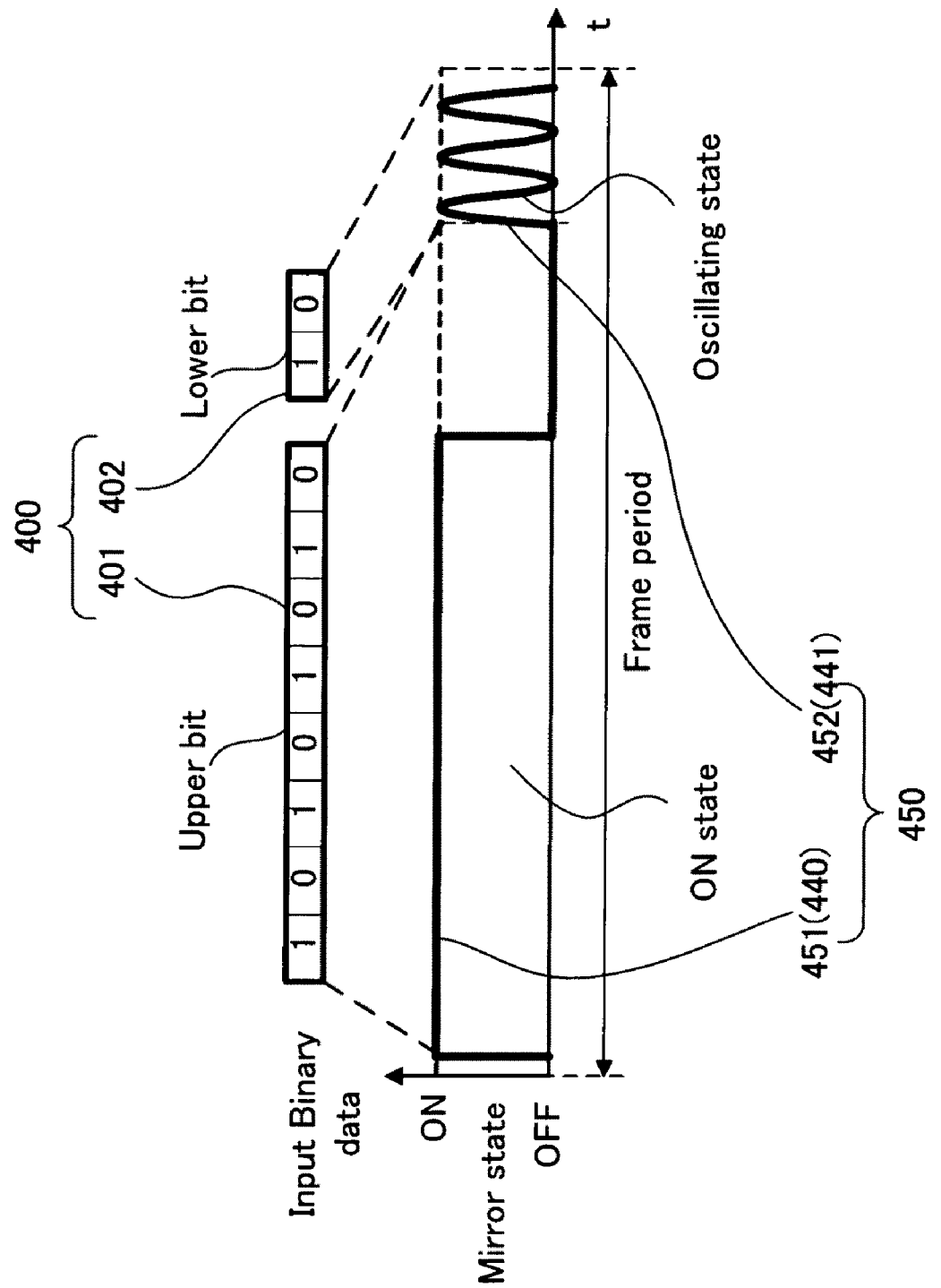
FIG. 6 is a timing diagram showing an exemplary mirror control profile used in a display system according to a preferred embodiment of the present invention.

As shown in FIG. 6, the present embodiment is configured such that a desired number of bits of the upper bits 401 of the binary video signal 400 is assigned to the ON/OFF control pattern 451 of a mirror control profile 450 and the remaining lower bits 402 is assigned to an oscillation control pattern 452. Further, according to the present embodiment, the control is such that the ON/OFF (positioning) state is controlled by the PWM drive timing 440 from the timing control unit 330 and the non-binary data 430, while the oscillating state is controlled by the PWM drive timing 440 and OSC drive timing 441 from the timing control unit 330 and the non-binary data 430.

Next is a description of the basic control of the mirror 212 of the spatial light modulator 200 according to the present embodiment.

Note that "Va (1, 0)" indicates an application of a predetermined voltage Va to the OFF electrode 215 and no application of voltage to the ON electrode 216 in the following description. Similarly, "Va (0, 1)" indicates no application of voltage to the OFF electrode 215 and an application of a voltage Va to the ON electrode 216. "Va (0, 0)" indicates no application of voltage to either the OFF electrode 215 or ON electrode 216. "Va (1, 1)" indicates the application of a voltage Va to both the OFF electrode 215 and ON electrode 216.

FIGS. 7A, 7B, 7C, 7D, 7E and 7F show the configuration of the pixel unit 211 comprising the mirror 212, hinge 213, OFF electrode 215 and ON electrode 216, and a basic example in which the mirror 212 is controlled under an ON/OFF state and under an oscillating state.

FIG. 7A shows the mirror 212 tilted from the neutral state to the ON state by being attracted to the ON electrode 216 as a result of applying a predetermined voltage (i.e., Va (0, 1)) to only the ON electrode 216. In the ON state of the mirror 212, the reflection light 512, by way of the mirror 212, is captured by the projection optical system 520 and projected as a projection light 513. FIG. 7B shows the intensity of light projected in the ON state.

Figures 7C, 7D:
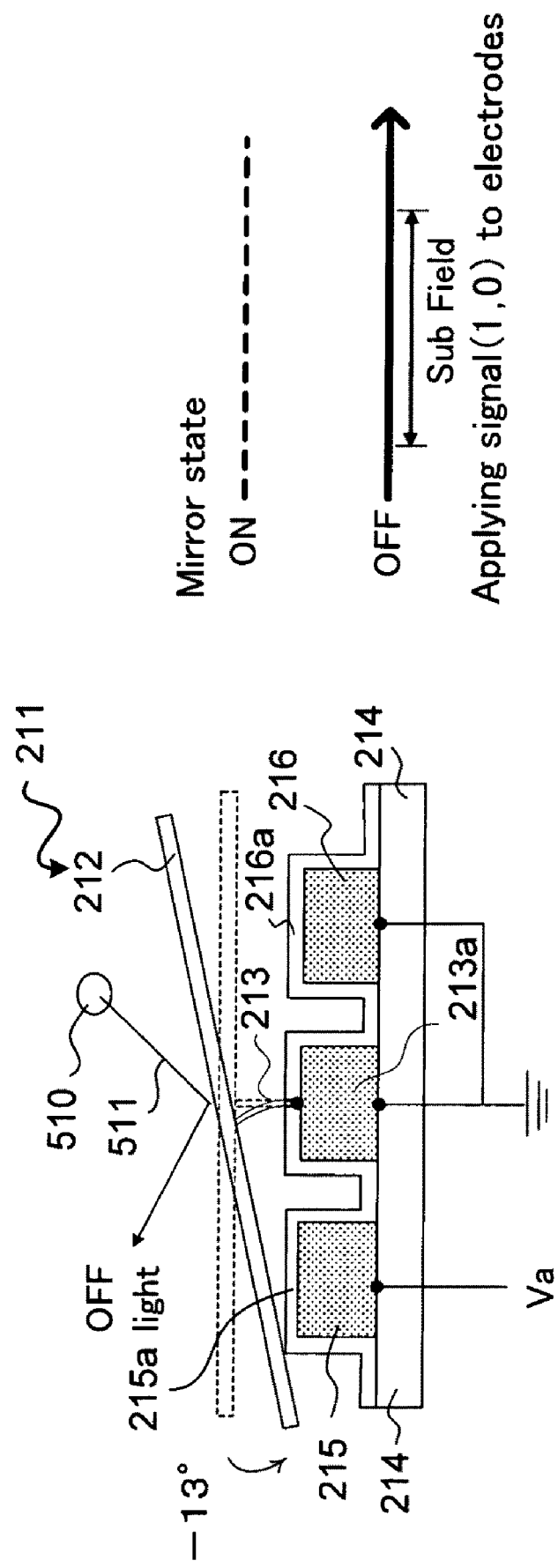
FIG. 7C is a cross-sectional diagram showing the OFF state of a micromirror.
FIG. 7D is a timing diagram showing the intensity of light projected in the OFF state of a micromirror.

FIG. 7C shows the mirror 212 tilted from the neutral state to the OFF state by being attracted to the OFF electrode 215 as a result of applying a predetermined voltage (i.e., Va (1, 0)) to only the OFF electrode 215. In the OFF state of the mirror 212, the reflection light 512 is deflected from the projection optical system 520, and therefore does not constitute a projection light 513. The far right side of FIG. 7B shows the intensity of light projected in the OFF state. FIG. 7D shows the intensity of light projected in the OFF state.

Figure 7F:
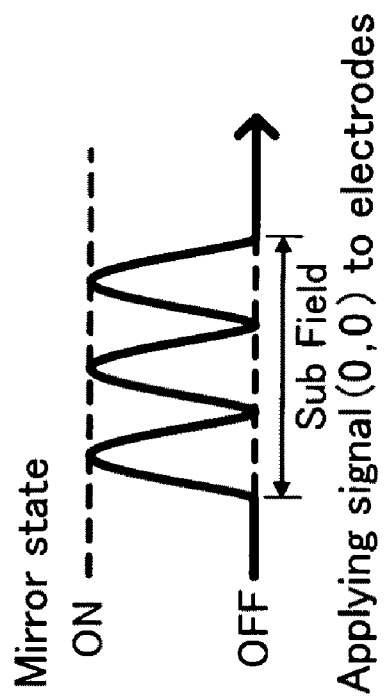
FIG. 7F is a timing diagram showing the intensity of light projected in the oscillating state of a micromirror.
Figure 7E:
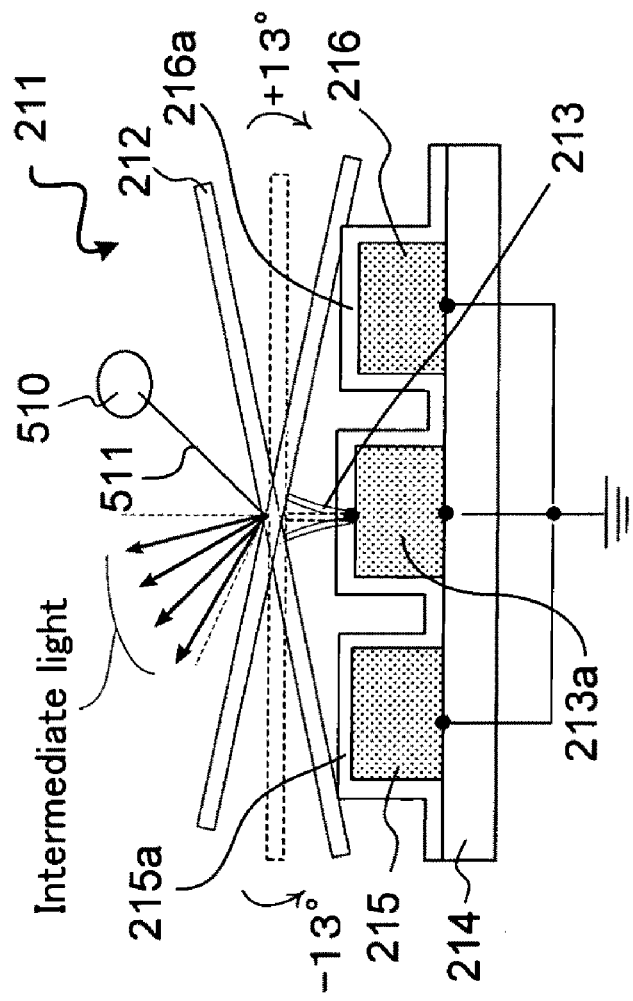
FIG. 7E is a cross-sectional diagram showing the oscillating state of a micromirror.

FIG. 7E exemplifies a case of the mirror 212 performing a free oscillation in the maximum amplitude of A0 between a tilted position (i.e., a Full ON) in contact with the ON electrode 216 and another tilted position (i.e., a Full OFF) in contact with the OFF electrode 215 (at Va (0, 0)).

An incident light 511 is illuminated on the mirror 212 at a prescribed angle, and the intensity of light resulting from the incident light 511 reflecting in the ON direction and a portion of the light (i.e. the intensity of light of the reflection light 512) reflecting in a direction that is between the ON direction and OFF direction are incident to the projection optical system 520 so as to be projected as projection light 513. FIG. 7F shows the intensity of light projected in an oscillating state.

That is, in the ON state of the mirror 212 shown in FIG. 7A, the flux of light of the reflected reflection light 512 is directed in the ON direction so as to be captured almost entirely by the projection optical system 520 and projected as the projection light 513.

In the OFF state of the mirror 212 shown in FIG. 7C, the reflection light 512 is directed in an OFF direction away from the projection optical system 520, and thus a light projected as a projection light 513 does not exist.

In the oscillating state of the mirror 212 shown in FIG. 7E, a portion of the light flux of the reflection light 512, diffraction light, diffusion light and the like are captured by the projection optical system 520 and projected as a projection light 513.

Note that the examples shown in FIGS. 7A, 7B, 7C, 7D, 7E and 7F described above have been described for a case of applying the voltage Va represented by a binary value of "0" or "1" to each of the OFF electrode 215 and ON electrode 216. Alternatively, a more minute control of the tilting angle of the mirror 212 is available by increasing the steps of the magnitude of Coulomb force generated between the mirror 212 and the OFF electrode 215 or ON electrode 216 by increasing the steps of the voltage values Va to multiple values.

Also note that the examples shown in FIGS. 7A, 7B, 7C, 7D, 7E and 7F described above have been described for a case of setting the mirror 212 (i.e., the hinge electrode 213a) at the ground potential. Alternatively, a more minute control of the tilting angle of the mirror 212 may also be achieved by applying an offset voltage thereto.

The present embodiment is configured to apply the voltages, i.e., Va (0, 1), Va (1, 0) and Va (0, 0), at appropriate timings in the midst of the tilting of the mirror 212 between the ON and OFF states so as to generate a free oscillation in an amplitude that is smaller than the maximum amplitude between the ON and OFF states, thereby accomplishing a more minute gray scale.

The following shows a method for displaying a video image using the projection apparatus 100 according to the present embodiment exemplified in the above described FIG. 2 and other figures.

Non-binary data 430, a PWM drive timing 440 and an OSC drive timing 441 are generated when a binary video signal 400 and a synchronous signal 410 are inputted into the control apparatus 300.

The non-binary block 320 and timing control unit 330 calculate, for each mirror of the SLM constituting a pixel of the video image of a frame, the period of time for controlling each mirror 212 under an ON state and under an oscillating state or the number of oscillations within one frame of a video image, in accordance with the binary video signal 400 and the drive timing 420 generated by the timing control unit 330 from the synchronous signal 410. The non-binary block 320 and timing control unit 330 also generate non-binary data 430, a PWM drive timing 440 and an OSC drive timing 441.

Specifically, the non-binary block 320 and timing control unit 330 that are comprised in the control apparatus 300 use the ratio of the intensity of a projection light 513 obtained by oscillating a predetermined mirror 212 in an oscillation time T to the intensity of a projection light 513 obtained by controlling the mirror 212 under an ON state during the oscillation time T, and calculate the period of time for controlling the mirror 212 under an ON state, the period of time for controlling the mirror 212 under the oscillating state or the number of oscillations during the period.

The non-binary block 320 and timing control unit 330 control the ON/OFF switching and oscillation operations for each of the mirrors 212 constituting one frame of video image using non-binary data 430, PWM drive timing 440 and OSC drive timing 441, all of which are generated on the basis of the calculated value of the time or the number of times of oscillation.

Figure 8:
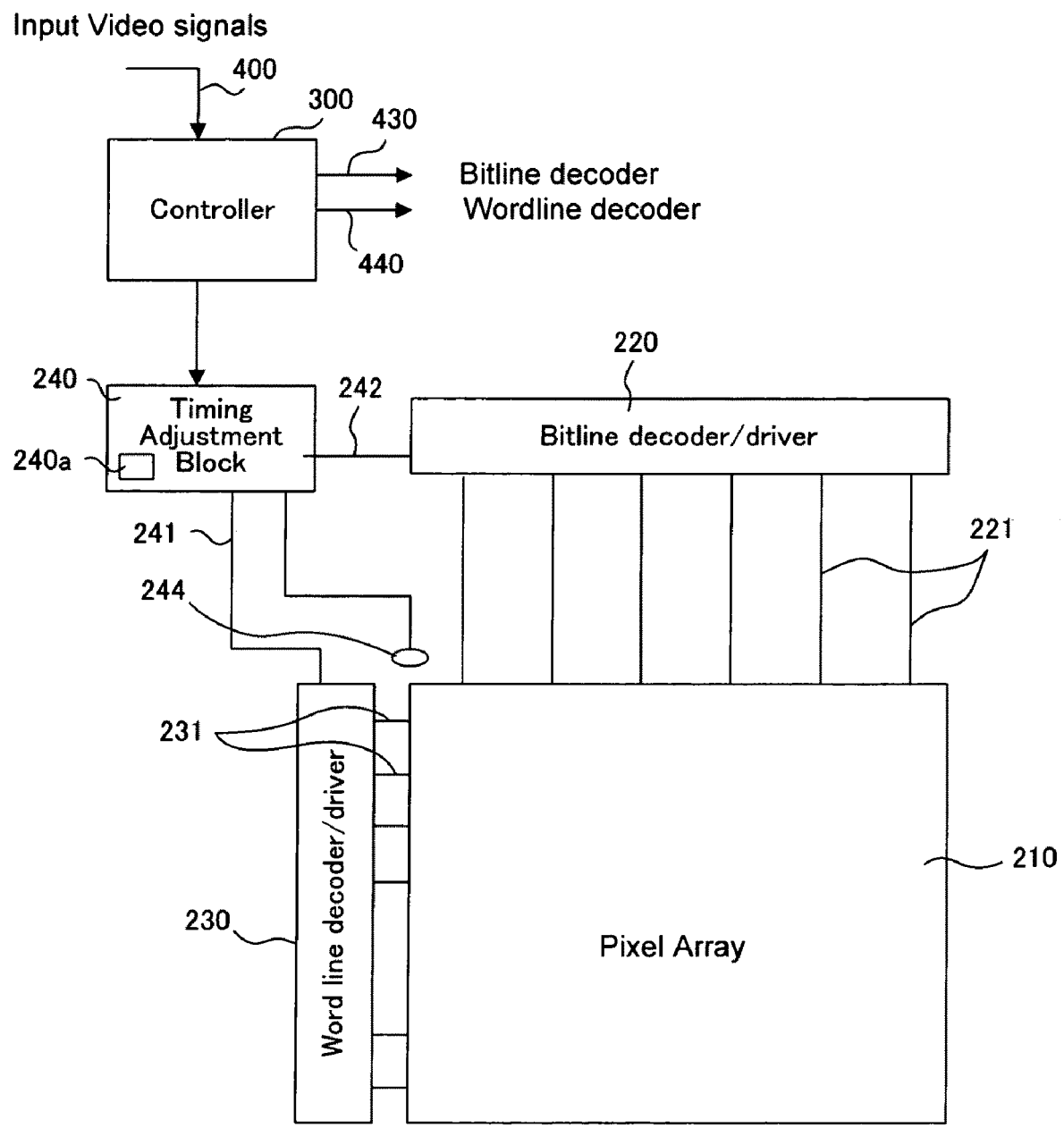
FIG. 8 is a functional block diagram showing an exemplary configuration of a spatial light modulator constituting a display system according to a preferred embodiment of the present invention.
Figure 9:
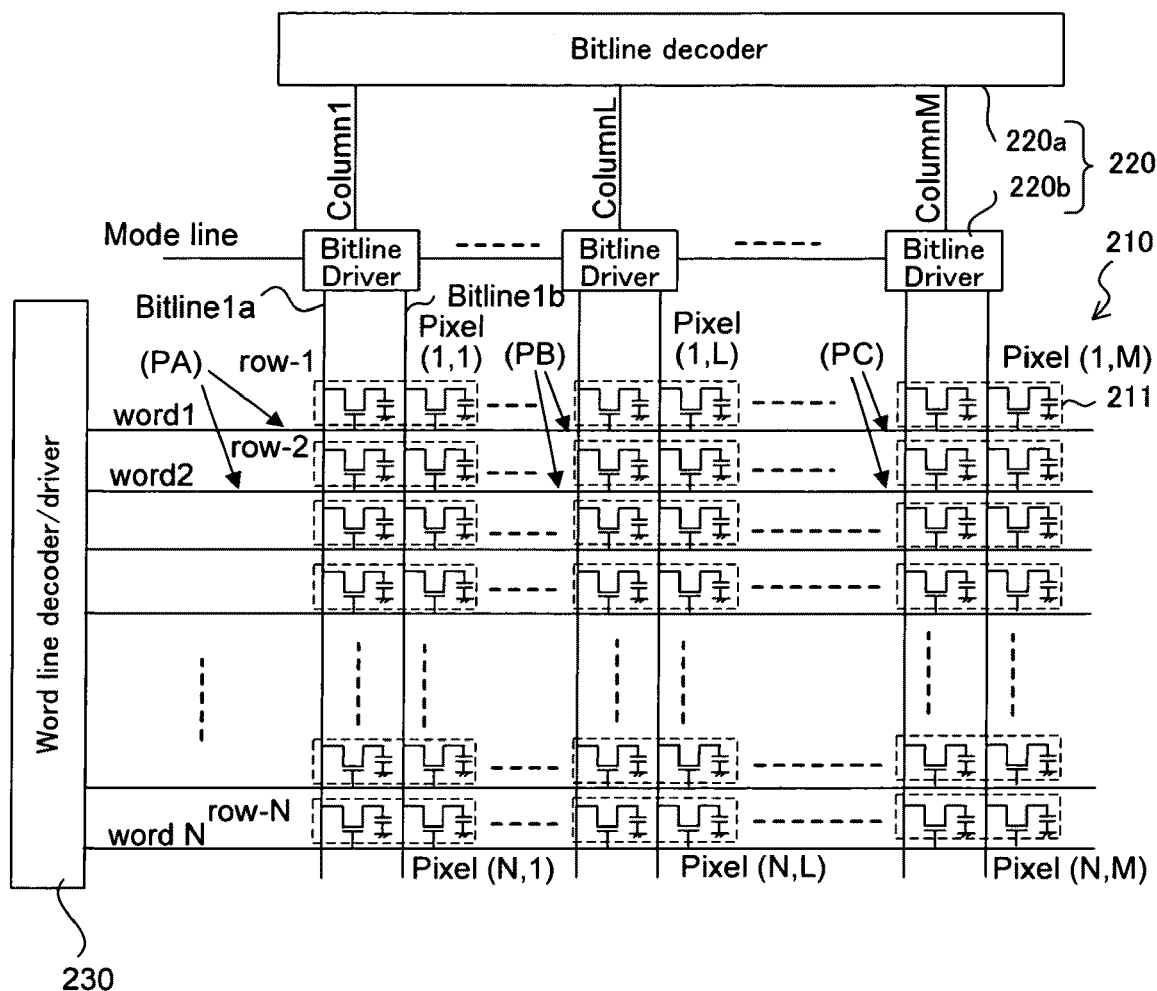
FIG. 9 is a functional circuit diagram showing an exemplary internal configuration of a spatial light modulator constituting a display system according to a preferred embodiment of the present invention.
Figure 10:
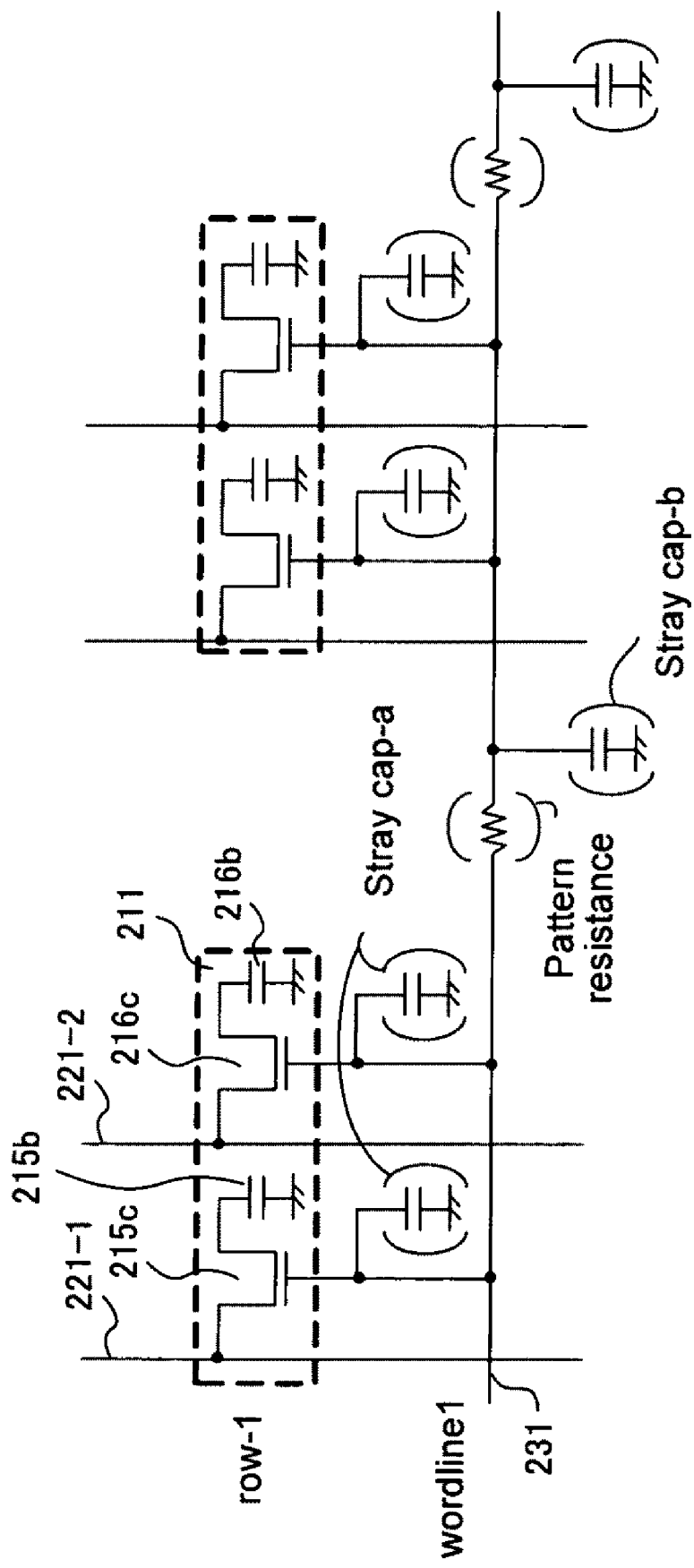
FIG. 10 is a functional circuit diagram for describing a technical problem of a conventional technique.
Figure 11:
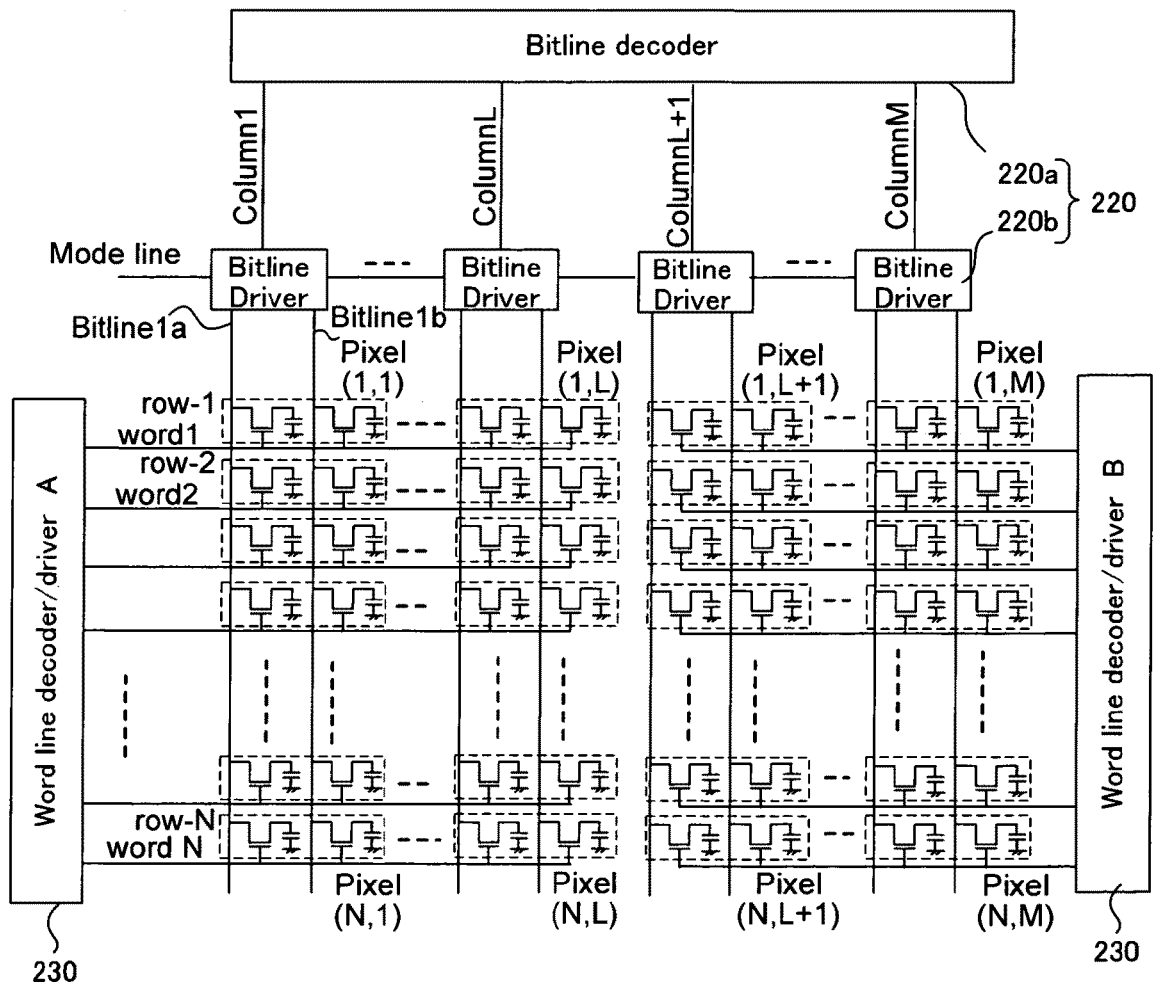
FIG. 11 is a functional circuit diagram showing an exemplary modification of the internal configuration of a spatial light modulator constituting a display system according to a preferred embodiment of the present invention.
Figure 12:
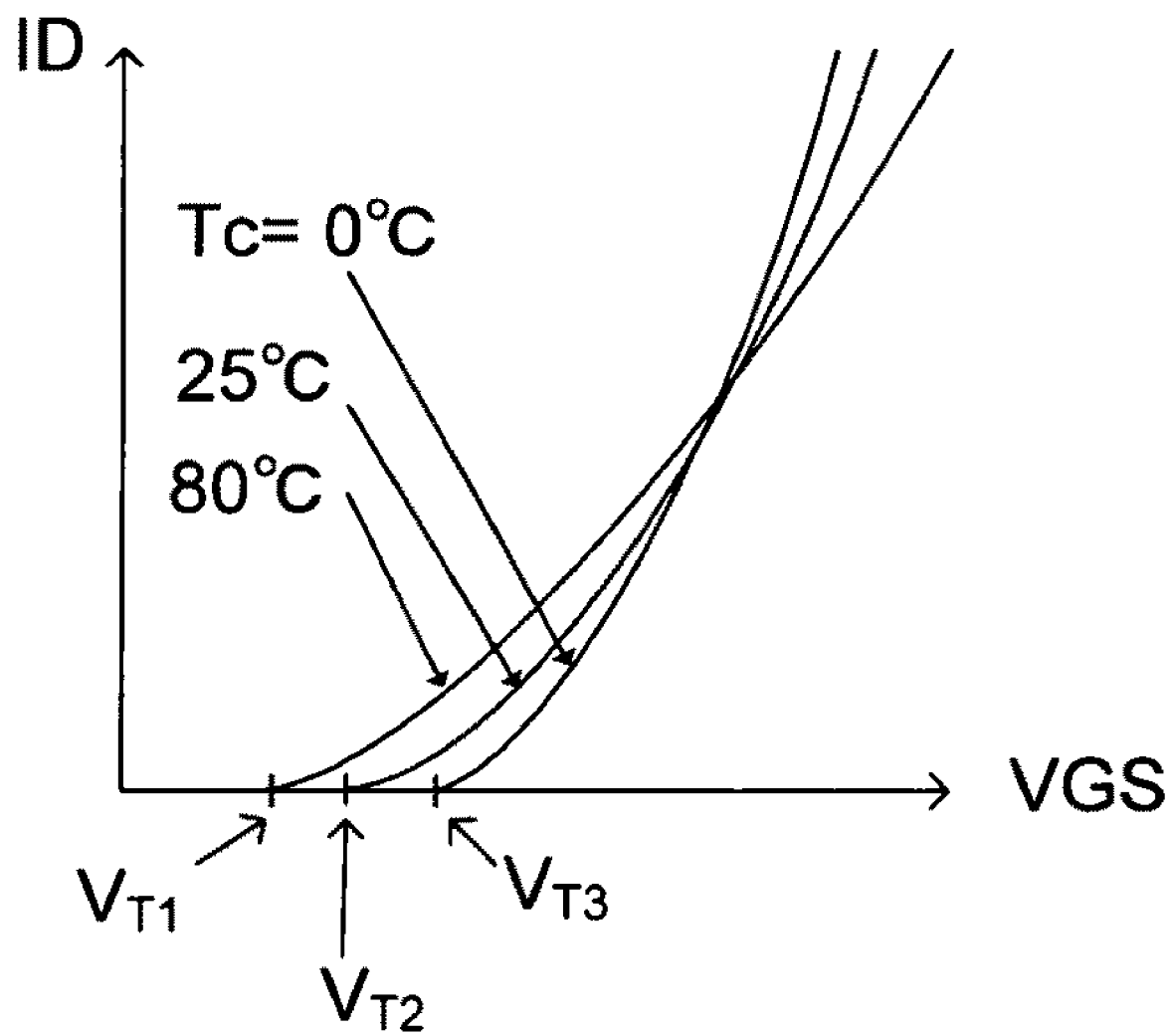
FIG. 12 is a graph describing a technical problem of a conventional technique.
Figure 13:
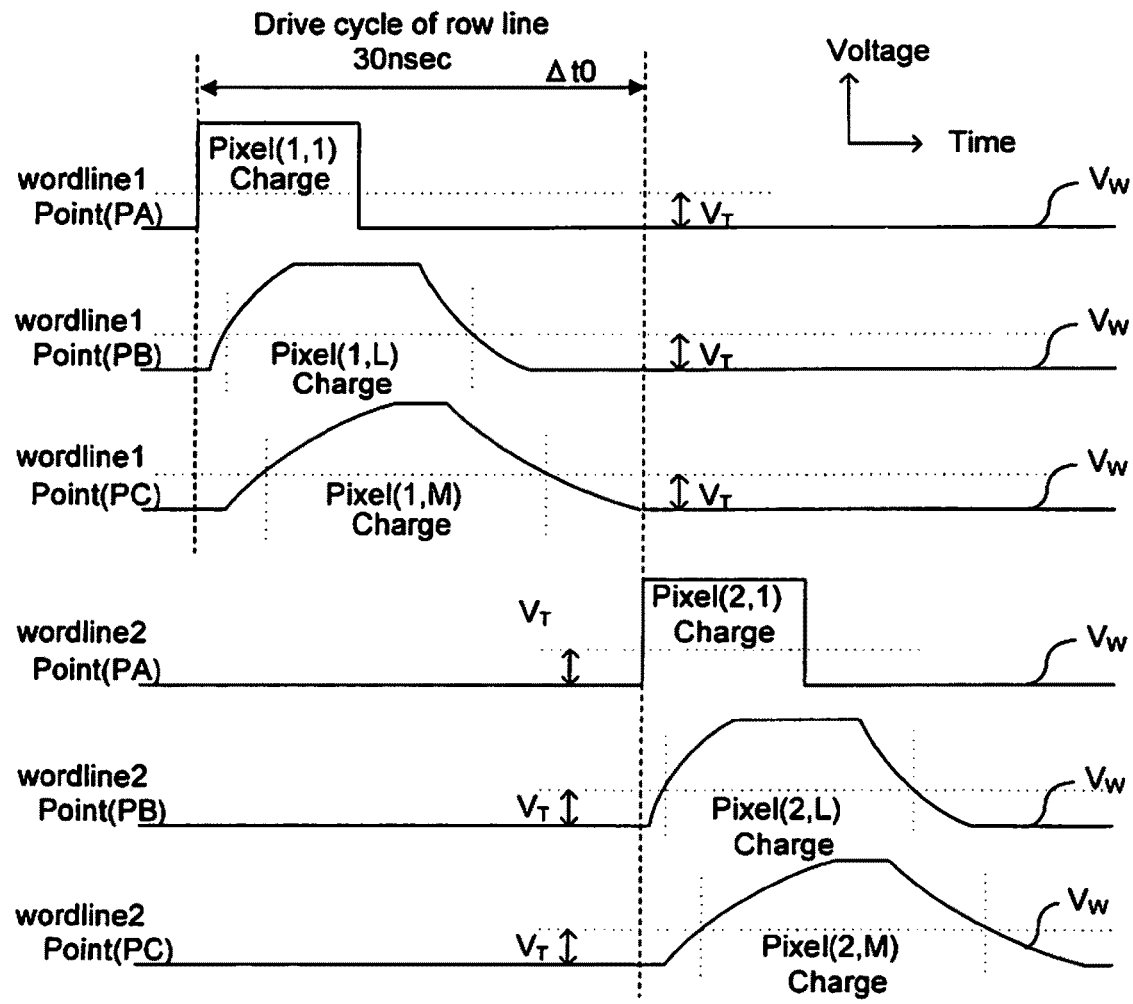
FIG. 13 is a chart for describing a technical problem of a conventional technique.
Figure 14:
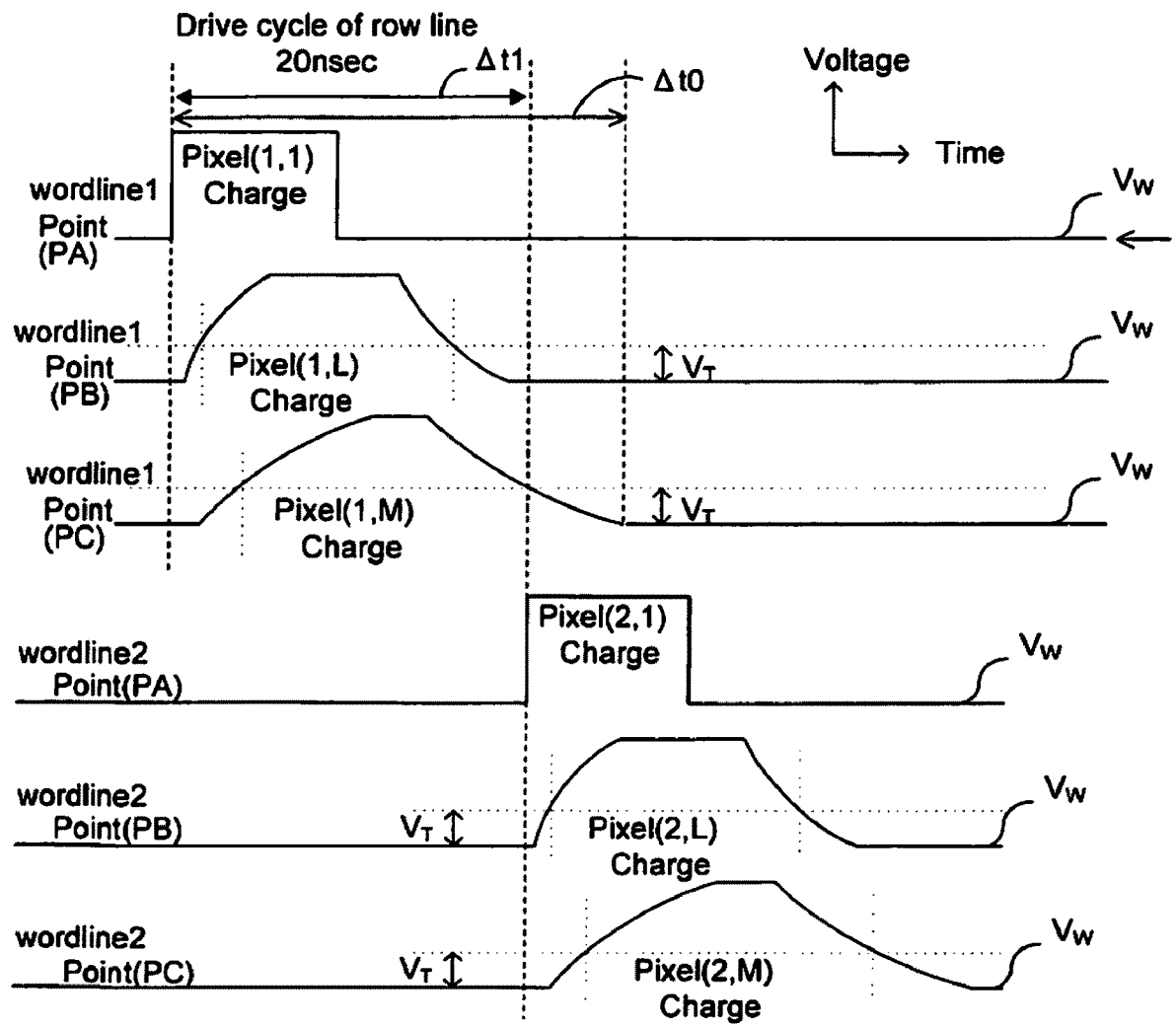
FIG. 14 is a chart for describing the action of a timing adjustment unit according to a preferred embodiment of the present invention.

FIG. 8 is a functional block diagram showing an exemplary configuration of a spatial light modulator constituting a display system according to a preferred embodiment of the present invention. FIG. 9 is a functional circuit diagram showing an exemplary internal configuration of a spatial light modulator constituting a display system according to a preferred embodiment of the present invention. FIG. 10 is a functional circuit diagram for describing a technical problem of the conventional technique. FIG. 11 is a functional circuit diagram showing an exemplary modification of the internal configuration of a spatial light modulator constituting a display system according to a preferred embodiment of the present invention. FIGS. 12 and 13 are charts for describing a technical problem of the conventional technique. FIG. 14 is a chart for describing the action of a timing adjustment unit according to the present embodiment.

As shown in FIGS. 8 and 9, the pixel array 210, according to the present embodiment, is configured to place the pixel units 211 at the intersection where a plurality of bit lines (i.e., bit lines 221-1 and 221-2), driven by the bit line driver unit 220, and a plurality of word lines, driven by word line driver unit 230 cross. The pixel array 210 is further configured to drive the gate transistors 215c and 216c (i.e., OFF capacitor 215b and ON capacitor 216b) that are equipped in each pixel unit 211.

Although in FIG. 9 one pixel unit 211 is configured with the two switching elements (i.e., gate transistors 215c and 216c), the pixel unit 211 may also be equipped with one switching element or two or more switching elements.

Here, in the case of a full-HD TV, the number of pixel units 211 is such that the row-N is the 1080-th row line, and the column-M is the 1920-th column line. The column-L is the 960-th line, that is, in the middle.

In the case of the configuration of such a pixel array 210, a stray capacitance is generated in each word line 231, as shown in FIG. 10.

Specifically, FIG. 9 depicts only the elements and wirings necessary for a circuit operation; what actually exist are the stray capacitance (i.e., the stray cap-a) of the gate of the FET constituting the gate transistors 215c and 216c, the stray capacitance (i.e., the Stray cap-b) of the word line 231 and the resistance (i.e., the Pattern resistance) of the word line 231, as shown in FIG. 10. The stray capacitance of the gate is relatively large, tending to affect the word line 231 controlling the FET more as the number of pixel units 211 lined up with a word line 231 in the horizontal direction (i.e., the ROW direction) increases.

FIG. 12 shows the operational characteristic of the switching elements (i.e., the gate transistors 215c and 216c), indicating the relationship between a voltage Vgs applied to the gate and a current ID flowing in the drain of the element.

A current starts to flow into the drain when the voltage Vgs applied to the gate reaches a certain value (i.e., a threshold value $V_T$). The threshold value $V_T$ changes, such as $V_{T1}$, $V_{T2}$, $V_{T3}$ and so on, with the temperature.

As shown in FIG. 13, when a switching element is controlled by applying a control signal $V_W$ to the word line 231, various kinds of stray capacitance and wiring resistances are in the word line 231, as shown in FIG. 10. Therefore, a delay and a deformity (i.e., pulse sharpness reduction) in the waveform occurs in a signal output from the word line driver unit 230 to the word line 231 before reaching the M-th pixel on the opposite side.

More specifically, in FIG. 13, the pixel position PA is the position of the pixel unit 211 closest to the word line driver 230; the pixel position PB is the position of the pixel unit 211 at the center of thee pixel array 210 (i.e., the word line 231); and the pixel position PC is the position of the pixel unit 211 on the right edge of the word line 231.

As the position of a pixel moves away from the word line driver 230, as the pixel positions illustrated by PA, PB and PC, thus increasing pulse sharpness reduction of the control signal transmitted on the word line 231.

Accordingly, when the switching element connected to the next word line 231 (i.e., the word line 2 in the case of FIG. 13) is controlled from a certain word line 231 (i.e., the word line 1), a control signal is inputted to the next word line 2 after waiting for the voltage of the control signal to reach the L level (e.g., a ground potential (GND); a negative potential is also permissible) at all points on the word line 1) to compensate for the above described delay and pulse sharpness reduction of the waveform. In this example, there is a wait for the level of the control signal $V_W$ to reach the L level at the pixel position PC (i.e., the pixel (1, M), with the largest degree of pulse sharpness reduction. Then the control interval Δt0 (Drive cycle of row line) between the word lines 1 and 2 will be established.

The control interval Δt0 limits the access speed to the ROW line (i.e., each word line 231) and limits the number of gray scale levels attainable. The technical problem becomes remarkable when the gray scale exceeds 8 bits for the number of pixels equivalent to a full HD or more.

There is also a conceivable configuration that divides the word line 231 into two parts and furnishes each divided word line with the independent word line driver units A and B to reduce the stray capacitance to half that of the configuration of FIG. 9, as exemplified in FIG. 11.

While this configuration and control processes improve the control cycle of a ROW line, it increases a cost due to the addition of the word line driver unit B. Furthermore, as described later, if there is a need to control the bottom plate of a capacitor and to place an electrode for each pixel with no switching element, requiring a separate driver for the electrode, the layout will be more complicated and difficult to implement.

Therefore, the present embodiment is configured to start applying a control signal $V_W$ to the next word line 231 (i.e., the word line 2) at a timing of a control interval $\Delta t1$ (which is smaller than the control interval $\Delta t0$) before the control signal $V_W$ applied to the word line 231 (i.e., the word line 1) is completely changed to the L level, as exemplified in FIG. 14.

Specifically, the switching element (i.e., the gate transistors 215c and 216c) of each pixel unit 211 does not allow a current ID flow unless a certain voltage, a threshold value $V_T$, or higher is applied, as exemplified in FIG. 12.

Accordingly, the word line driver unit 230 inputs a control signal $V_W$ to the next word line 2 when the voltage is decreased to be no higher than the threshold value $V_T$ in any place of the word line 1, instead of inputting a signal to the next word line 2 when the word line reaches the L level after a control signal is inputted to the word line 1, thereby shortening the control interval $\Delta t1$ (Drive cycle of row line) as compared to the control interval $\Delta t0$ shown in FIG. 12.

These configurations makes it possible to improve the access speed of a ROW line constituted by a plurality of pixel units 211 lined up on an individual word line 231, without requiring an additional circuit.

As exemplified in FIG. 8, the present embodiment is configured to control the word line driver unit 230 to change over the control interval $\Delta t0$ to the control interval $\Delta t1$ with the timing adjustment unit 240 using a timing control signal 241.

The timing adjustment unit 240 also synchronizes the operation of the bit line driver unit 220 with a timing control signal 242, in response to shortening the control timing of each word line 231 of the word line driver unit 230 from the control interval $\Delta t0$ to the control interval $\Delta t1$.

Specifically, in the case of the present embodiment, a timing adjustment of the control interval $\Delta t1$ for the word line driver unit 230 driving the word line 231 is carried out by the timing adjustment unit 240 outputting the timing control signals 241 and 242 to the word line driver unit 230 and bit line driver unit 220. The value of the control interval $\Delta t1$ can be determined by the timing adjustment unit 240 according to the temperature, measured using a thermal sensor 244 near the pixel array 210.

That is, the threshold value $V_T$ of the FET (i.e., the gate transistors 215c and 216c) of each pixel unit 211 driven by the word line 231 varies with the temperature, as shown in FIG. 12. Therefore the control intervals $\Delta t1$ corresponding to the threshold values $V_T$ at various temperatures are stored in a lookup table 240a (LUT), such as nonvolatile memory, of the timing adjustment unit 240, and a control interval $\Delta t1$ corresponding to the temperature near the pixel array 210 detected by the thermal sensor 244 is read and used.

Figure 15:
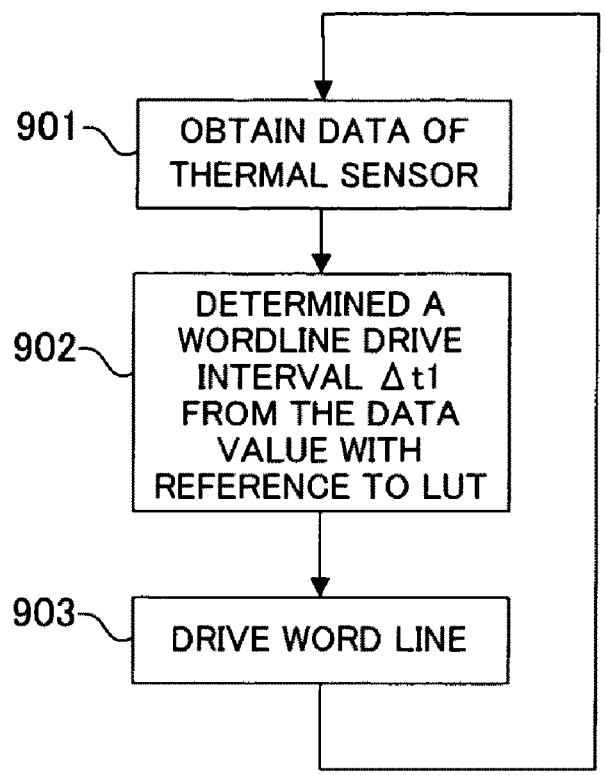
FIG. 15 is a flow chart showing an exemplary operation of a timing adjustment unit, in the case of using a thermal sensor, according to a preferred embodiment of the present invention.

FIG. 15 is a flow chart showing an exemplary operation of the timing adjustment unit 240 when using the thermal sensor 244.

The timing adjustment unit 240 obtains the temperature data of the pixel array 210 from a timing control signal 241 (step 901) and determines a control interval $\Delta t1$ by referring to the lookup table 240a on the basis of the temperature data (step 902). It then drives a plurality of word lines 231 in sequence by inputting the control interval $\Delta t1$ to the word line driver unit 230 and bit line driver unit 220 as the timing control signal 241 and timing control signal 242, respectively (step 903).

Figure 16:
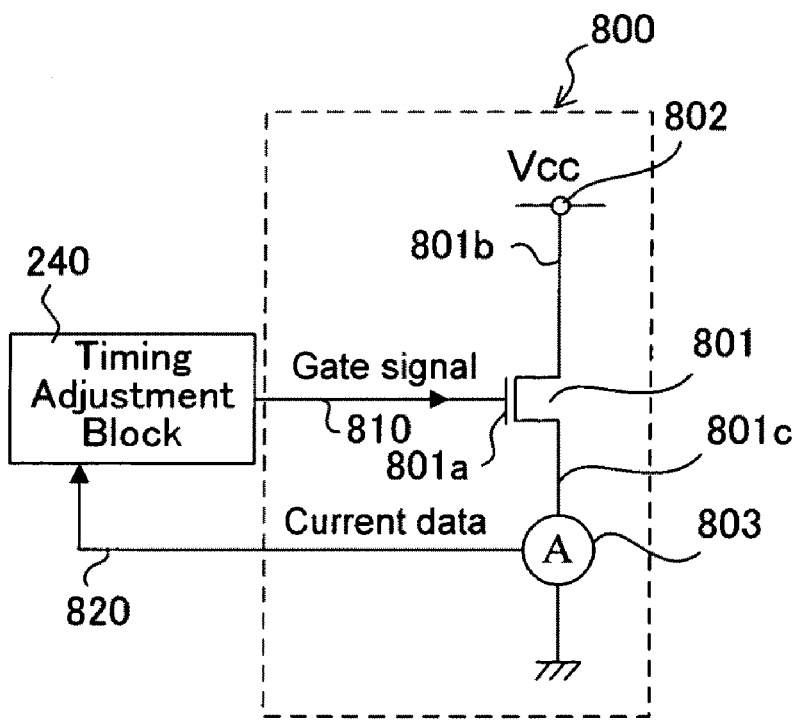
FIG. 16 is a functional circuit diagram showing an exemplary configuration of a timing adjustment amount detection circuit used for determining a control interval at a timing adjustment unit according to a preferred embodiment of the present invention.
Figure 17:
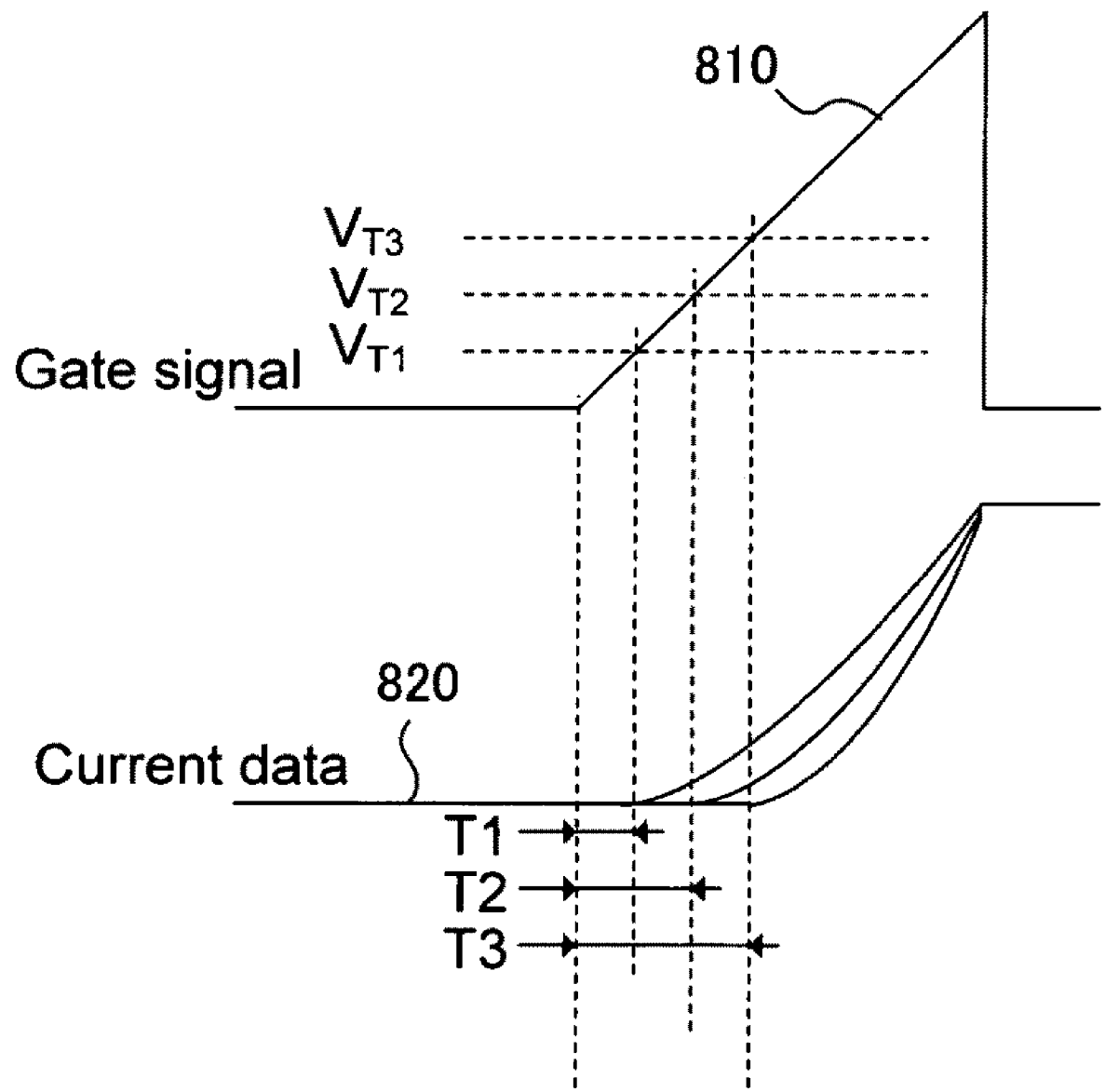
FIG. 17 is a chart showing the action of the exemplary configuration shown in FIG. 16.
Figure 18:
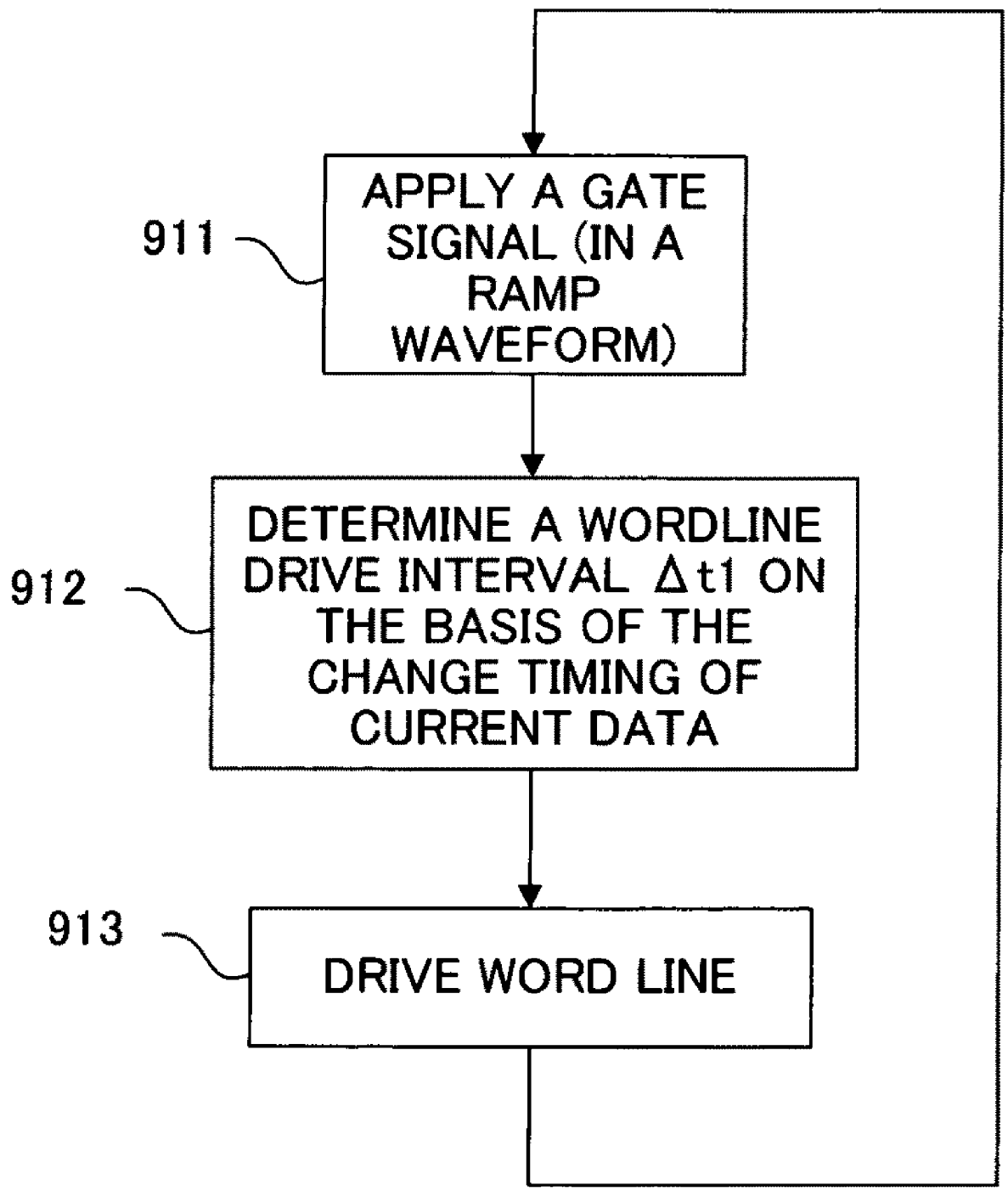
FIG. 18 is a flow chart showing an exemplary operation at the timing adjustment unit according to a preferred embodiment of the present invention when a timing adjustment amount detection circuit is used.

FIG. 16 is a functional circuit diagram showing an exemplary configuration of a timing adjustment amount detection circuit used for determining a control interval at a timing adjustment unit. FIG. 17 is a chart showing the operation of the circuit. Further, FIG. 18 is a flow chart showing an exemplary operation at the timing adjustment unit when a timing adjustment amount detection circuit is used.

FIG. 8 exemplifies a system configuration using the thermal sensor for determining a control interval $\Delta t1$, whereas FIG. 16 exemplifies using a timing adjustment amount detection circuit 800 comprising the same FET as the gate transistors 215c and 216c, which are used for each pixel unit 211 of the pixel array 210.

The timing adjustment amount detection circuit 800 is configured such that a gate signal 810 in a ramp (i.e., inclined) waveform sent from the timing adjustment unit 240 is inputted to the gate electrode 801a of the FET 801, and such that a power supply line 802, that is the same level as the H level of the bit line 221 of the pixel unit 211, is connected to the drain 801b of the FET 801, while electric current detection means 803 is connected to the source 801c of the FET 801.

The detection value (i.e., the current data 820=the current ID) of the electric current detection means 803 is monitored by the timing adjustment unit 240.

This configuration determines the operation timings (e.g., T1 through T3) of the FET 801, in accordance with the period between a ramp start of the gate signal 810 and the outputting of the detection value of the current data 820 of the electric current detection means 803, as indicated by the waveform shown in FIG. 17. Thereby, it is possible to determine the control interval $\Delta t1$ of the word line 231 on the basis of values, such as the timing T1 through T3, and determine the applicable gray scale in the case of a PWM control.

"VT1 through VT3" shown in FIG. 17 are operation threshold value voltages, according to the temperature of the FET, shown in FIG. 12. Specifically, the detected operation timings (e.g., T1 through T3) of the FET 801 changes with the environmental temperature of a spatial light modulator so that the timing adjustment unit 240 is capable of determining an appropriate control interval $\Delta t1$ with the timing adjustment amount detection circuit 800, in accordance with the change in temperature.

In FIG. 18, the timing adjustment unit 240 applies a gate signal 810 (in a Ramp waveform) to the gate electrode 801a of the FET 801 of the timing adjustment amount detection circuit 800 (step 911), determines a control interval $\Delta t1$ on the basis of the change timing (e.g., T1 through T3) of the electric current data from the electric current detection means 803 when the signal is applied (step 912), and drives a plurality of word lines 231 in sequence by inputting the aforementioned control interval $\Delta t1$ to the word line driver unit 230 and bit line driver unit 220 as the timing control signals 241 and 242, respectively (step 913).

Alternately, the value of the control interval $\Delta t1$ at the timing adjustment unit 240 may be set at a specific fixed value by an adjustment operation when the device is assembled in production. The fixed value of the control interval $\Delta t1$ in this case is set allowing for the most extreme usage environmental temperature of a spatial light modulator 200.

Further, the timing adjustment unit 240 may adjust the control interval $\Delta t1$ on the basis of the number of display gray scale that is determined by a video signal, such as externally inputted binary and analog video signal 400 and/or by the internal process of a controller, or on the basis of the number of pixel units 211 of the pixel array 210 or the number of ROW lines thereof.

Figure 19:
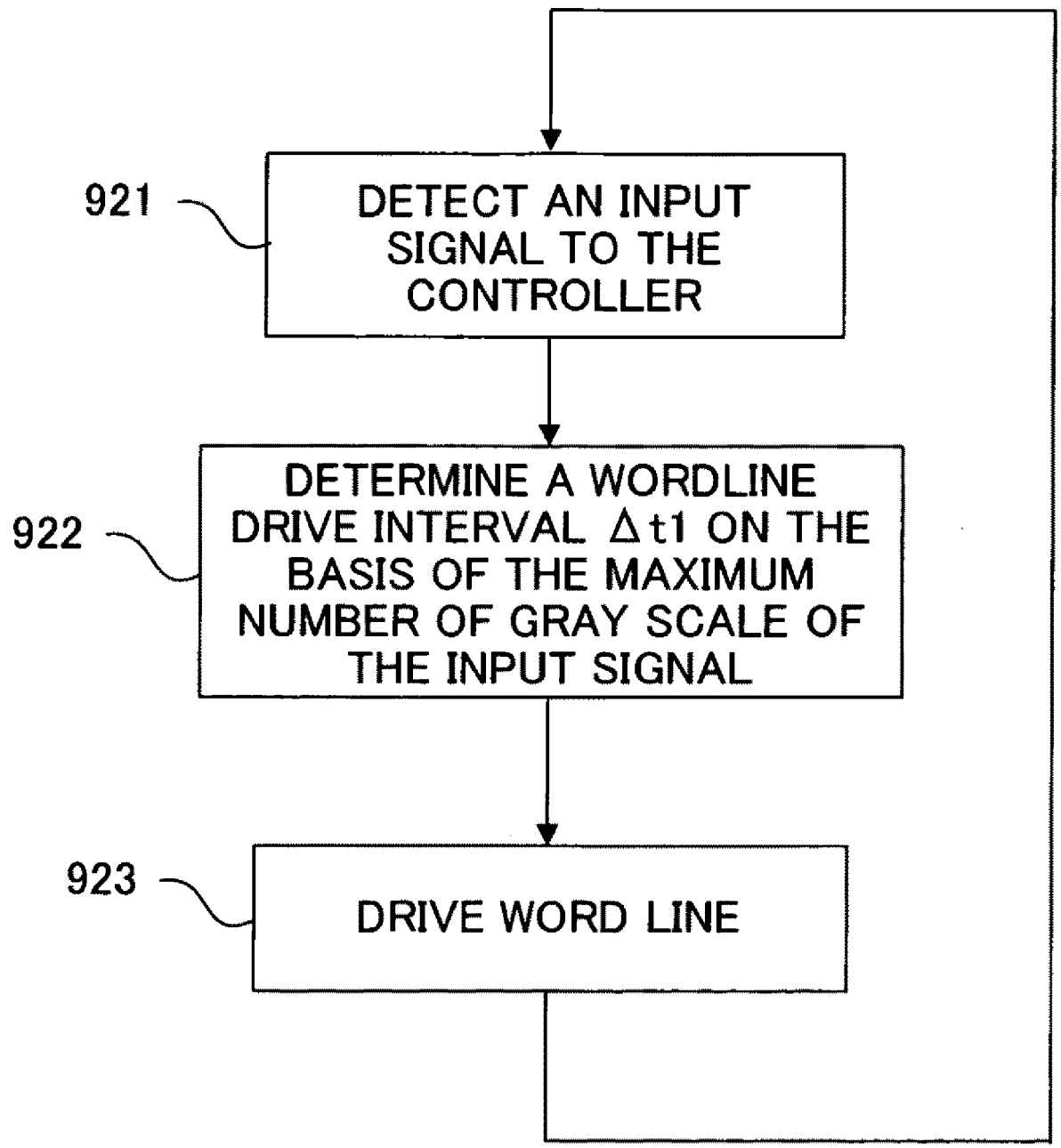
FIG. 19 is a flow chart showing an exemplary method for adjusting a control interval on the basis of the number of display gray scale determined by an externally input video signal at a timing adjustment unit according to a preferred embodiment of the present invention.

FIG. 19 is a flow chart showing an exemplary method for adjusting a control interval Δt1 on the basis of the number of display gray scale determined by an externally inputted video signal at the timing adjustment unit 240, according to the present embodiment.

When a binary or analog video signal 400 is inputted to the control apparatus 300 (step 921), the timing adjustment unit 240 determines the control interval Δt1 on the basis of the maximum number of display gray scale (step 922) of the binary video signal 400 or the internal process of the controller, and controls the driving of the word line 231 by outputting the control interval Δt1 to the word line driver unit 230 and bit line driver unit 220 as the timing control signals 241 and 242, respectively (step 923).

Figure 20:
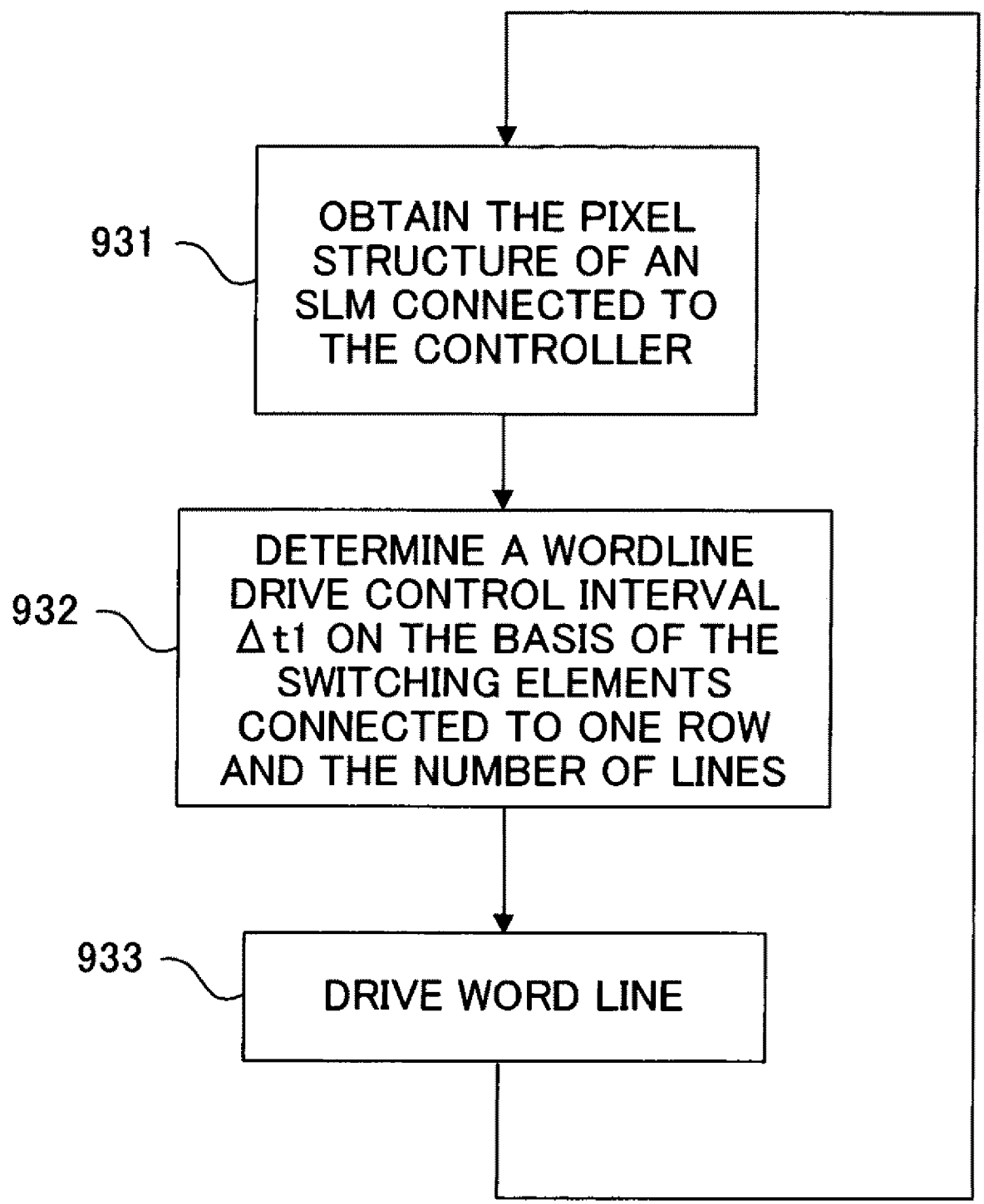
FIG. 20 is a flow chart showing an exemplary method for adjusting a control interval on the basis of the pixel structure of a pixel array at a timing adjustment unit according to a preferred embodiment of the present invention.

FIG. 20 is a flow chart showing an exemplary method for adjusting a control interval Δt1 on the basis of the pixel structure of the pixel array 210 at the timing adjustment unit 240, according to the present embodiment.

The timing adjustment unit 240 obtains information of the pixel structure, such as the number of ROW lines, the number of pixel units lined up on each ROW line, and the number of switching elements (i.e., the gate transistors 215c and 216c) equipped for each pixel unit 211, of the spatial light modulator 200 connected to the control apparatus (step 931).

Then, the timing adjustment unit 240 determines a control interval Δt1 on the basis of the information of the pixel structure (step 932), outputting the control interval Δt1 to the word line driver unit 230 and bit line driver unit 220 as timing control signals 241 and 242, respectively, and controlling the driving of the word line 231 (step 933).

When the spatial light modulator 200 performs a gray scale representation by means of PWM, and when the frame sequence display of the colors red (R), green (G) and blue (B) is displayed in one frame (60 Hz=1.666666 milliseconds (msec)) of an input video signal, the shortest color period is about 30% of one frame (considering the color ratio and blanking) and is actually 5 msec (=1.666666 [msec]*30%).

In the period of 5 msec, it is necessary to secure a drive speed for ROW lines that equals the number of ROW lines multiplied by the number of gray scale levels.

Assuming that the display image is a full HD (with the number of ROW lines=1080), with the drive speed of one ROW line being 20 nanoseconds (nsec), one ROW line allows 231 times of access. Therefore, simply stated, a 231-level gray scale is enabled.

Assuming that the display image is an HD (with the number of ROW lines=720), with the drive speed of one ROW line being 30 nsec, one ROW line allows 231 times of access, and likewise, a 231-level gray scale is enabled.

Further, in the case of a spatial light modulator 200 being a DMD, as in the present embodiment, when an intermediate oscillation technique (which is described later) is applied to the mirror 212, the gray scale will be improved by a factor of five, and a 1155-level gray scale, equivalent to a 10-bit, will be enabled.

More specifically, when a spatial light modulator 200 performs a gray scale representation by means of PWM, it is possible to apply a timing adjustment using the above described control interval Δt1 to only an LSB drive of the PWM.

Figure 21:
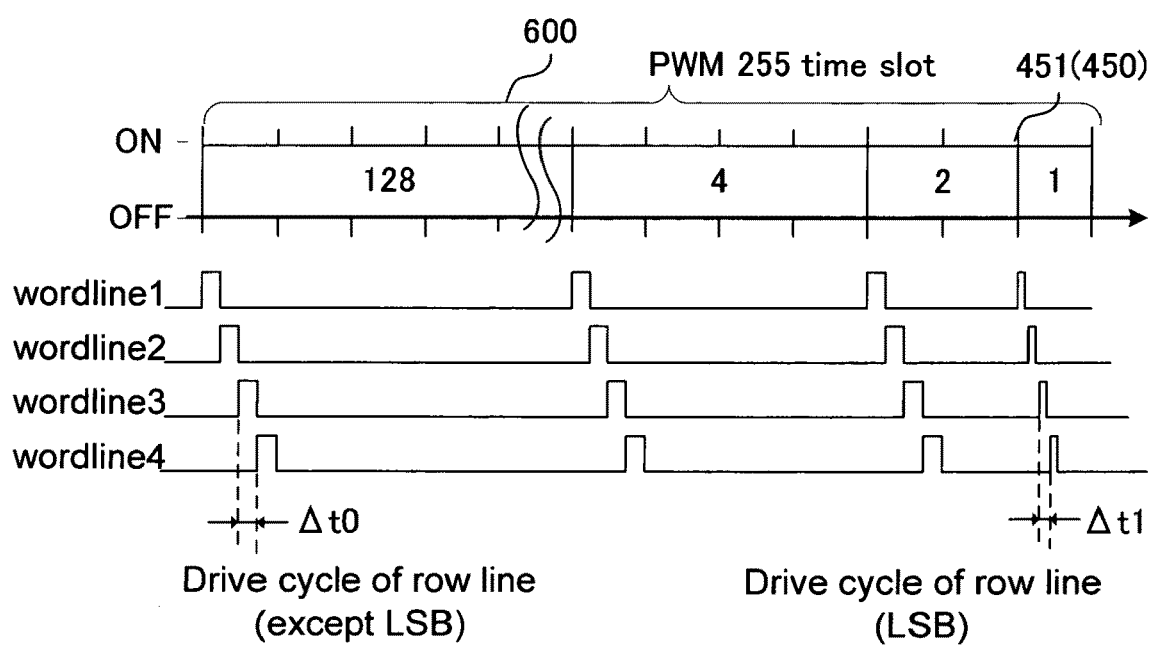
FIG. 21 is a timing diagram showing an exemplary case when a gray scale representation is performed by means of PWM at a spatial light modulator according to a preferred embodiment of the present invention.

FIG. 21 is a timing diagram showing an exemplary case when a gray scale representation is performed by means of PWM at the spatial light modulator 200, according to the present embodiment.

In the example of FIG. 21, the display period of one frame is divided into 255 time slots and controlled for an 8-bit gray scale representation.

When performing a gray scale representation by means of a binary PWM, the higher the bit, the number of slots per bit increases, and therefore, the timing limit is not strict, whereas the control interval for the word line 231 on the last slot corresponding to the LSB is the shortest. Therefore, the control interval Δt1 is used only for the drive control of the word line 231 corresponding to the LSB of the PWM, while a common control interval Δt0 is used for driving the other upper bits.

As such, the improvement in the access speed of a ROW line (i.e., the word line 231) makes it possible to increase the number of gray scale levels for the spatial light modulator 200 constituted by digital micromirror devices (DMD), according to the present embodiment, performing a gray scale display, for example, by means of a pulse width modulation (PWM).

It is also possible to decrease the number of auxiliary circuits and I/Os for a spatial light modulator (e.g., an LCD) performing a gray scale display in analog.

Meanwhile, for the OFF capacitor 215b and ON capacitor 216b comprised in each pixel unit 211, relatively large capacitances need to be secured in order to perform an accurate ON/OFF control for the mirror 212, since there is a decrease in the electrical charge due to a leakage current, et cetera. The improvement in the access speed of the word line 231 to each pixel unit 211, as in the case of the present embodiment, makes it possible to decrease the capacitances of the OFF capacitor 215b and ON capacitor 216b comprised in each pixel unit 211 and therefore is effective when decreasing the size of the spatial light modulator 200 and/or increasing the density of the pixel units 211 (i.e., increasing the number of pixels to be arrayed within a certain chip size).

Embodiment 2

Figure 22:
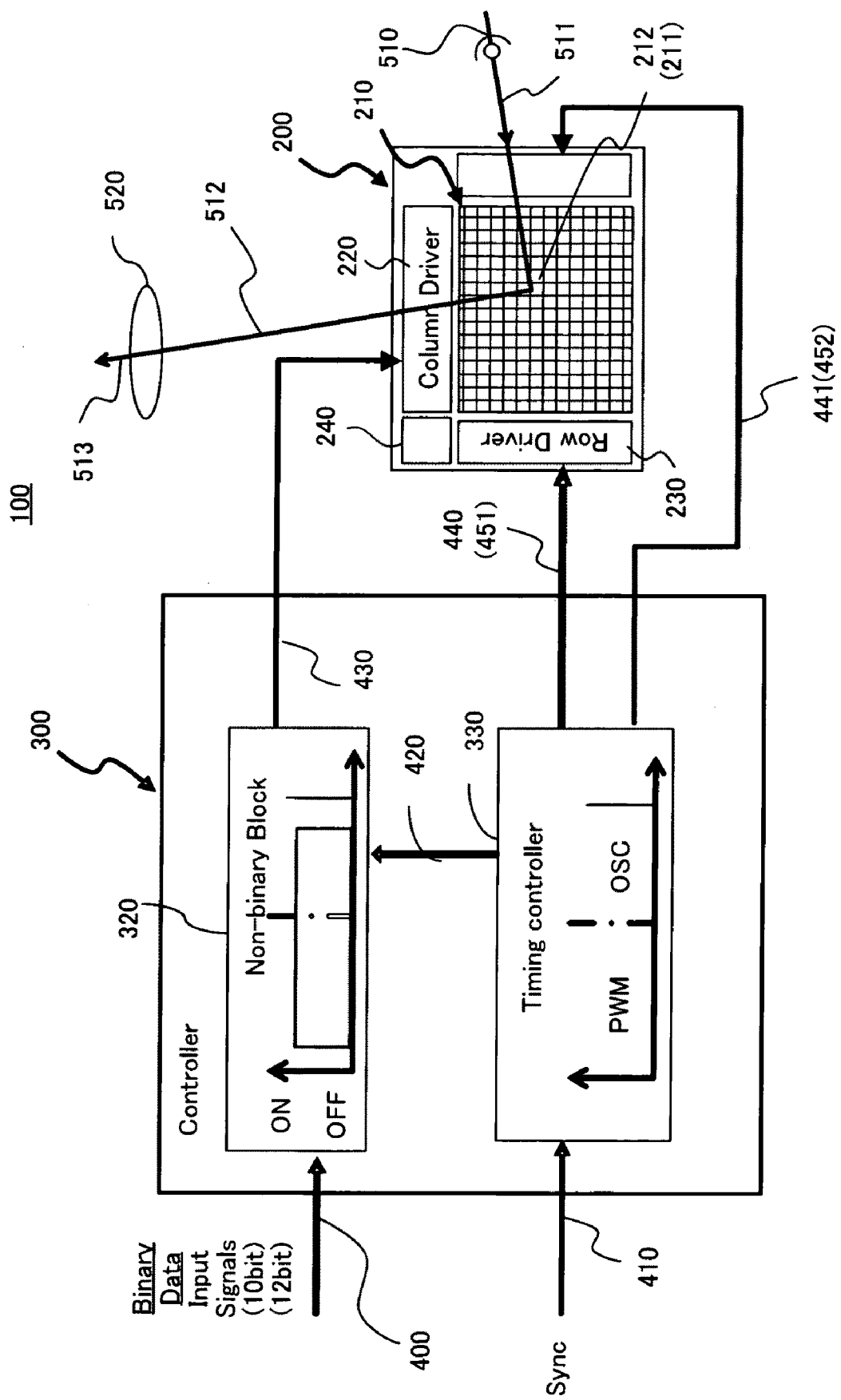
FIG. 22 is a functional block diagram showing an exemplary configuration of a display system according to a preferred embodiment of the present invention.
Figure 23:
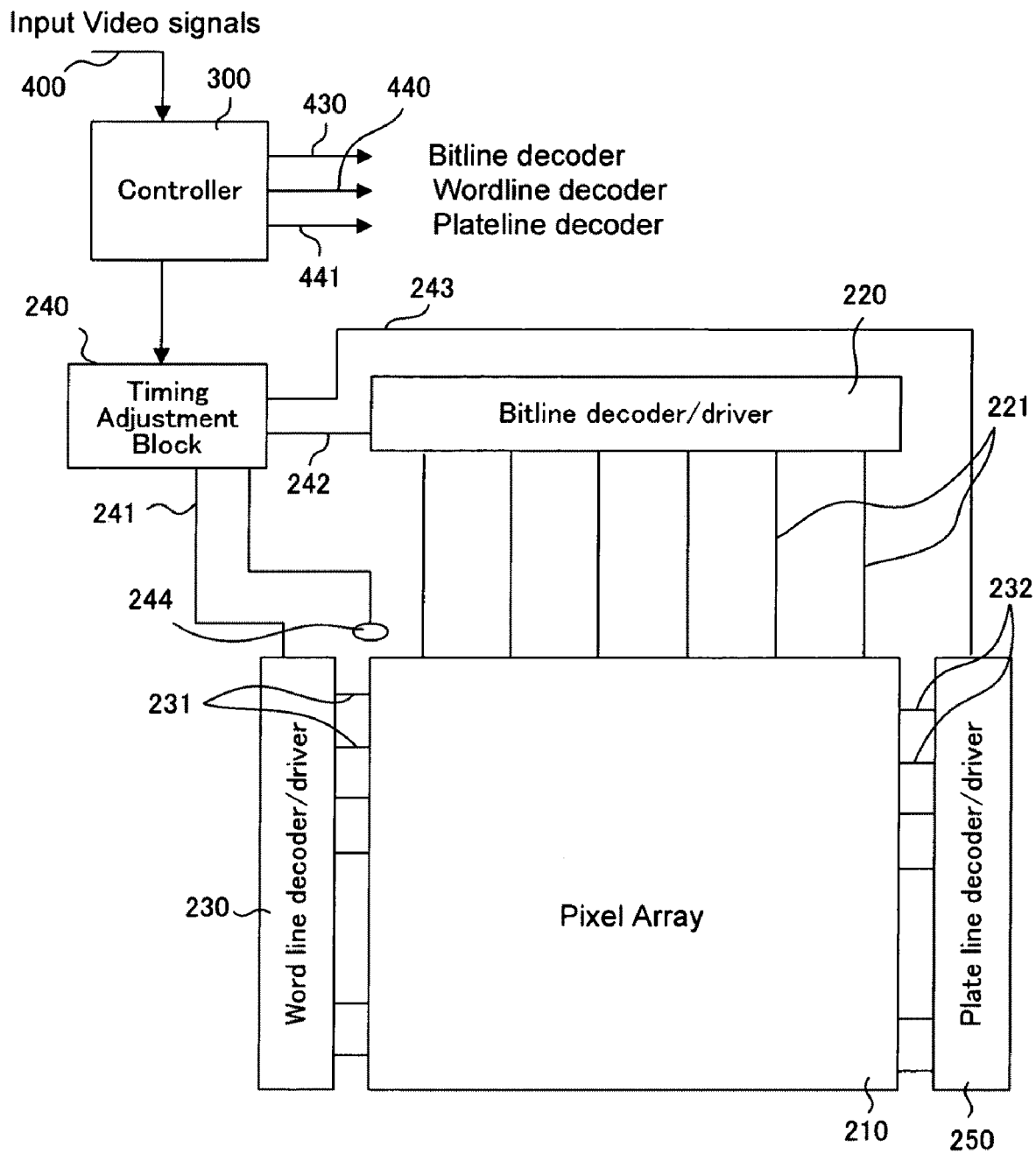
FIG. 23 is a functional circuit diagram showing the configuration of a spatial light modulator of a display system according to a preferred embodiment of the present invention.

FIG. 22 is a functional block diagram showing an exemplary configuration of a display system according to another preferred embodiment of the present invention; FIG. 23 is a functional circuit diagram showing the configuration of the spatial light modulator; and FIG. 24 is a functional circuit diagram showing an exemplary configuration of a pixel unit constituting a pixel array of a spatial light modulator according to a preferred embodiment of the present invention.

The present embodiment is different from the above described embodiment 1 in that the present embodiment is configured to further equip each pixel unit 211 with a second ON electrode 235 (i.e., an electrode D), with a plate line 232 that is connected to the second ON electrode 235 and with a plate line driver unit 250.

In this configuration, the plate line driver unit 250 is also controlled by the timing adjustment unit 240 with a timing control signal 243, as exemplified in FIG. 23. Specifically, the timing adjustment (i.e., the control interval Δt1) for the word line 231 is enabled by the timing adjustment unit 240, as exemplified in FIG. 23.

The adjustment of the control interval Δt1, enabled by the timing adjustment unit 240, is performed by the number of display gray scales determined by a video signal, such as an externally inputted binary or analog video signal 400 and by the adjustment in accordance with the temperature surrounding the pixel array 210, in addition to the adjustment during the production process. The amount of such adjustment also depends on the number of pixels and the number of lines.

The present embodiment 2 is also configured to adjust the control interval Δt1 not only for the word line 231 and bit line 221, but also for the plate line 232, as described above.

Figure 25:
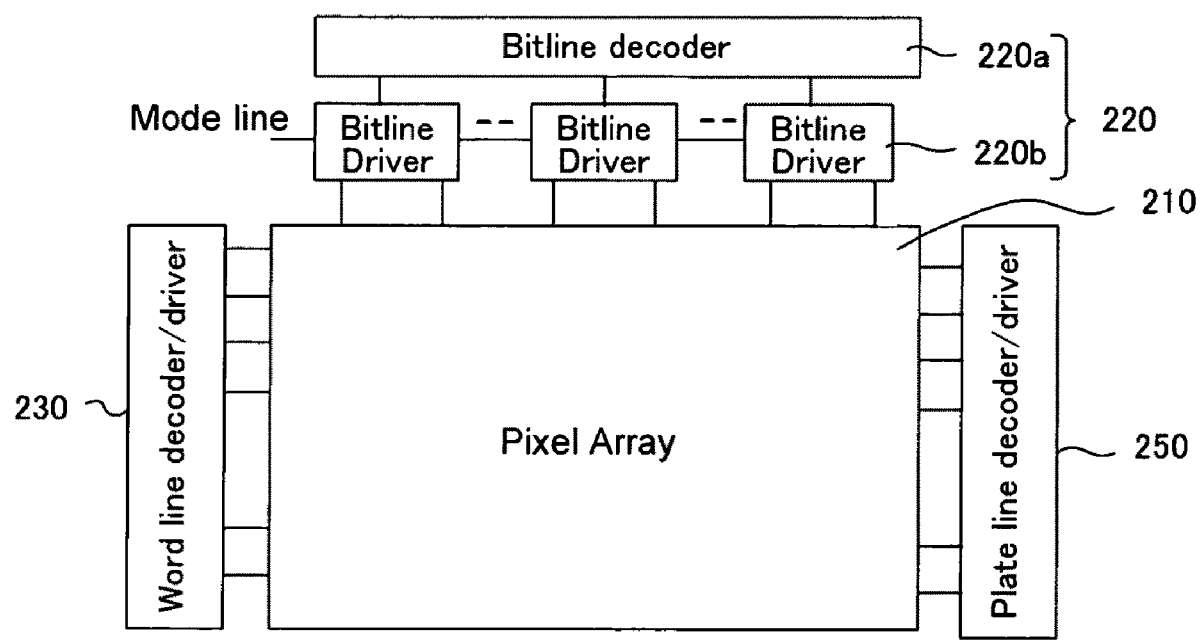
FIG. 25 is a functional circuit diagram showing the layout of a bit line driver unit, of a word line driver unit and of a plate line driver unit, all of which are used for driving a pixel array that is constituted by the pixel unit configured as exemplified in FIG. 24.

FIG. 25 is a functional circuit diagram showing the layout of the bit line driver unit 220, word line driver unit 230 and plate line driver unit 250, all of which are used for driving a pixel array 210 in the pixel unit 211 configured, as shown in FIG. 24.

The present embodiment 2 is configured to have the timing adjustment unit 240 control a control interval Δt1, creating a margin in the operation of the word line driver unit 230, thereby making it possible to place the plate line driver unit 250 on the opposite side of the pixel array 210 from the bit line driver unit 220.

Figure 26:
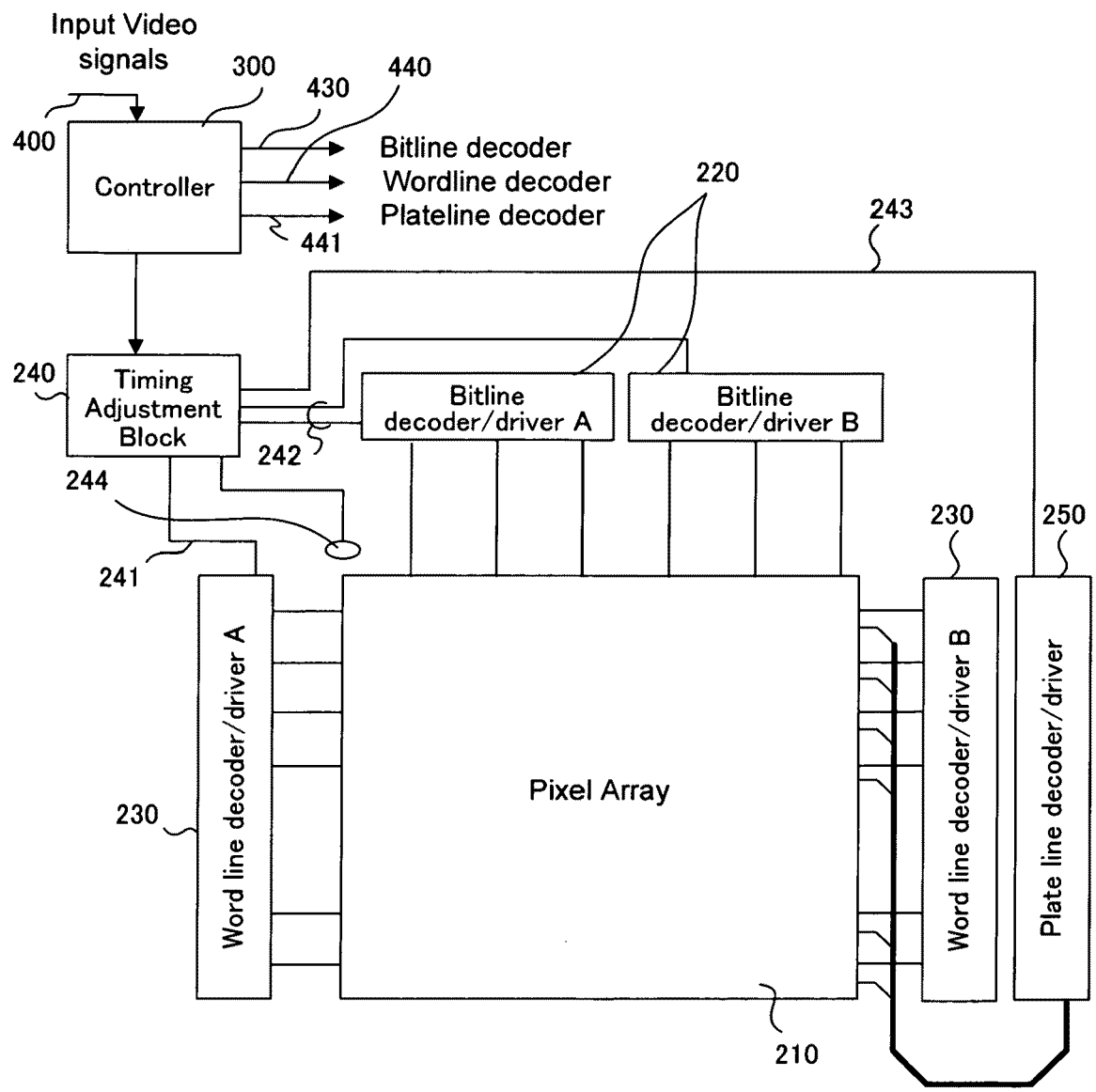
FIG. 26 is a functional circuit diagram showing an exemplary modification of the layout of a bit line driver unit, of a word line driver unit and of a plate line driver unit according to another preferred embodiment of the present invention.

FIG. 26 is a functional circuit diagram showing an exemplary modification of the layout of the bit line driver unit 220, word line driver unit 230 and plate line driver unit 250 according to the present embodiment 2.

If the drive speed is not high enough, even with the timing adjustment unit 240 performing a timing adjustment of the control interval Δt1, a plurality of bit line driver units 220 and of word line driver units 230 are equipped to share the control for the pixel unit 211 of the pixel array 210.

The exemplary case shown in FIG. 26 is configured to divide the plurality of pixel units of the pixel array 210 into two equal groups, on the left and right, and to control the group on the left side with a word line driver unit 230 (i.e., a word line driver unit A) and a bit line driver unit 220 (i.e., bit line driver unit A) the group on the right side with a word line driver unit 230 (i.e., a word line driver unit B) and a bit line driver unit 220 (i.e., bit line driver unit B).

In this configuration, the plate line driver unit 250 is common to the left and right groups.

The combination of the timing adjustment unit 240 controlling a control interval Δt1 and a plurality of bit line driver units 220 and word line driver units 230, as described above, makes it possible to control a higher number of gray scales.

Figure 26A:
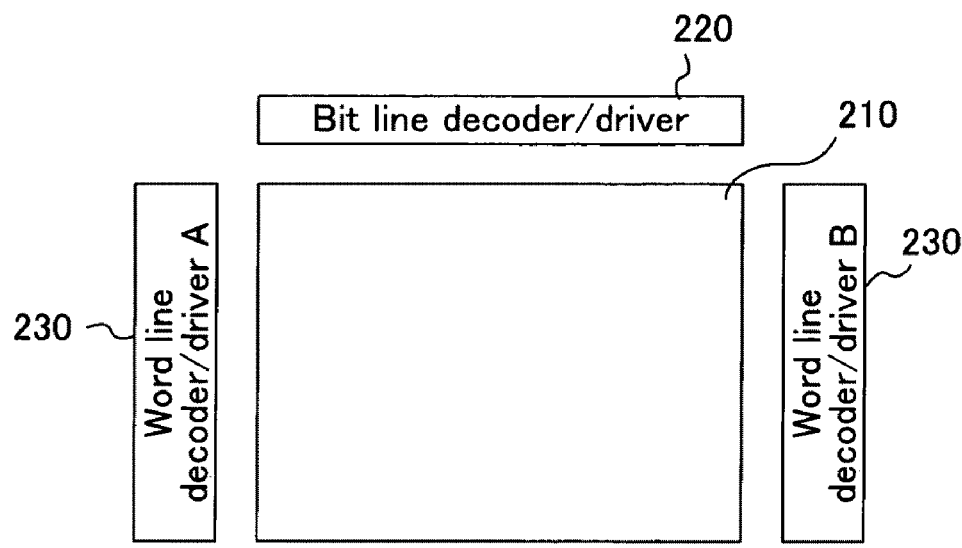
FIG. 26A is a functional circuit diagram showing an exemplary modification of the layout of a bit line driver unit and of a word line driver unit in a spatial light modulator according to a preferred embodiment of the present invention.
Figure 26B:
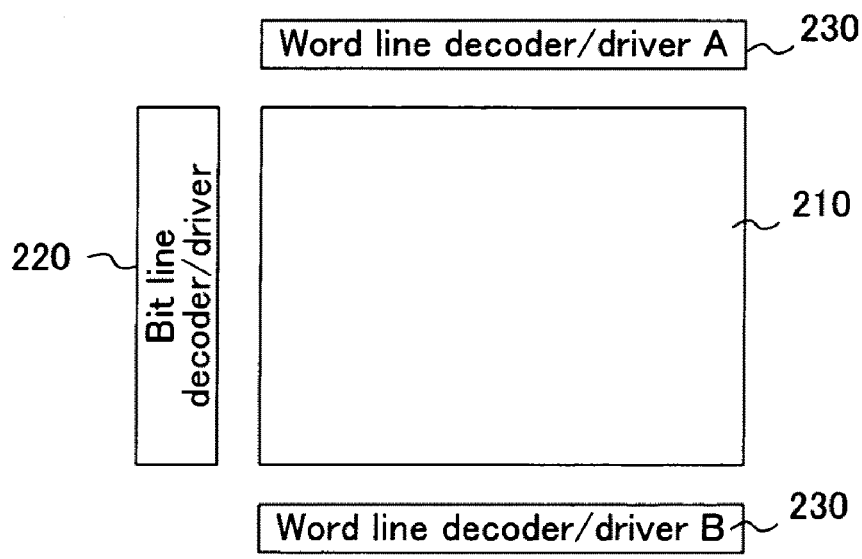
FIG. 26B is a functional circuit diagram showing an exemplary modification of the layout of a bit line driver unit and of a word line driver unit in a spatial light modulator according to a preferred embodiment of the present invention.

FIGS. 26A and 26B are functional circuit diagrams showing an exemplary modification of the layout of the bit line driver unit 220 and word line driver unit 230 in a spatial light modulator 200, according to the present embodiment.

It is possible to place the bit line driver unit 220 horizontally above the pixel array 210 and a plurality of word line driver units 230 (i.e., the word line driver units A and B) vertically, on the two sides of the rectangular pixel array 210.

Figure 27:
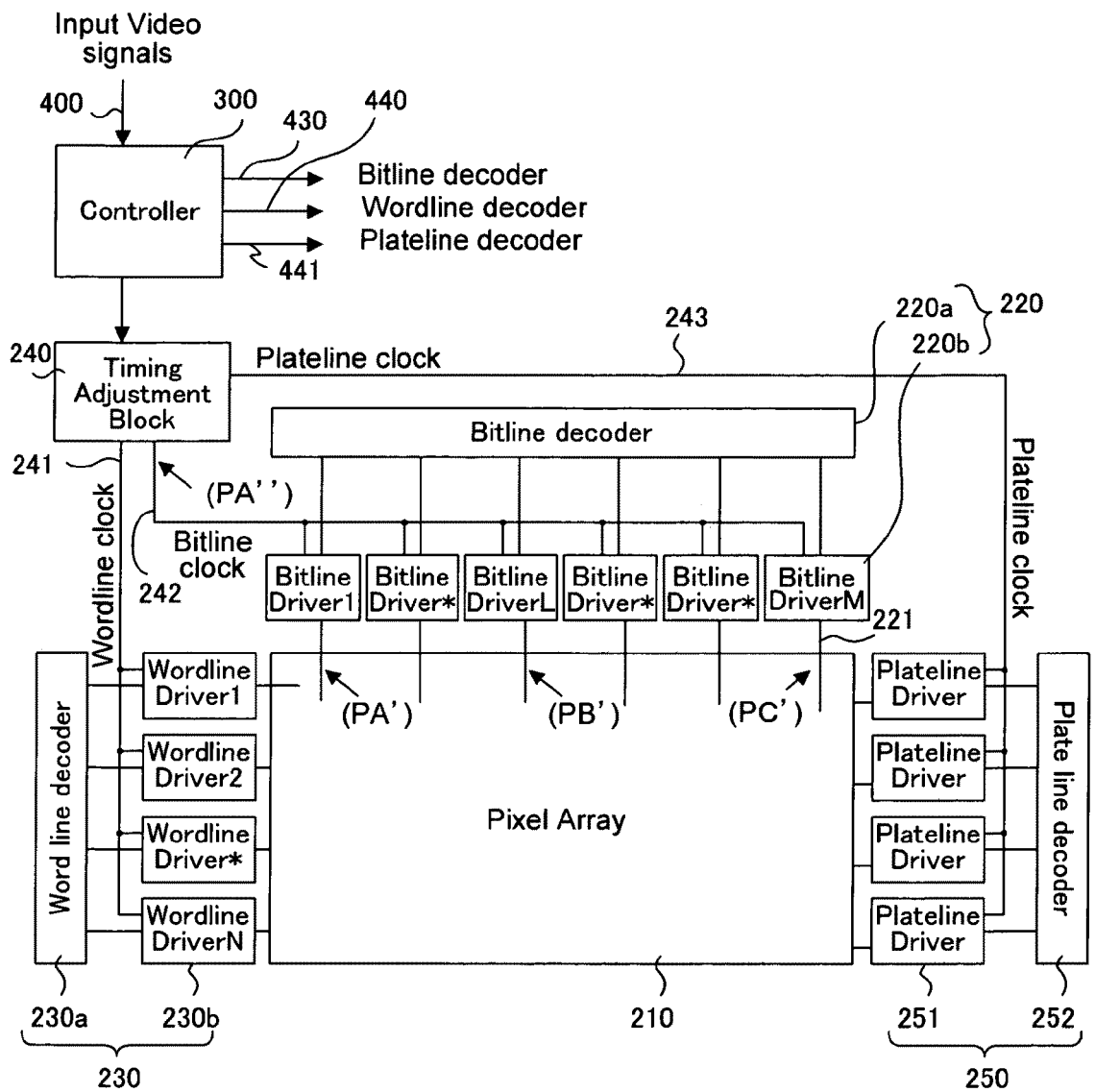
FIG. 27 is a functional circuit diagram showing an exemplary modification of the layout of a bit line driver unit and of a word line driver unit in a spatial light modulator according to a preferred embodiment of the present invention.
Figure 28:
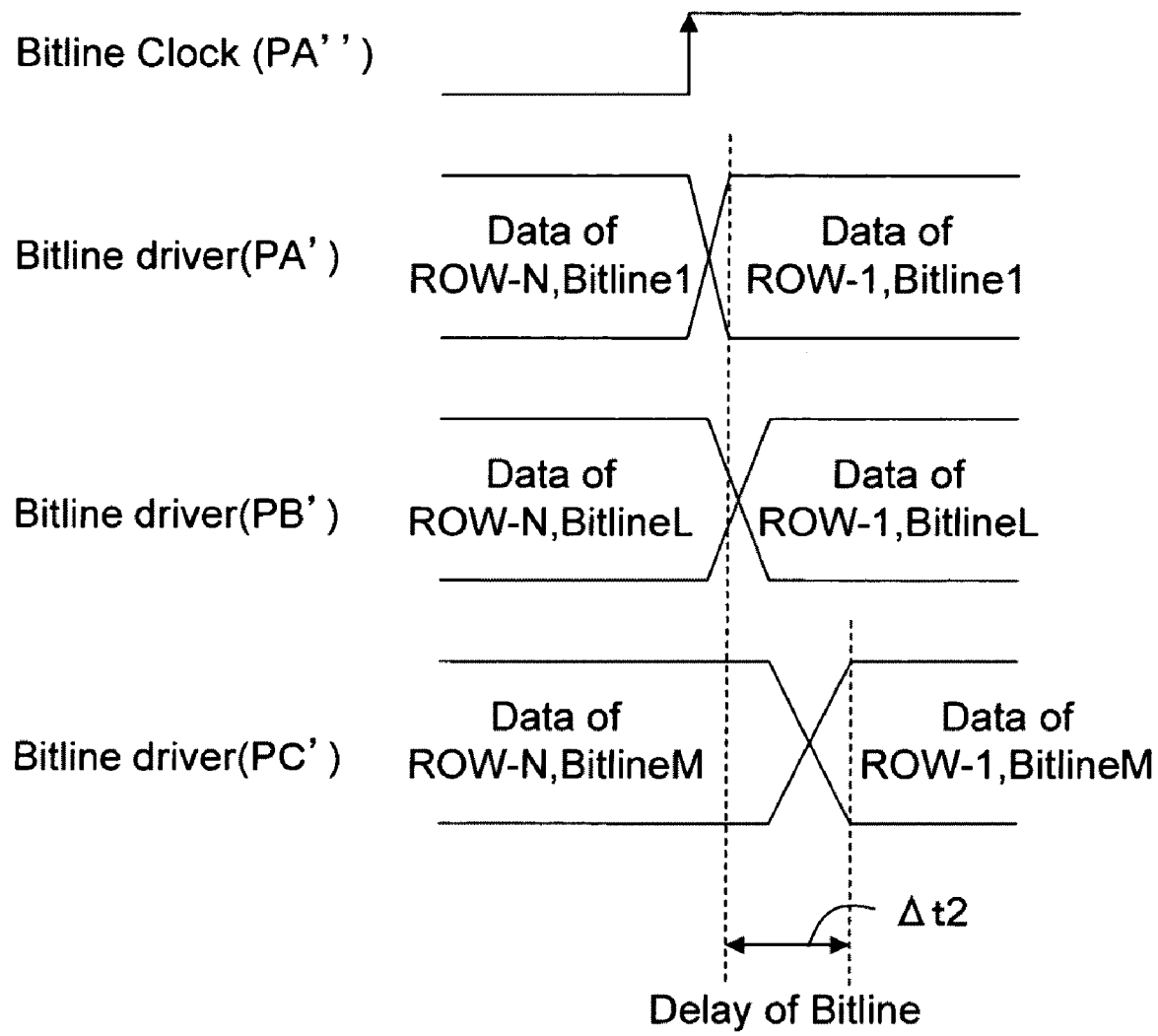
FIG. 28 is a timing diagram showing the action of the exemplary configuration shown in FIG. 27.

FIG. 27 is a functional circuit diagram showing an exemplary modification of the layout of a bit line driver unit 220 and word line driver unit 230 in a spatial light modulator, according to the present embodiment; FIG. 28 is a timing diagram showing the operations of the configuration.

According to the exemplary modification, the bit line driver 220b sets the output of the bit line decoder 220a to the bit line 221 synchronously with a bit line clock (i.e., a timing control signal 242) that is outputted from the timing adjustment unit 240.

The present embodiment is configured with a wiring configuration of the bit line clock (i.e., the timing control signal 242) is placed for each bit line driver 220b originating from the side (i.e., the left side in the example of FIG. 27) where the word line driver 230b of the word line driver unit 230 synchronizes the operations with a high synchronization accuracy. The timing diagram shown in FIG. 28 exemplifies the changes in the output of a plurality of bit line drivers 220b of FIG. 27.

In the output of the bit line clock (i.e., a timing control signal 242) from the timing adjustment unit 240, there is a delay Δt2, as in the case of the word line 231, so that the output timing from the bit line driver 220b is different depending on the position within the pixel array 210, such as the pixel positions PA', PB' and PC', as shown in FIG. 28.

The word line driver 230b changing over the control signals to the word line 231 needs to also be synchronized with the bit line driver 220b, and accordingly, the wiring to each bit line driver 220b, originating from the side on which the word line driver 230b is placed (i.e., the position PA" in FIG. 27) as shown in FIG. 27, cancels the delay Δt2 of the timing control signal 242 by the delay along the length (i.e., in the left and right directions) of the word line 231 and therefore eliminates the need to wait for the delay Δt2 (i.e., Delay of Bitline) before changing over the word lines 231.

Figure 29:
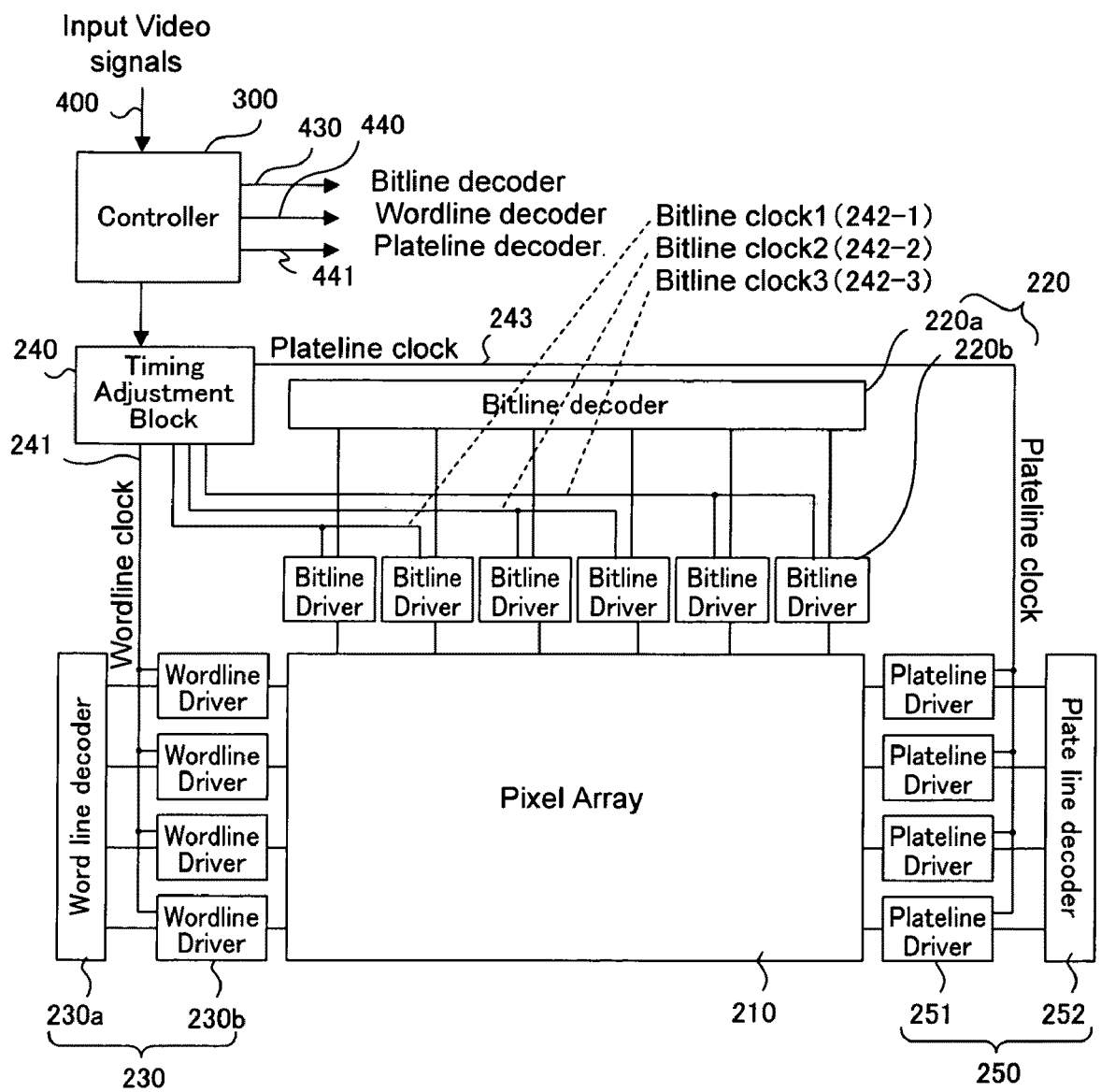
FIG. 29 is a functional circuit diagram showing an exemplary modification of the layout of the bit line driver unit and word line driver unit in a spatial light modulator according to a preferred embodiment of the present invention shown in FIG. 27.

FIG. 29 is a functional circuit showing an exemplary modification of the layout of the bit line driver unit 220 and word line driver unit 230 in a spatial light modulator, according to the present embodiment shown in FIG. 27.

The exemplary case shown in FIG. 29 is configured to sequentially group (i.e., into two groups in this case), starting from the left side of the pixel array 210, a plurality of bit line drivers 220b constituting the bit line driver unit 220, and equipping a plurality of different bit line clocks, such as timing control signals 242-1, 242-2 and 242-3, from the timing adjustment unit 240 for each group of the bit line driver 220b, and thereby a bit line drivers 220b corresponding to the signal delay along the length (i.e., in the left and right directions) of the word line 231 is driven.

The configuring as exemplified in FIG. 29 makes it possible to enable each bit line driver 220b to supply the pixel unit 211 with accurate bit data corresponding to the delay in the word line 231.

The following is a description of the pixel unit 211 that constitutes the pixel array 210 of the spatial light modulator 200, according to the present embodiment with reference to FIG. 24.

In contrast to the pixel unit 211 exemplified in FIG. 4, in which one pixel is equipped with one mirror, two electrode and two DRAM-structured memory cells, the present embodiment 1 is configured to add plate lines 232 (PL-n; where "n" is the number of ROW lines) to the respective ROW lines and to place the second ON electrode 234 (i.e., the electrode D) connected to the plate lines 232, close to the ON electrode 216.

The second ON electrode 235 is equipped for generating a high number of gray scale levels and for intermediate oscillation, as described later. While the second ON electrode 235 is placed on the ON side, the electrode D may be placed on the OFF electrode 215 side.

In each pixel unit 211, in the present embodiment, the memory cell on one side, the memory for controlling the mirror 212, is a simple DRAM-structured requiring only one transistor. Therefore, it is possible to prevent the structure of the memory cell from becoming larger, even with the addition of the plate line 232 and second ON electrode 235. Therefore it is possible achieve a display with high definition by arraying a large number of pixel units 211 within a pixel array 210 of a limited size.

Further, the addition of the plate line 232 and second ON electrode 235 makes it possible to drastically expand a gray scale representation, as described later.

In other words, it is possible to obtain both a high definition and a high degree of gray scale for a projection image in a projection technique employing a spatial light modulator, such as the spatial light modulator 200.

Figure 30:
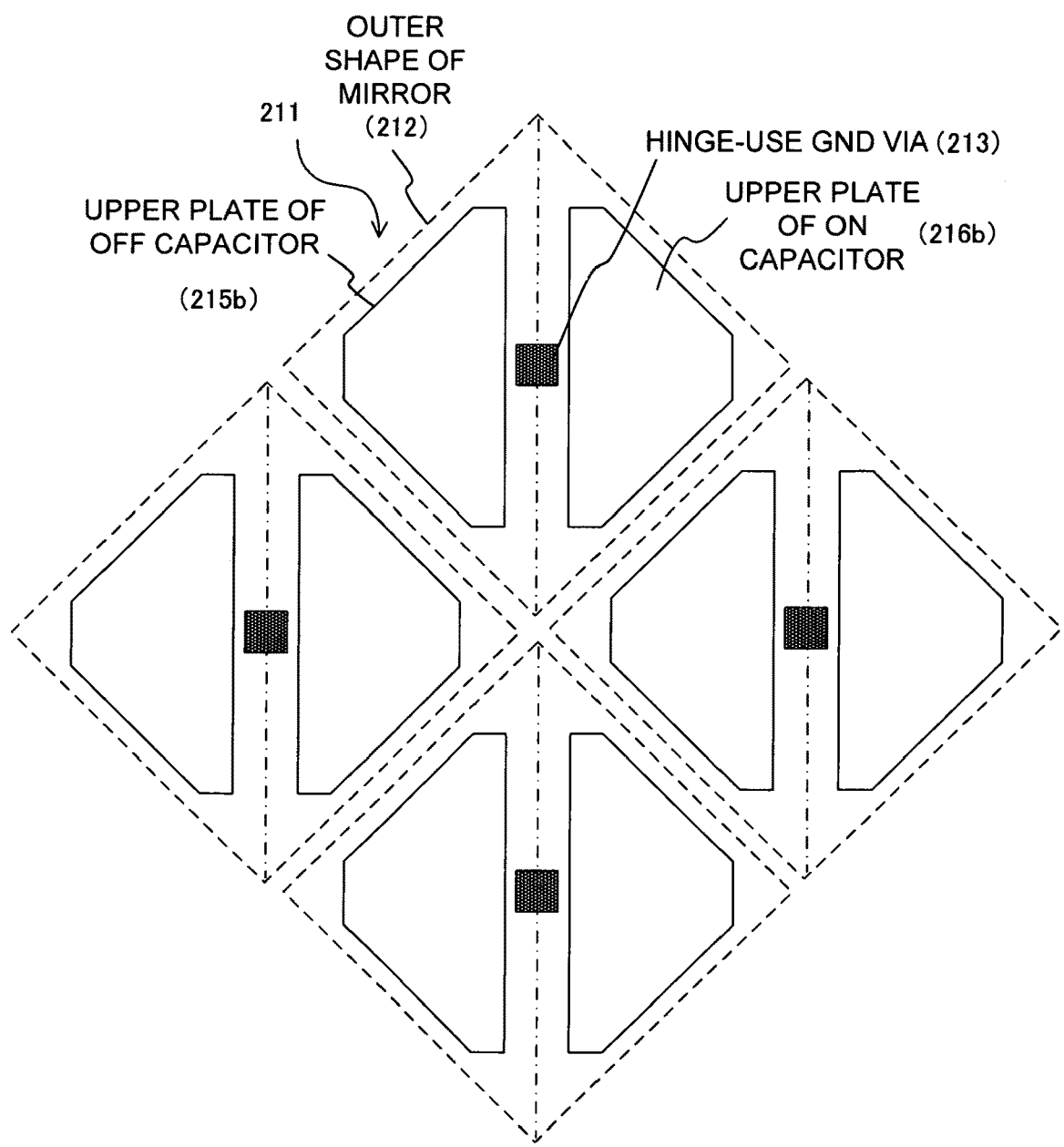
FIG. 30 is a top view diagram depicting the layout of the capacitor used in the exemplary modification of a pixel unit of a display system according to a preferred embodiment of the present invention.

FIG. 30 is a top view diagram showing an exemplary layout of the OFF capacitor 215b and ON capacitor 216b of the pixel unit 211 used in the exemplary configuration shown in FIG.

24. Specifically, FIG. 30 shows the formation of the layer of the OFF capacitor 215b and ON capacitor 216b as viewed from the top of the mirror 212.

The OFF capacitor 215b and ON capacitor 216b are positioned in the regions obtained by dividing the placement region of the rectangular pixel unit 211 into two parts in the diagonal direction.

Figure 31A:
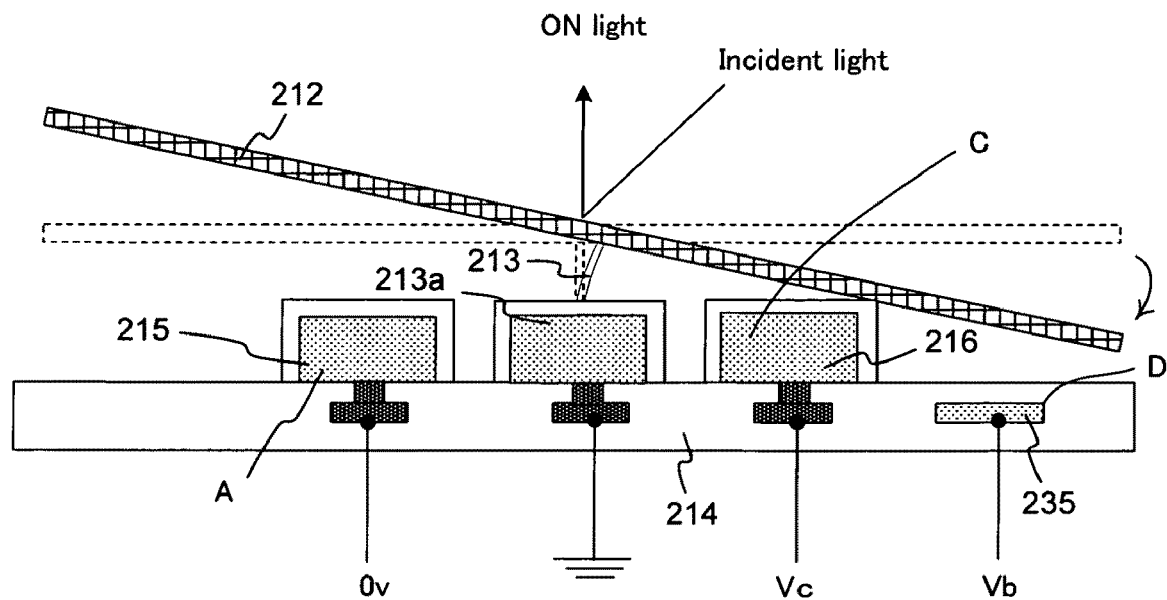
FIG. 31A is a cross-sectional diagram, in the ON state, of a pixel unit comprising two electrodes on the ON side, as shown in FIG. 24.
Figure 31B:
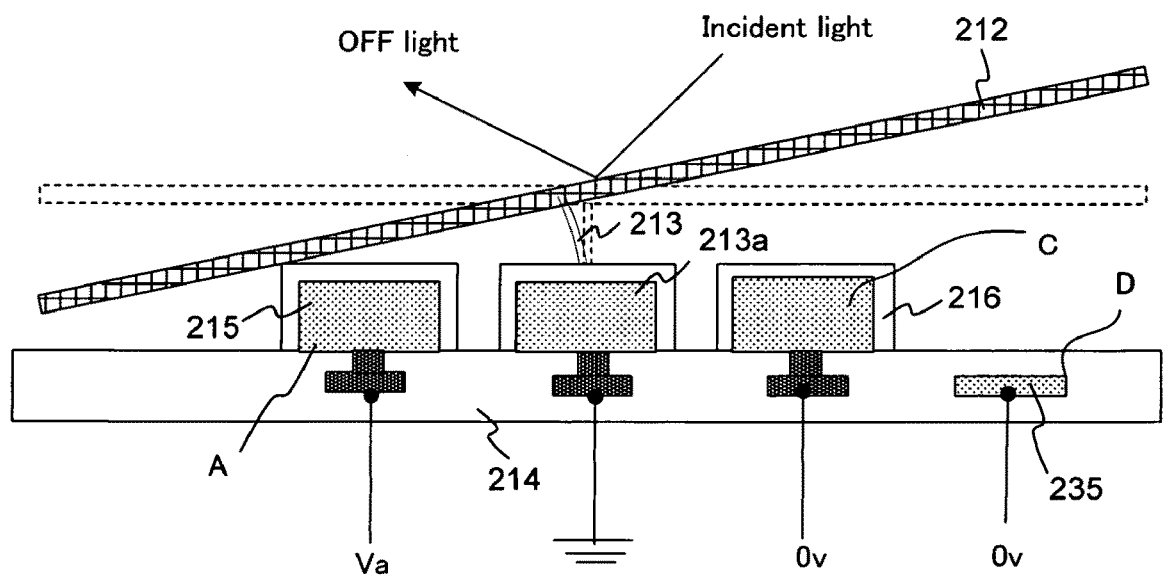
FIG. 31B is a cross-sectional diagram, in an OFF state, of a pixel unit comprising two electrodes on the ON side, as shown in FIG. 24.

FIGS. 31A and 31B 12B are cross-sectional diagrams of an ON state and OFF state, respectively, which are related to the pixel unit 211, configured as shown in FIG. 24. The symbols assigned in FIGS. 31A and 31B follow the same conventions as that described in FIG. 24.

Figure 31C:
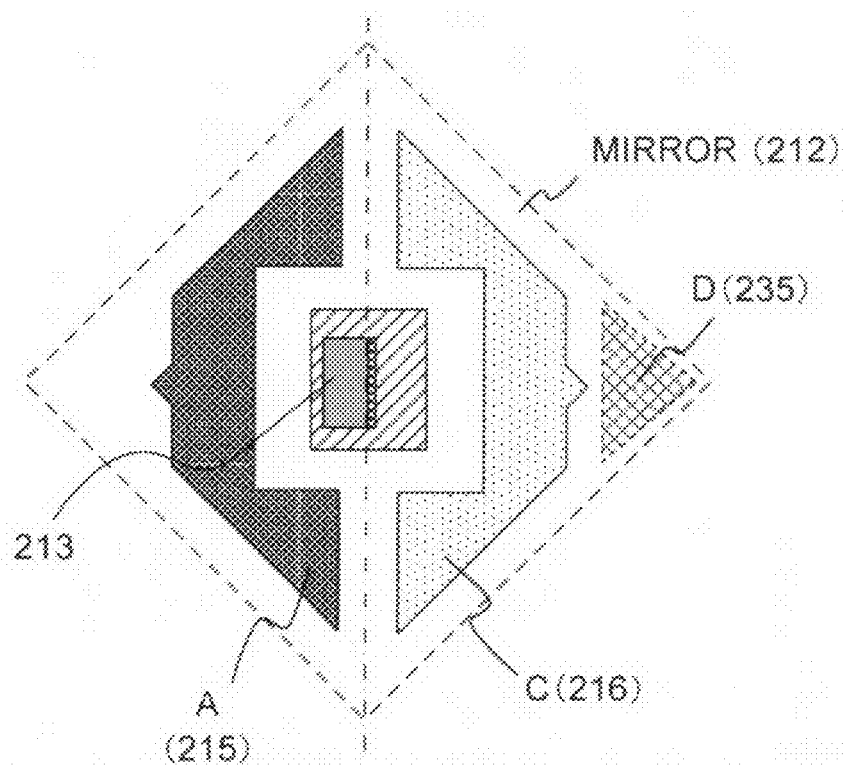
FIG. 31C is an illustrative top view diagram showing an exemplary layout of the second ON electrode that is added to the pixel unit, as shown in FIG. 24.
Figure 31D:
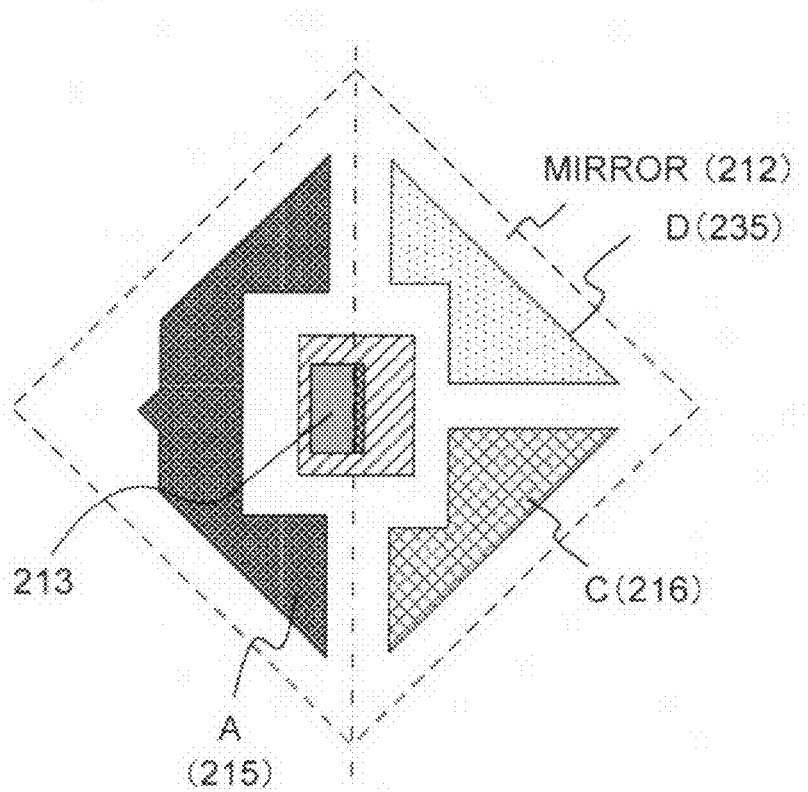
FIG. 31D is an illustrative top view diagram showing another exemplary layout of the second ON electrode that is added to the pixel unit, as shown in FIG. 24.

FIGS. 31C and 31D are illustrative top view diagrams showing an exemplary layout of the added second ON electrode 235.

FIG. 31C shows an exemplary configuration that positions the OFF electrode 215 (i.e., an electrode A) and ON electrode 216 (i.e., an electrode C) at approximately symmetrical positions, sandwiching a hinge 213 that is positioned on the diagonal line of the rectangular placement region of a pixel unit 211, and that positions a small triangular second ON electrode 235 (i.e., an electrode D) on the outside of the ON electrode 216.

FIG. 31D shows an exemplary configuration that divides the ON electrode 216, shown in FIG. 31C, into two parts, the aforementioned ON electrode 216 (i.e., the electrode C) and the second ON electrode 235 (i.e., an electrode D).

Figure 32:
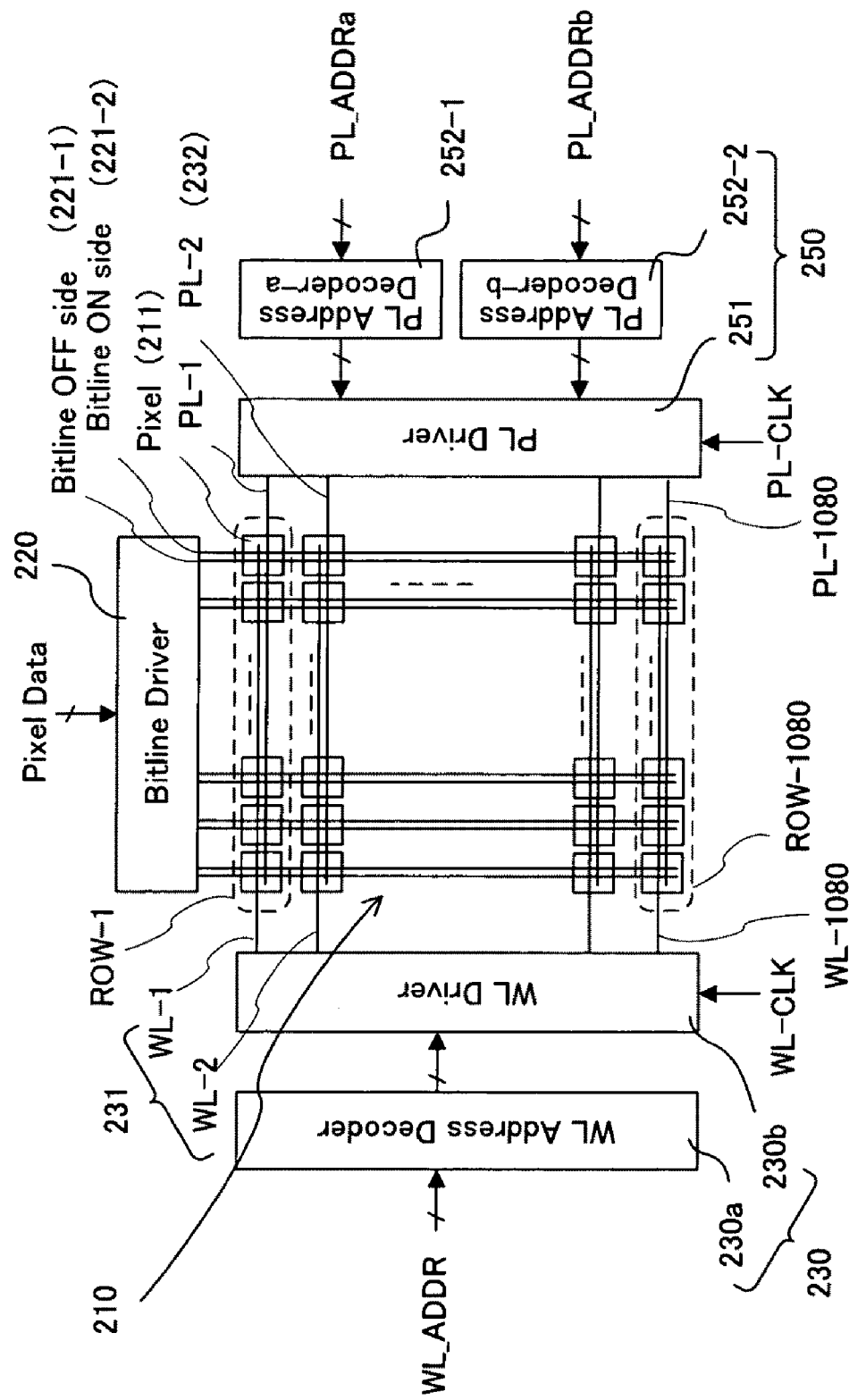
FIG. 32 is a functional circuit diagram showing an exemplary layout of a peripheral circuit for attaining the operation described in the timing diagram, which show the action of a pixel unit shown in FIGS. 36A, 36B and 37.

FIG. 32 shows an exemplary layout of the control circuit of the pixel array 210 arraying the pixel unit 211 shown in FIG. 24.

Specifically, a plate line driver unit 250 used for controlling the plate line 232 (i.e., the second plate line 233) has been added to the configuration of the pixel array 210 shown in the above described FIG. 4.

Specifically, this embodiment is configured to add the plate line driver unit 250 in the surroundings of the pixel array 210, in addition to comprising the bit line driver unit 220 and word line driver unit 230.

The word line driver unit 230 is constituted by a first address decoder 230a and a word line driver 230b, which are used for selecting a word line 231 (WL).

The plate line driver unit 250 is constituted by a plate line driver 251, a plate line address decoders 252-1 and 252-2, all of which are used for selecting a plate line 232 (PL).

Each pixel unit 211 is connected to the bit lines 221-1 and 221-2 of the bit line driver unit 220 (Bitline driver) so that data is written to the pixel unit 211 belonging to the ROW line selected by the word line 231 (WL).

A signal produced by an external input data though a serial word line (WL_ADDR 1) connected in parallel to an address decoder 230a (WL Address Decoder). A word line driver 230b (WL Driver) converts the input data into a designated voltage and applies the voltage to the word line 231 (WL).

Furthermore, the plate line 232 (PL) controls the ON electrode 216 of each pixel unit 211 y separately from the word line 231 (WL).

A plate line driver 251 (PL driver) converts the external input data PL_ADDRa or PL_ADDRb through series data line into a predefined voltage and apply the voltage through parallel signal lines to the plate line address decoder 252-1 (PL Address Decoder-a) and plate line address decoder 252-2 (PL Address Decoder-b) for selectively applied the signals to the plate line 232 (PL).

Specifically, the number of ROW lines, constituted by a plurality of pixel units 211 lined up horizontally, may be configured to be, for example, at least 720 lines or more.

In such a case, a data signal input to the memory cells M1 and M2 from each of the bit lines 221-1 and 221-2 is transmitted at 23 nsec or lower per one ROW line memory.

That is, in order to process 720 ROW lines by dividing and assigning a display period into four colors red (R), green (G), blue (B) and white (W) at the rate of 60 frames per second, with each color in 256-bit gray scale, the transmission speed is as follows:

1/60 [sec]/4 [divisions]/256 [bit gray scale]/720 [lines]= 22.6 nsec.

Further, in order to process 1080 ROW lines by dividing and assigning a display period into three colors R, G and B at the rate of 60 frames per second, with each color in 256-bit gray scale, the transmission speed is as follows:

1/60/3/256/1080=20 nsec.

Figure 33:
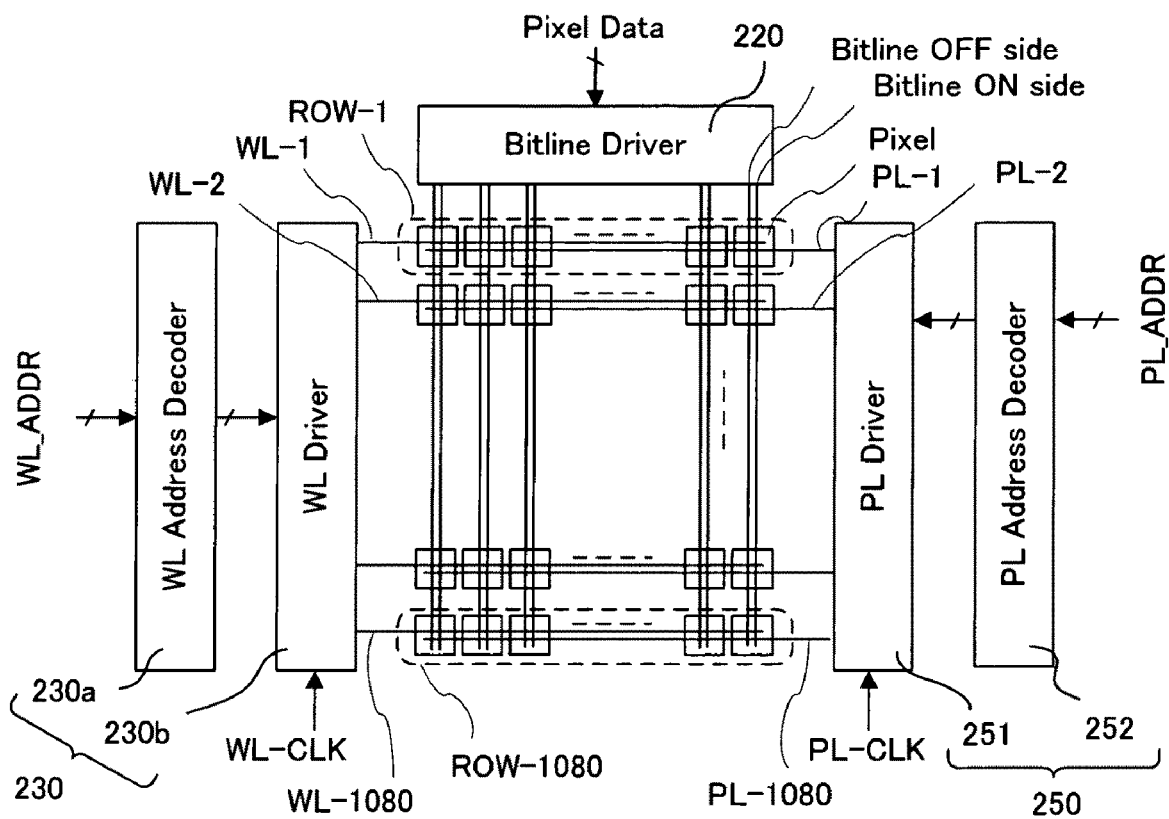
FIG. 33 is a functional circuit diagram showing an exemplary modification of FIG. 32.

FIG. 33 shows an example of the connecting relationship between the address decoder and bit line driver unit 220 (Bitline driver), which are used for selecting a word line 231 (WL) and a plate line 232 (PL) in the pixel array 210.

As shown in FIG. 33, it is simpler to connect one plate line address decoder 252-1 to the plate line driver 251 than to connect two plate line address decoders 252-1 and 252-2, as shown in FIG. 32.

Figure 34A:
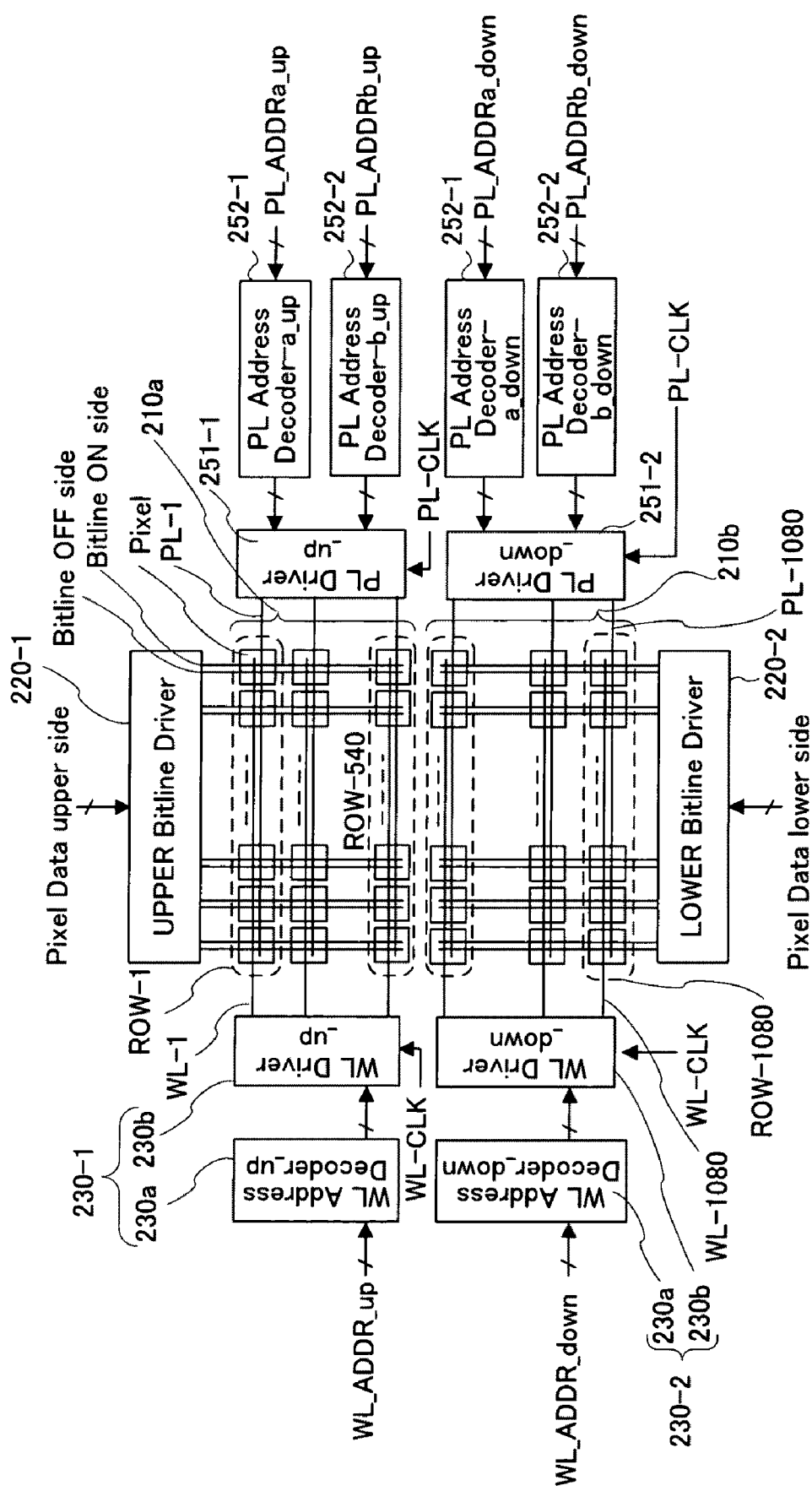
FIG. 34A is a functional circuit diagram showing an exemplary modification of FIG. 32.

FIG. 34A is a conceptual diagram showing an exemplary modification of the configuration of the pixel array 210 according to the present embodiment.

The configuration shown in FIG. 34A divides a plurality of ROW lines (ROW-1 through ROW-1080) into upper and lower groups (i.e., an upper row line area 210a and a lower row line area 210b), and comprises, for each group, an upper bit line driver part 220-1 and a lower bit line driver part 220-2 (Bitline Driver), a first address decoder 230a and a word line driver 230b (WL Address Decoder_up and WL Driver_up, WL Driver_down and WL Driver_down), a plate line driver 251-1 and a plate line address decoder 252-1, a plate line address decoder 252-2 (PL Address Decoder-a_up, b_up and PL Driver_up, PL Address Decoder-a_down, b_down and PL Driver_up, down).

That is, a plurality of row lines are divided into the upper row line area 210a, which is constituted by the row lines ROW-1 through ROW-540, and the lower row line area 210b, which is constituted by the row lines ROW-541 through ROW-1080.

In this case, the level change (i.e., the voltage Vd) of the plate line 232 is accomplished by changing the plate line address decoder 252-1 changing to H level and the plate line address decoder 252-2 to L level.

Figure 34B:
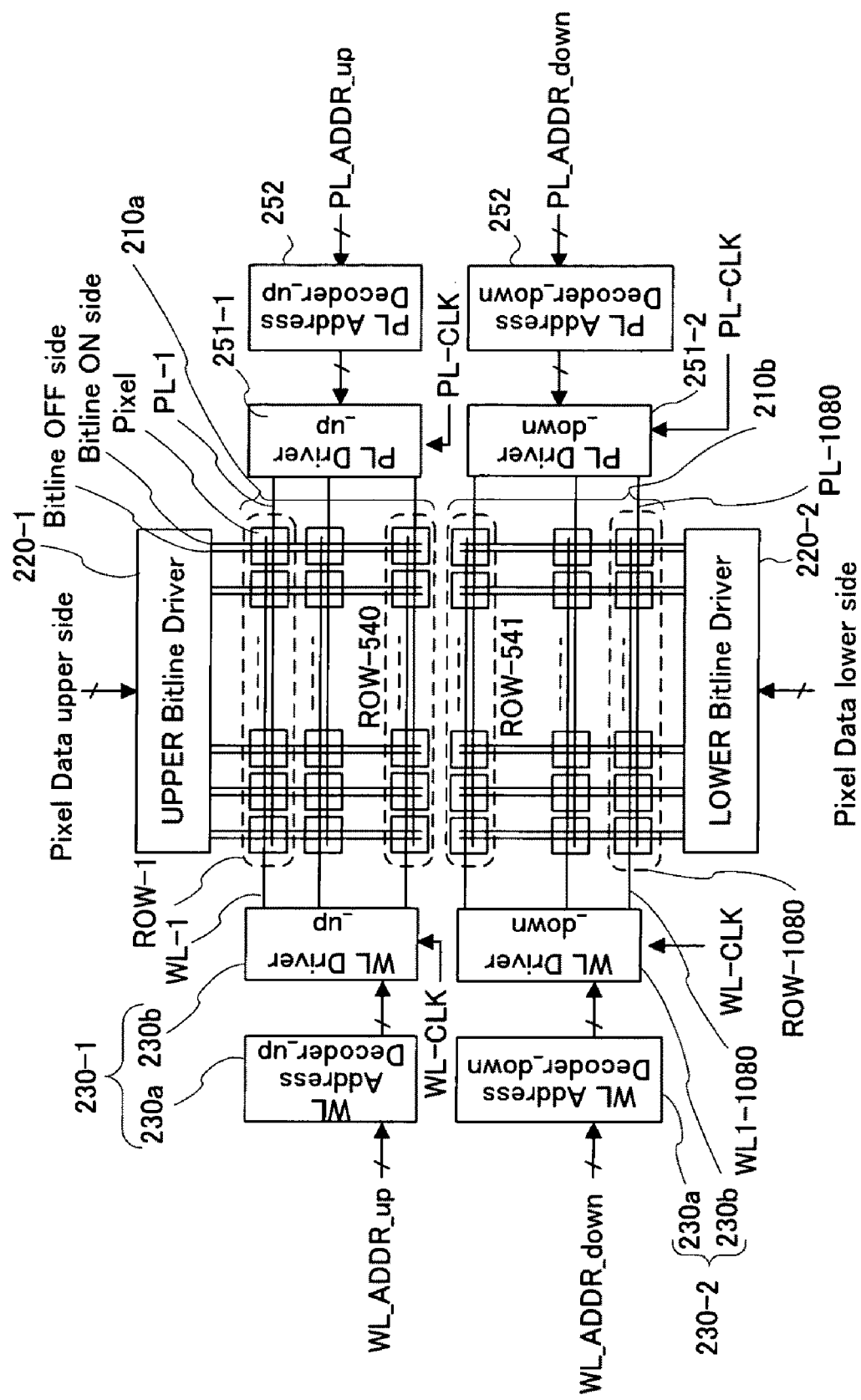
FIG. 34B is a functional circuit diagram showing an exemplary modification of FIG. 32.

FIG. 34B shows an exemplary configuration in which the plate line driver 251-1 (PL Driver_up) and plate line driver 251-2 (PL Driver_down) that are equipped, respectively, for the upper and lower ROW line groups is equipped with one plate line address decoder 252 (PL Address Decoder_up) and one plate line address decoder 252 (PL Address Decoder_down) in the comprisal of the pixel array 210 shown in the above described FIG. 34A.

In this case, the level change (i.e., the voltage Vd) of the plate line 232 (PL) is carried out by only the plate line 232 (PL).

Figure 34C:
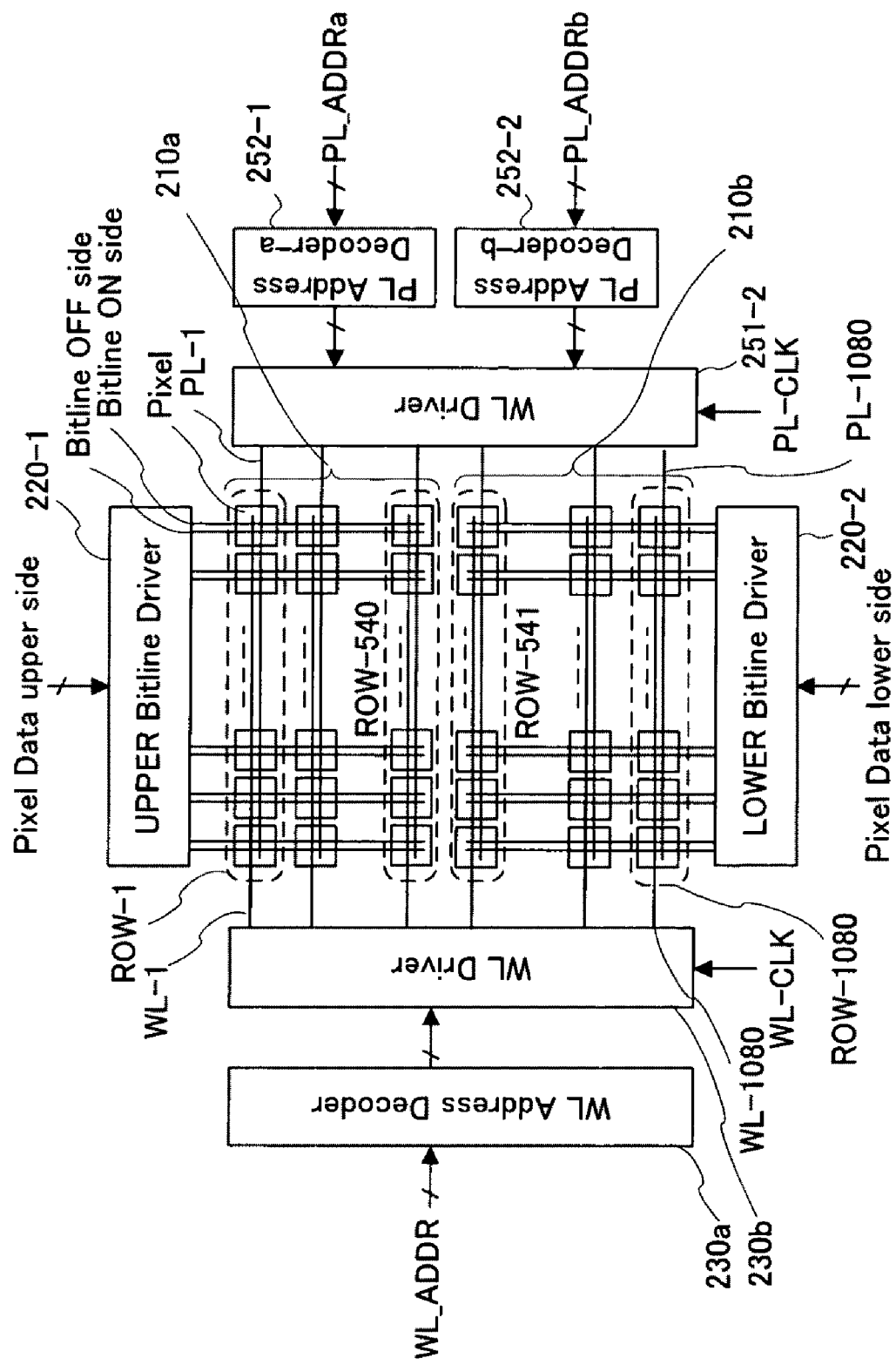
FIG. 34C is a functional circuit diagram showing an exemplary modification of FIG. 32.

FIG. 34C shows the configuration in which a first address decoder 230a and a word line driver 230b, a plate line driver 251 and a plate line address decoder 252-1 and a plate line address decoder 252-2 are equipped for each group in the configuration in which the ROW lines of a pixel array 210 is divided into the upper and lower groups, and each of the upper and lower ROW line groups is equipped with the upper bit line driver part 220-1 and lower bit line driver part 220-2.

In this case, for each group of the upper and lower ROW lines, the ROW lines applicable to the same address will be driven simultaneously; a combination of the respective ROW lines in the upper and lower groups to be simultaneously driven is determined by wirings.

For example, the ROW lines applicable to the same address (in the example of FIG. 34C, the first ROW-1 in the upper group and the first ROW-541 in the lower group) are simultaneously driven.

Figure 34D:
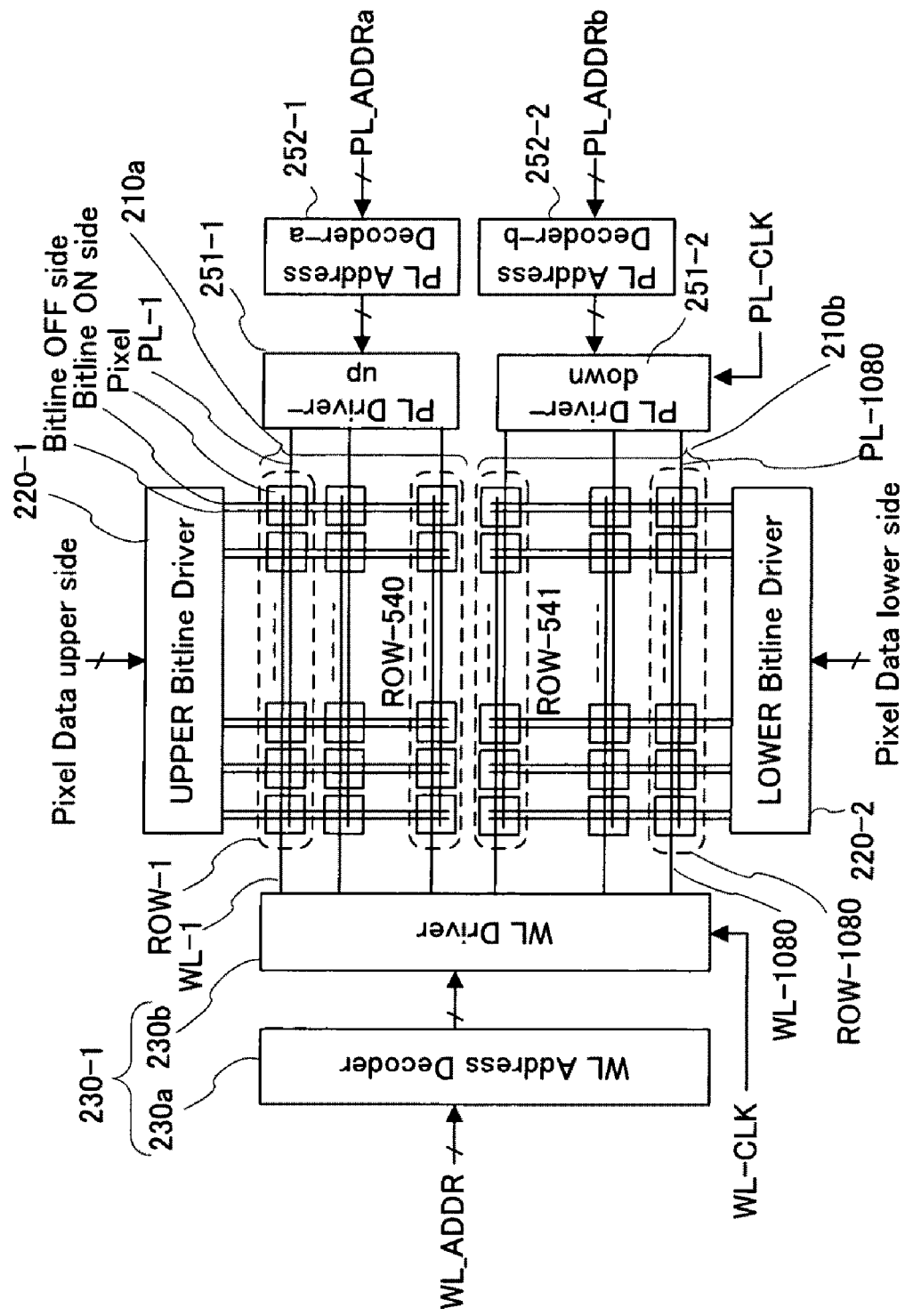
FIG. 34D is a functional circuit diagram showing an exemplary modification of FIG. 32.

FIG. 34D shows an exemplary configuration in which the plate line driver 251 commonly equipped in the upper and lower groups is separated into a plate line driver 251-1 (PL Driver_up) corresponding to the upper group and a plate line driver 251-2 (PL Driver_down) corresponding to the lower group and the divided drivers are placed correspondingly to the respective groups in the comprisal of the pixel array 210 exemplified in the above described FIG. 34C.

The following is a description of an exemplary operation of the pixel unit 211 configured shown in the above described FIG. 24.

FIG. 35 is a table showing the exemplary specifications of frame, subfield and time slot ts in the following description.

In the case of the present embodiment, for example, in a color sequential display, one frame is constituted by a plurality of fields corresponding to each of a plurality of colors, and the field of each color is further constituted by a plurality of subfields. The period of the field of each color do not necessarily have to be the same.

If one frame is 60 Hz (16.66667 msec.), the width of a subfield assigned to one color is between 5.00 msec (at the shortest) and 10.00 msec (at the longest).

Further, each subfield is constituted by a plurality of time slots ts, and the length of the time slot ts is different depending on the bit width of data used for a gray scale representation and on the length of the subfield.

For example, in the case of 8-bit (i.e., 255-level gray scale), the length of a time slot ts is 19.61 μsec if one subfield is 5.0 msec, and the length of a time slot ts is 39.22 μsec if one subfield is 10.0 msec, as shown in FIG. 35.

Figure 36A:
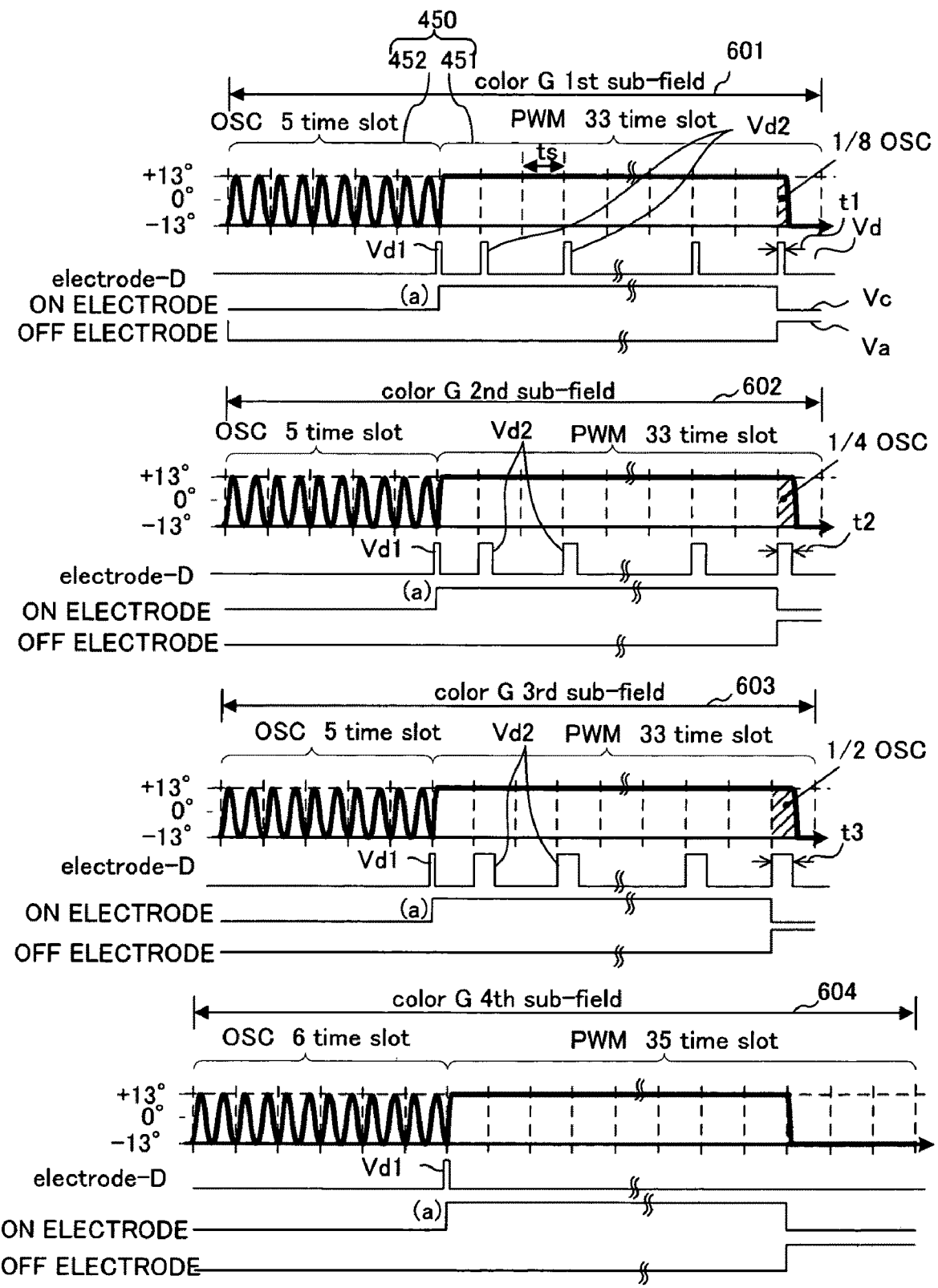
FIG. 36A is a timing diagram showing an exemplary method for improving the number of gray scale levels for a spatial light modulator according to a preferred embodiment of the present invention.
Figure 36B:
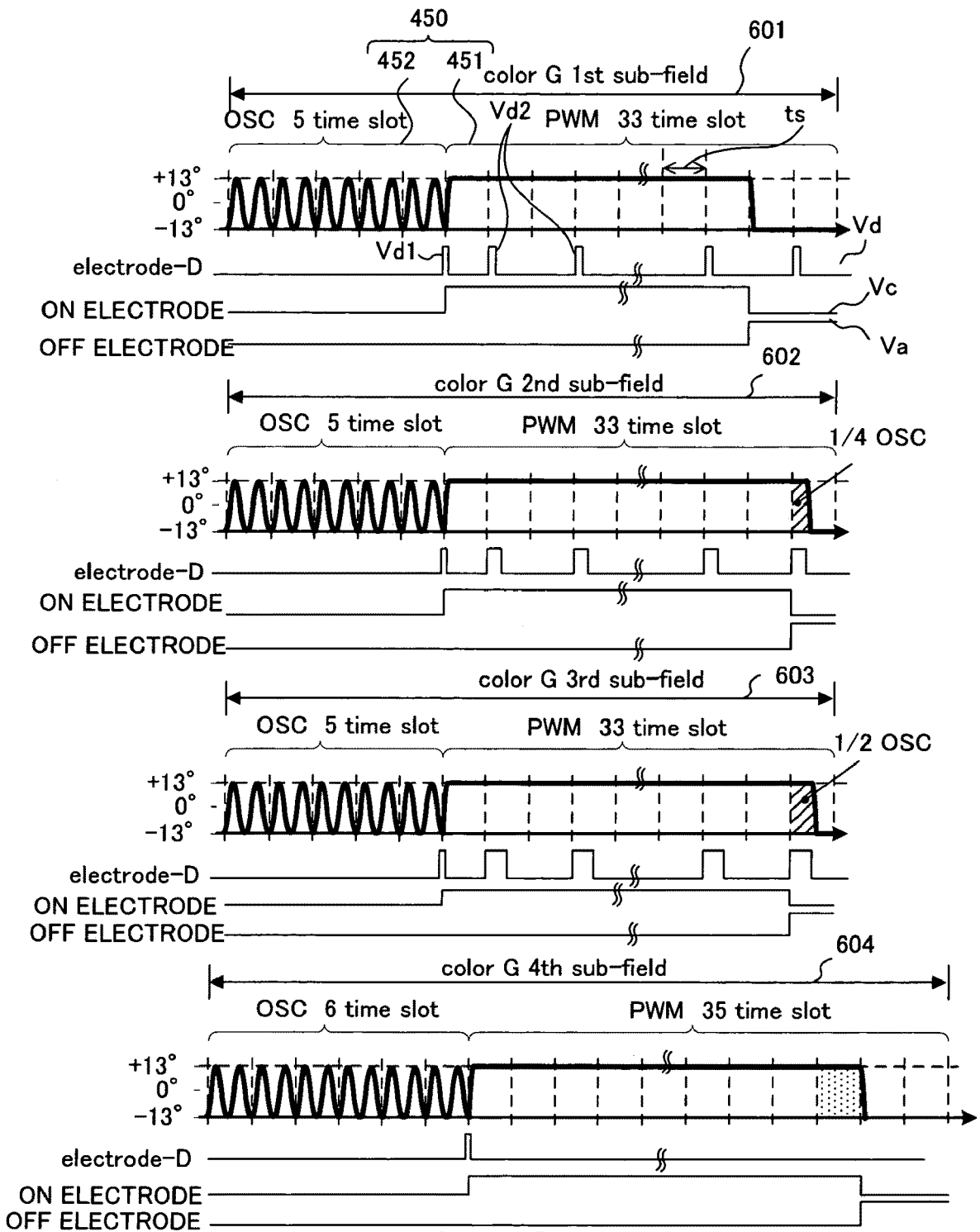
FIG. 36B is a timing diagram showing an exemplary method for improving the number of gray scale levels for a spatial light modulator according to a preferred embodiment of the present invention.

FIGS. 36A and 36B are timing diagrams showing an exemplary action of the present embodiment.

When a gray scale display is carried out with a control that is a combination between OSC and PWM using a mirror control profile 450 consisting of an ON/OFF control pattern 451 (PWM) and an oscillation control pattern 452 (OSC), a gray scale level is determined by the write cycle (i.e., the time slot cycle) to the memory cells M1 and M2.

Accordingly, the present embodiment is configured to use the second ON electrode 235 (i.e., the electrode D) in FIG. 24C connected to the plate line 232 for maintaining the state of the mirror 212 even if the data of the memory cells M1 and M2 are changed and maintaining it for a period shorter than a time slot ts, and thereby enabling a light intensity control for a period shorter than the time slot ts.

The following is a description of a method for increasing gray scale when using a mirror control profile 450 in the control that is a combination between OSC and PWM consisting of the oscillation control pattern 452 and ON/OFF control pattern 451, in the case of the present embodiment.

FIG. 36A exemplifies the case of structuring one frame (i.e., one screen) of each color with a plurality of subfield: the first subfield 601, second subfield 602, third subfield 603 and fourth subfield 604.

In the pixel unit 211, the ON state of the mirror 212 can be maintained for a predetermined period of time even when the OFF electrode 215 and ON electrode 216, which are connected to the memory cells M1 and M2, respectively, are shifted from (0, 1) to (1, 0), if a pulse Vd2 is given to the second ON electrode 235 (i.e., an electrode D, the plate line 232) that is placed on the ON side (refer to the circuit configuration shown in FIG. 24).

The intensity of light during the aforementioned period through the application of the pulse Vd2 is controlled to be lower than the intensity of light of the oscillation control pattern 452 (OSC) in one time-slot ts and is also controlled to differ in each subfield (i.e., the first subfield 601, second subfield 602, third subfield 603), and thereby projecting images with an increased gradations of gray scale levels.

That is, the width of the pulse Vd2 changes with each of the first subfield 601 through the third subfield 603 as follows:

pulse width t1<pulse width t2<pulse width t3

The pulse width t1 of the pulse Vd2 in the first subfield 601 is set at a value that is ⅛ the intensity of light (noted as "⅛ OSC" hereinafter) in one time-slot of the oscillation control pattern 452; the pulse width t2 of the second subfield 602 is set at ¼ OSC; the pulse width t3 of the third subfield is set at ½ OSC.

The interval of the pulse Vd2 is set so that the electrode D maintaining the state of the mirror 212 is carried out for every other time slot ts. In order to correct the gray scale for one subfield (i.e., the last subfield, the fourth subfield 604 in this case), the voltage Vd of the second ON electrode 235 is equipped with only a pulse Vd1, not a pulse Vd2, and the state of the mirror 212 is not maintained by the second ON electrode 235 (i.e., the electrode D). Instead, the number of time slots ts is adjusted as described later. In adjusting the number of time slots ts, the control process may prevent all the time slots from turning to the ON state in the fourth subfield 604 even if a video signal at a saturated level is inputted into the control apparatus 300.

FIG. 36B shows, as an example, the result of reducing the grades of gray scale equivalent to the intensity of light by ⅛ OSC from that of the example shown in FIG. 36A.

When a data loading of the ON/OFF control pattern 451 (PWM) for the first subfield 601 of FIG. 17A is shortened by the equivalent of one time-slot, the intensity of light is reduced by 1+⅛ OSC in the first subfield 601.

Accordingly, if a data loading for PWM for the fourth subfield 604 is extended by the equivalent of one time-slot, a reduction in the intensity of light by ⅛ OSC can be attained for the entirety of one frame.

With this control, a combination of a light intensity control by means of a pulse Vd2 in each of the first subfield 601 through the third subfield 603 makes it possible to attain a gray scale representation eight times (8×) the gray scale control achieved by means of the ON/OFF control pattern 451 or oscillation control pattern 452 in units of time slot ts.

Specifically, the mirror 212 is drawn to the ON side by the electrode D only for the period of the pulse Vd1 by turning on the electrode D at the time when the mirror is switched from the oscillation control pattern 452 (OSC) to the ON/OFF control pattern 451 (PWM) by controlling the voltage Vd of the second ON electrode 235 (i.e., an electrode D) for each of the first subfield 601 through the fourth subfield 604. The switch of operation occurs when the mirror 212 is operated in the oscillating state under the control of the oscillation control pattern 452 and the mirror is switched smoothly to the ON state on the ON/OFF control pattern 451 in a short time.

Application of the pulse Vd1 as described above is advantageous in that it lowers the voltage applied to the OFF electrode 215 and ON electrode 216, which are connected to the memory cells M1 and M2, respectively, and lowers the power consumption and also acts as a countermeasure to stiction.

The pulse Vd1 may also be applied to control a mirror 212 to switch from the horizontal state to an ON state immediately after turning on the power to a display element. For example, if a mirror 212 cannot be shifted from the horizontal state to the ON state even though the mirror 212 is successfully shifted from the OFF state to the ON state by only the ON electrode 216, to which 5 volts as the voltage Vc is applied, 10 volts can be applied as a pulse Vd1 to the electrode D simultaneously with the application of 5 volts (i.e., the voltage Vc) to the ON electrode 216 when the mirror 212 is in the horizontal state, and then the voltage Vd of the electrode D is returned to zero (0) volts after the elapse of time necessary for the mirror 212 to shift to the ON state. This operation eliminates the need to apply an unnecessarily high voltage for shifting the mirror 212 from the OFF state to the ON state and also reduces stiction. In this case, a voltage (i.e., a snap-in voltage or a pull-in voltage) necessary for shifting the mirror 212 from the horizontal state to the ON state is 5 volts plus 10 volts. The voltages at the electrode D and ON electrode 216 can be set independently.

Figure 37:
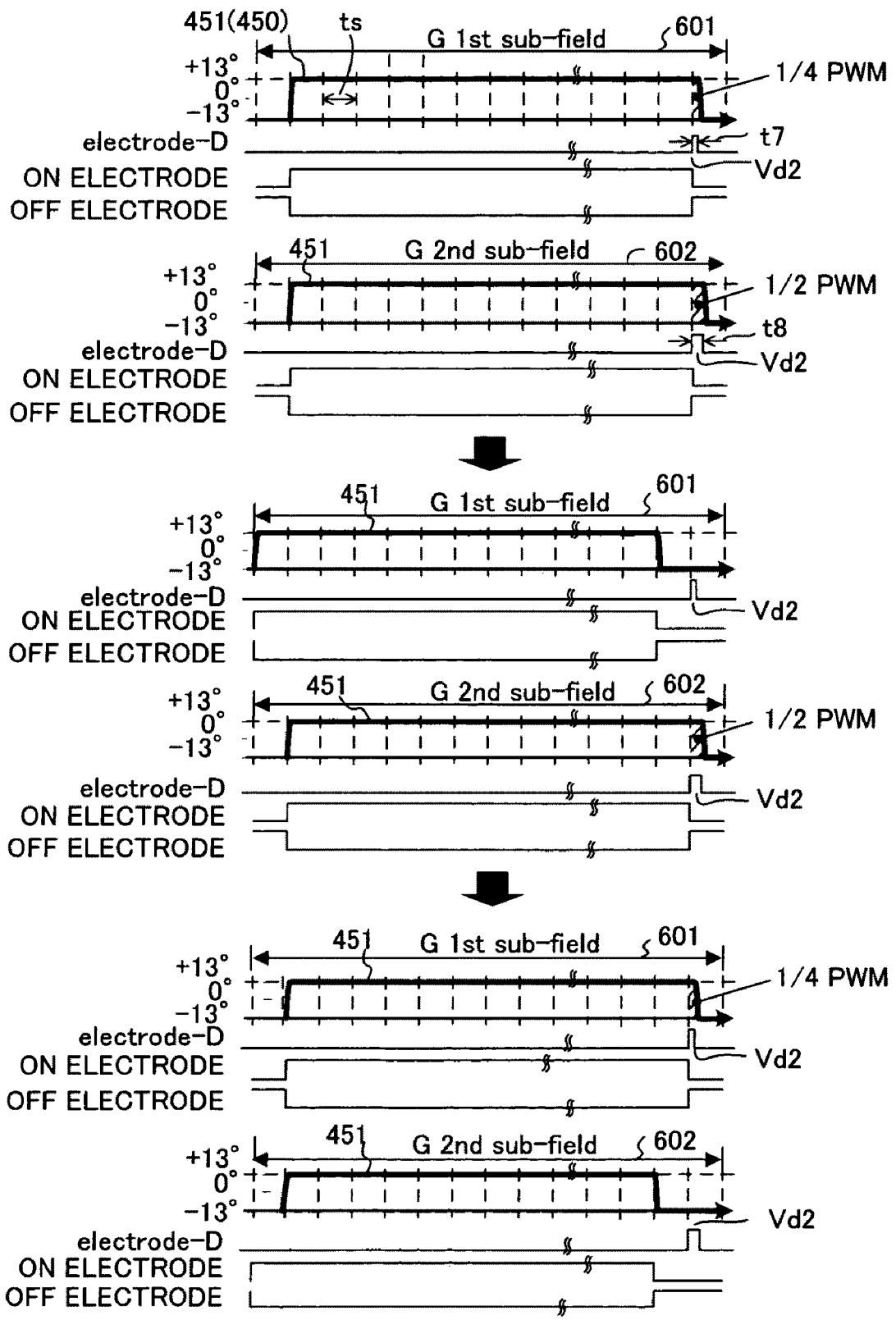
FIG. 37 is a timing diagram showing an exemplary method for improving the number of gray scale levels for a spatial light modulator according to a preferred embodiment of the present invention.

FIG. 37 is a timing diagram showing an exemplary method for improving the number of gray scale levels when using a non-binary PWM.

In this case, the circuit configuration of a pixel unit 211 uses a configuration that places the second ON electrode 235 (i.e., an electrode D) on the side where the ON electrode 216 (i.e., the electrode C) is placed, as shown in FIG. 24.

Further, one frame is constituted by two subfields, that is, the first subfield 601 and the second subfield 602.

In the case of non-binary PWM, the ON state of the mirror 212 is expressed by a bit string corresponding to the number of gray scale levels and therefore a gray scale control is performed by setting a continuous ON state during an arbitrary period within a subfield.

In this event, the present embodiment is configured to control, for the pixel unit 211 in which the mirror 212 is in the ON state, the voltage Vd of a plate line 232 so as to maintain the ON state of the mirror 212 only for a predetermined period (i.e., during a pulse Vd2) by means of the electrode D placed on the ON side even when the OFF electrode 215 and ON electrode 216, which are connected to the memory M1 and M2, respectively, are changed from (0, 1) to (1, 0).

The intensity of light during the period of maintaining the pulse Vd2 is set to be lower than the intensity of light under the control of the ON/OFF control pattern 451 (i.e., a PWM control) for the length of one time-slot, and is set to be different for each of a plurality of subfields (in this case, the first subfield 601 and the second subfield 602), and thereby the number of gray scale levels can be increased.

In this case, for the first subfield 601, a pulse width t7 that is equivalent to a ¼ of the intensity of light (noted as "¼ PWM" hereinafter) of the ON state during one time-slot under a PWM control is set as a pulse Vd2 at a position corresponding to the time slot ts at the tail end of the ON/OFF control pattern 451.

Likewise, for the second subfield 602, a pulse width t8 that is equivalent to ½ of the intensity of light (noted as "½ PWM" hereinafter) of the ON state during one time-slot under a PWM control is set as a pulse Vd2 at a position corresponding to the time slot ts at the tail end.

As such, the ON state is maintained by means of the pulse Vd2 of the electrode D at the last time slot of each subfield. If the ON state is not maintained during this period, the PWM waveform of the ON/OFF control pattern 451 is moved to the start of the subfield so as to not use the last two time slots.

By combining the aforementioned control with the presence/absence of controlling the pulse Vd2 in the first subfield 601 and second subfield 602, an improvement in the gray scale representation four times (in this example), that of a simple gray scale control by means of an ON/OFF control in units of time slots ts is achieved.

As described above, the example shown in FIG. 37 has two subfields, that is, the first subfield 601 and second subfield 602, and operates the electrode D in the last time slot ts so as to enable a gray scale representation of ¼ PWM for the first subfield 601 and ½ PWM for the second subfield 602.

Specifically, the control processes switch the mirror from the ON/OFF control pattern 451 to turn on the time slot ts immediately before the pulse Vd2 in the case of turning on a light intensity control using the pulse Vd2 of the electrode D. The control processes switch the ON/OFF control pattern 451 toward the beginning of the subfield in the case to turn off the light intensity control.

Furthermore, FIG. 37 exemplifies the combination between the first subfield 601 and second subfield 602 when the gray scale representations are changed by the increment of the light intensity of ¼ PWM starting from the top left.

FIG. 38 is a conceptual diagram showing an exemplary modification of the circuit configuration of the pixel unit shown in FIG. 24.

The circuit of a pixel unit 211 according to the exemplary modification shown in FIG. 38 is configured such that the ON electrode 216 (i.e., the electrode C) and memory cell M2 are removed from the comprisal of FIG. 24 and such that the control for the ON side of the mirror 212 is carried out using the second ON electrode 235 (i.e., an electrode D) connected to the plate line 232.

Figure 39:
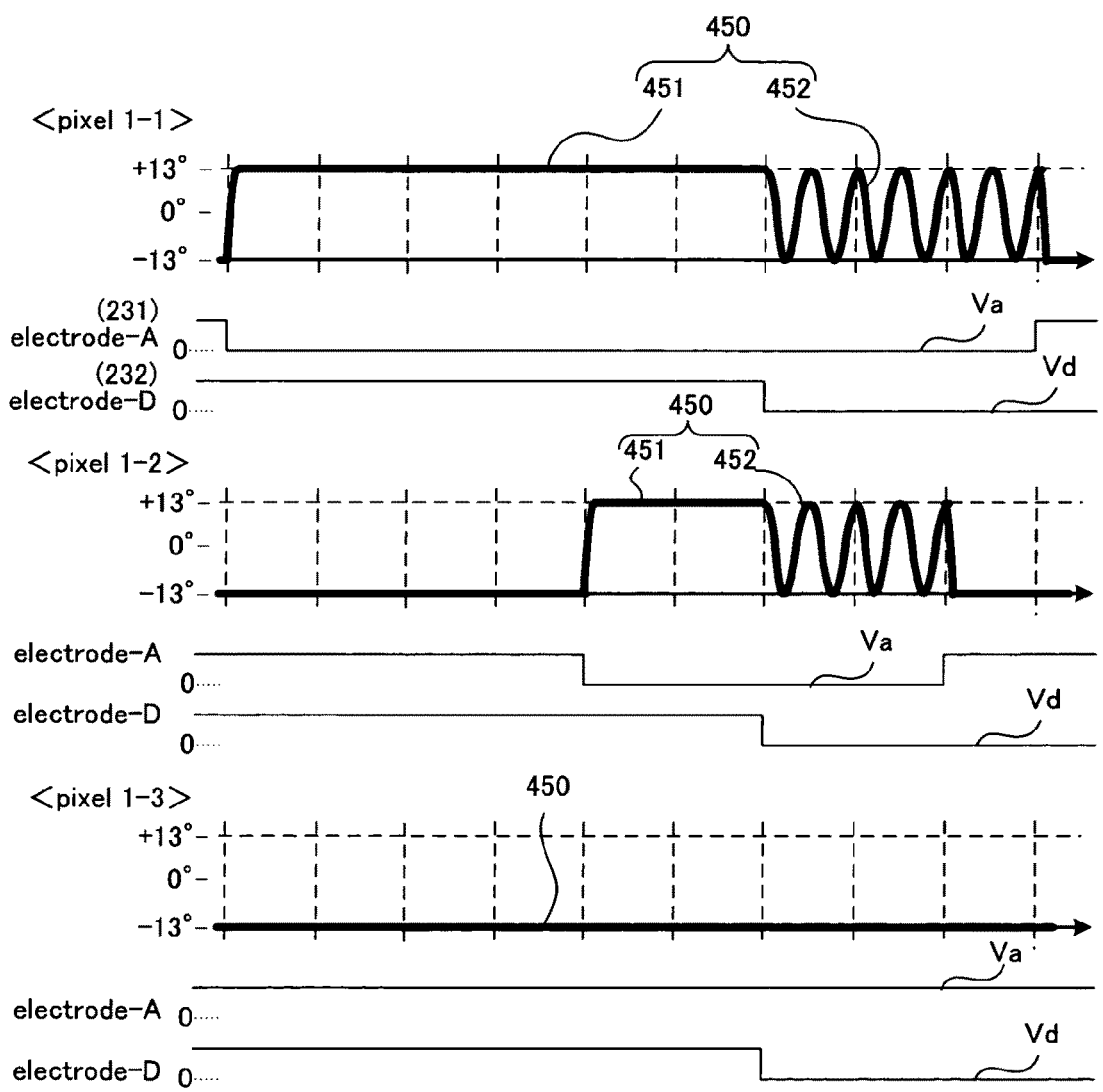
FIG. 39 is a timing diagram showing an exemplary control of a pixel unit configured shown in FIG. 38.

FIG. 39 is a timing diagram showing an exemplary control of a pixel unit configured shown in FIG. 38. The circuit requires only one OFF capacitor 215b that can be placed in the entire area under the mirror 212 to increase the capacitance of the capacitor. This configuration makes it possible to attain an element structure that is robust against a voltage drop due to leakage and against voltage fluctuation due to a photoelectric effect. Since it requires only one FET, it is possible to place a poly-capacitor made of poly-silicon on the forming layer of a CMOS and to reduce the number of masks used in the manufacturing process.

As shown in FIG. 39, starting from a state in which the mirror 212 is in the OFF state (i.e., the voltage Va of the electrode A is maintained at H ("1"), and the memory cell M1 is maintained at H ("1")) and in which the voltage Vd of the electrode D placed on the ON side is maintained at H ("1"), the value of the voltage Va of the electrode A is turned to L (i.e., the memory cell M1 is turned to L ("0")) at a timing of the time slot number corresponding to the number of gray scale levels to be displayed. The mirror 212 is then turned to the ON state because the voltage Vd of the electrode D placed on the ON side is maintained at H.

After entering the control period under the oscillation control pattern 452 (OSC), the voltage Vd of the electrode D is turned to L ("0") and the mirror 212 starts oscillating (OSC). If the oscillation (under the oscillation control pattern 452) of the mirror 212 needs to be ended, the value of the voltage Va of the electrode D is turned to H (i.e., the memory cell M1 is turned to H ("1")).

Further, if the voltage Va of the electrode A is maintained in the state of H ("1"), the mirror 212 is maintained in the OFF state regardless of a change in the voltages Vd of the electrode D. In the above description, the electrode D is commonly connected for each ROW in the exemplary configuration. It is, however, also possible to commonly connect the electrode D for all pixels and turn off the entirety in synch with the end of the ON state of the mirror 212. Further, it is also possible to fix the electrode D to a ground potential (GND) and apply a voltage only to the ON side of the mirror 212.

Figure 40:
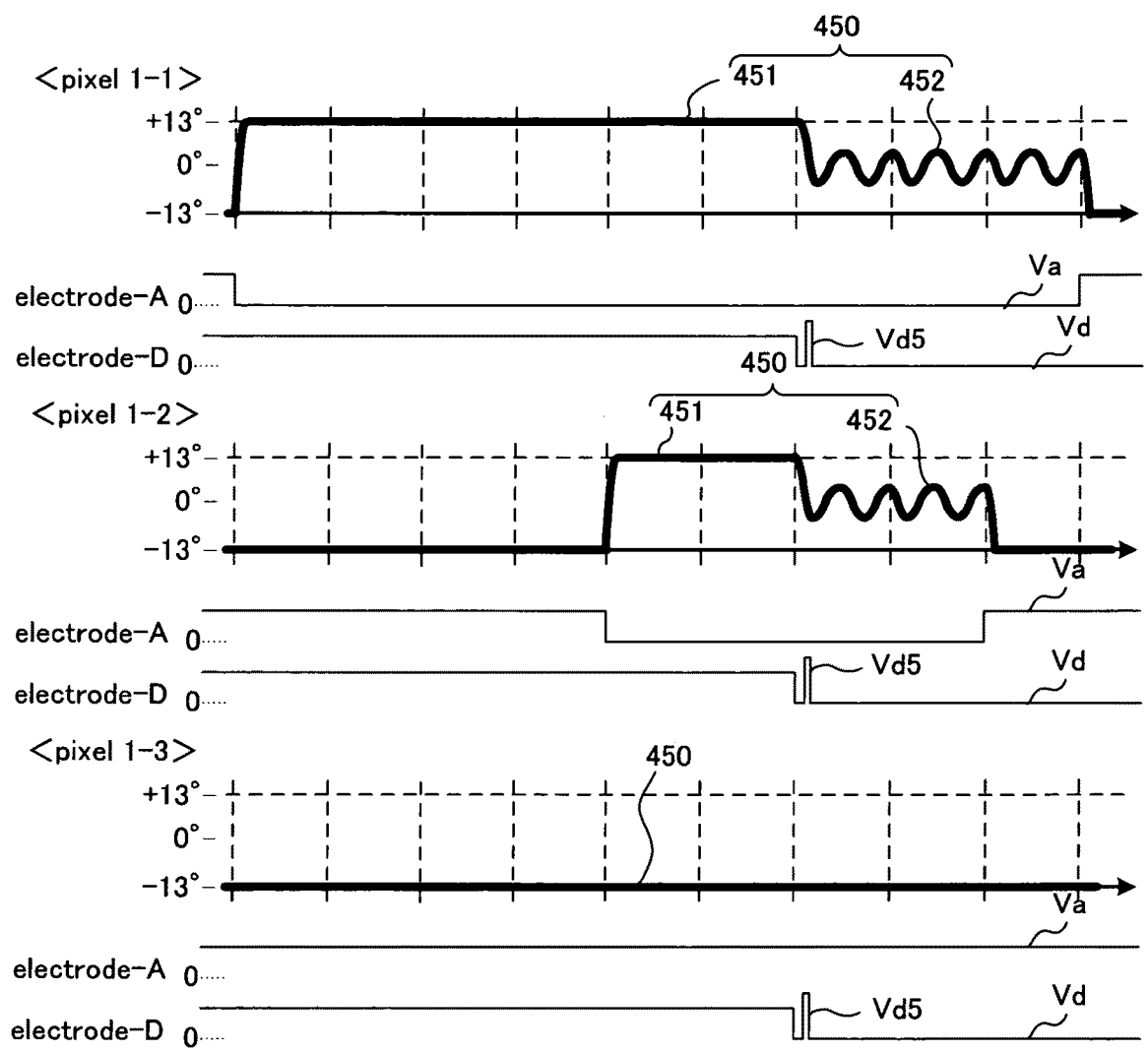
FIG. 40 is a timing diagram showing an exemplary modification of the operation of a pixel unit configured shown in FIG. 38.

FIG. 40 is a timing diagram showing an exemplary modification of the operation of a pixel unit configured as shown in FIG. 38.

FIG. 40 shows the waveform of a mirror control profile 450 in the case of generating an intermediate oscillation using the electrode D.

Specifically, a mirror 212 shifting from the ON state to the OFF state is brought back to the ON side temporarily by applying a Vd5 to the voltage Vd of the electrode D immediately after the voltage Vd is turned to L ("0") for shifting from the ON/OFF control pattern 451 to the oscillation control pattern 452. Thereby, an oscillation control pattern 452 for an intermediate oscillation causing the mirror 212 to oscillate in a narrow amplitude is attained.

Further, by maintaining the voltage Va of the electrode A at H ("1"), the mirror 212 is maintained in the OFF state even if the voltage Vd of the electrode D is given a change, including a pulse Vd5.

Figure 41:
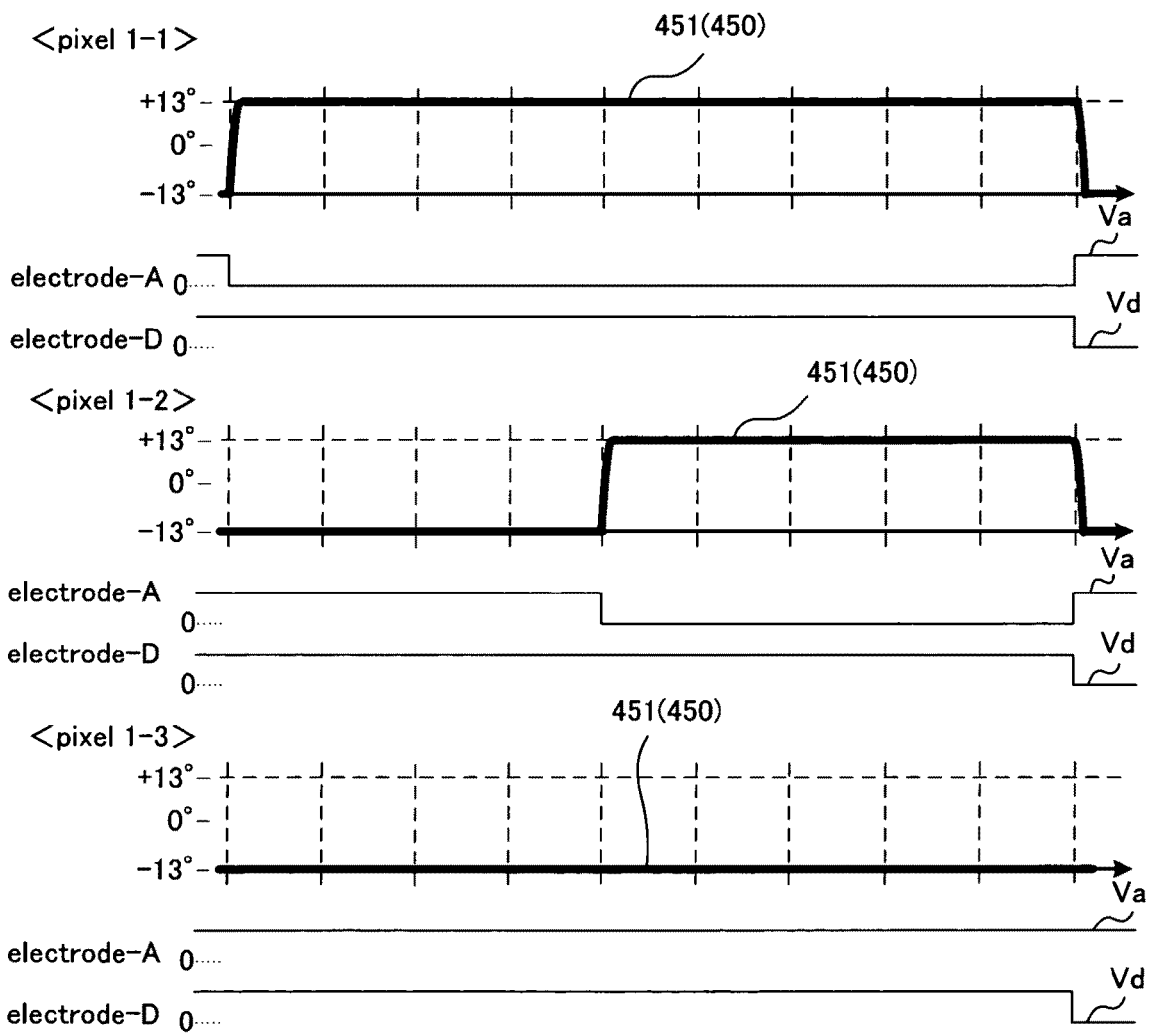
FIG. 41 is a timing diagram showing an exemplary modification of the operation of a pixel unit configured shown in FIG. 38.

FIG. 41 is a timing diagram showing an exemplary modification of the operation of a pixel unit configured as shown in FIG. 38.

FIG. 41 exemplifies a waveform when a gray scale is represented by the mirror control profile 450 consisting of only the non-binary ON/OFF control pattern 451 (that is, not including an OSC, i.e., a full oscillation or intermediate oscillation of the mirror 212).

In the case of FIG. 41, the control is such that, within a subfield, either the voltage Va of the electrode A or the voltage Vd of the electrode D is turned to H ("1") and the other is turned to L ("0").

As such, the pixel unit 211 exemplified in FIG. 38 is configured to connect the electrode D on the ON side to the plate line 232 and to eliminate a memory cell M2 and ON electrode 216 (i.e., an electrode C), decreasing the number of circuit elements than a configuration in which the OFF side and ON side are furnished individually with the memory cells M1 and M2, respectively. Therefore, the production yield of pixel arrays 210 (i.e., the spatial light modulator 200) comprising a large number of pixel units 211 is improved.

Also, in order to reduce the size each pixel unit 211 so as to place a larger number of pixel units 211 within a pixel array 210 of a certain size, a transistor of the same size (that is, the same withstanding voltage), as a transistor constituting the memory cell M1 on the OFF side, can be used. Thereby the reliability of the operations of the pixel units 211 and spatial light modulator 200 can be maintained and improved.

Further, even for the same pixel size, it is possible to enlarge a gate transistor 216c, which improves the withstanding voltage. A high drive voltage enables high speed operation of the mirror 212 and the tilting of the mirror 212, even if the hinge 213 is strengthened as a countermeasure to stiction. Meanwhile, the number of masks used in the production process employing a photolithography process can be reduced by configuring the OFF capacitor 215b of the memory cell M1 using a poly-capacitor (i.e., a MOS capacitor) in place of the aluminum capacitor. Also, even for the same area size of poly-capacitor, a larger size lengthens the voltage support time of the memory cell M1, enabling a lower speed (i.e., a required speed is reduced) write cycle of the memory cell M1.

Figure 42A:
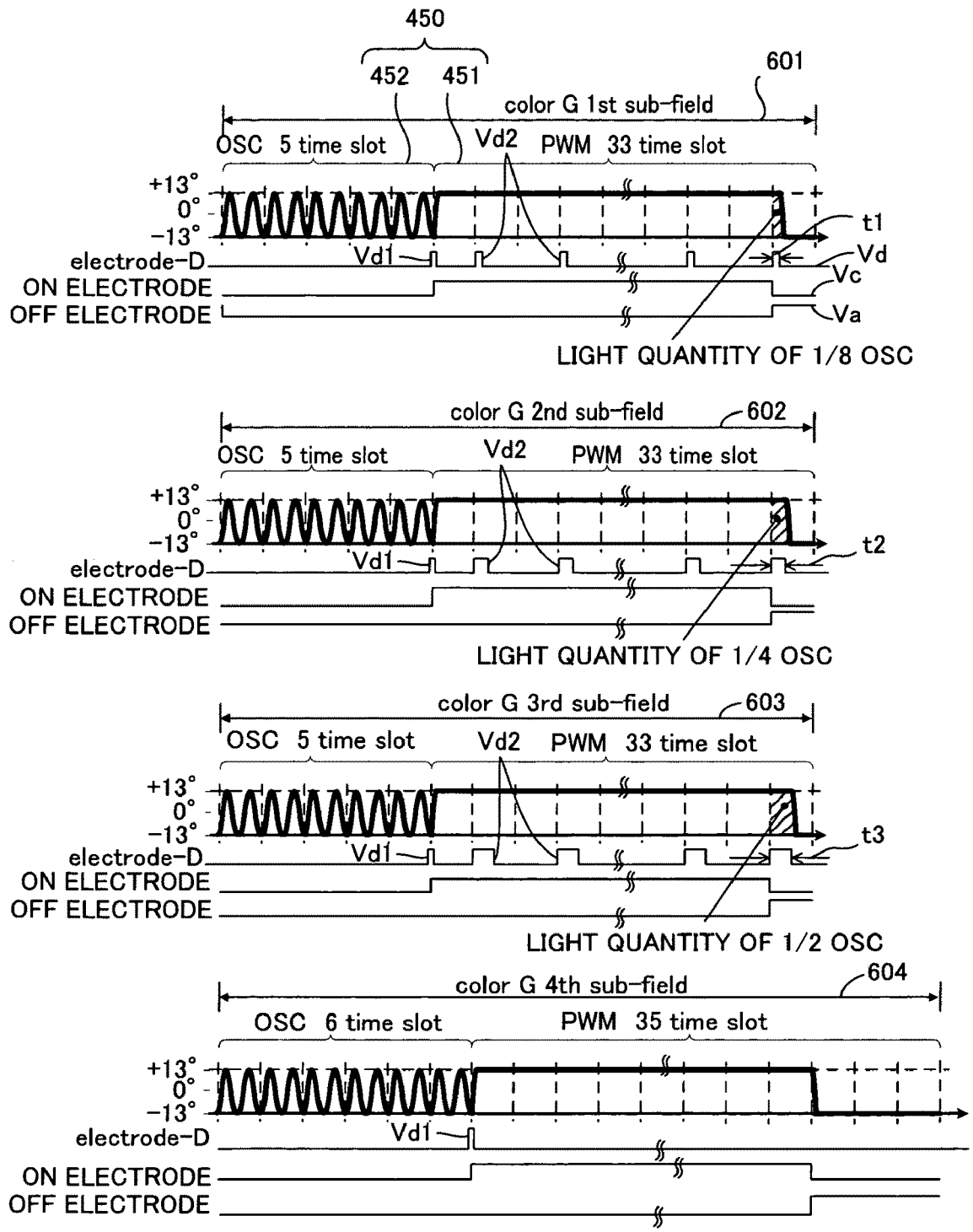
FIG. 42A is a timing diagram showing the case of applying a method for improving the number of gray scale levels to a color sequence method that is used for a spatial light modulator according to a preferred embodiment of the present invention.
Figure 42B:
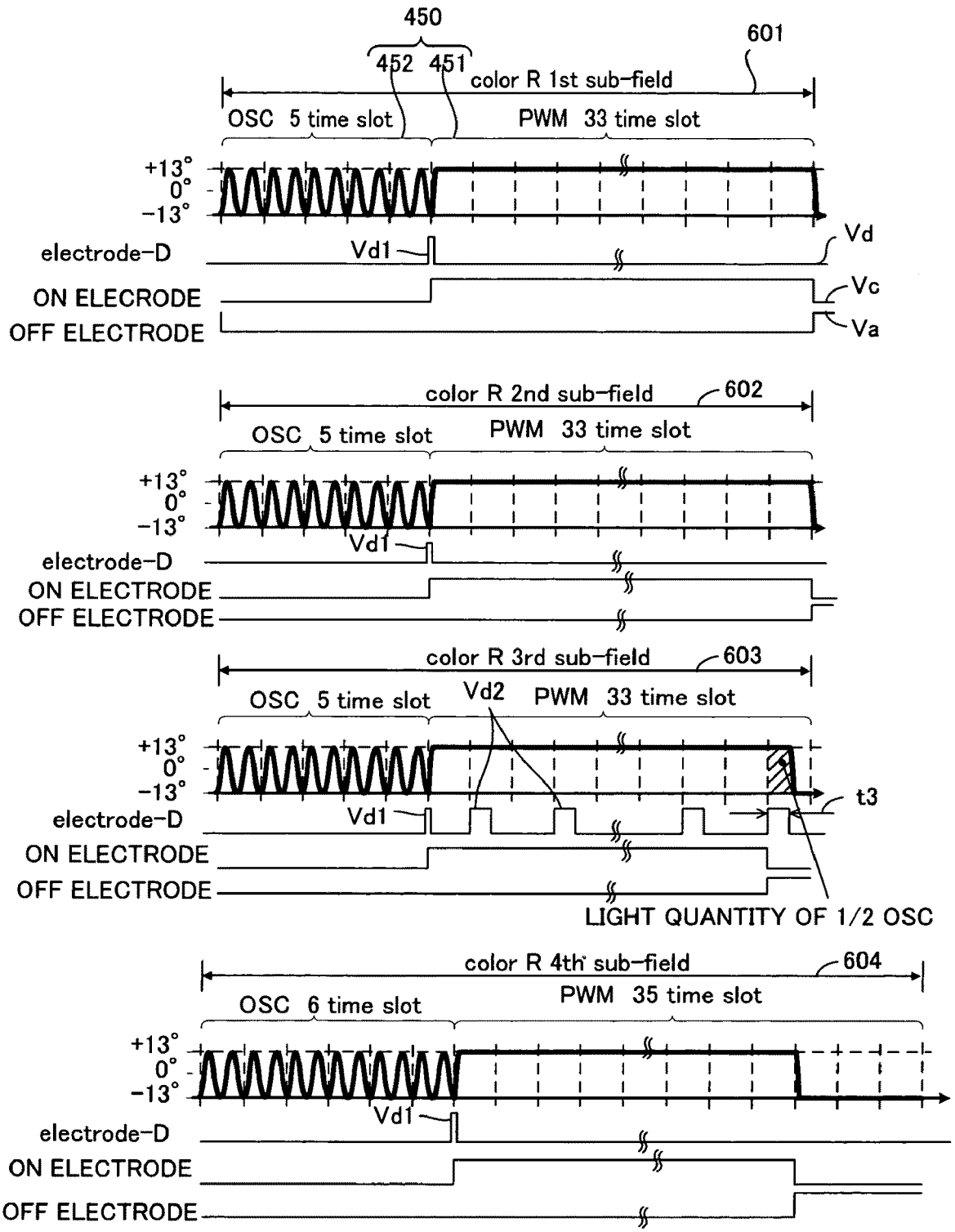
FIG. 42B is a timing diagram showing the case of applying a method for improving the number of gray scale levels to a color sequence method that is used for a spatial light modulator according to a preferred embodiment of the present invention.

FIGS. 42A and 42B are a timing diagram showing an exemplary waveform of the mirror control profile.

FIGS. 42A and 42B exemplifies the case of changing over light intensity controls in no more than the time width of a time slot ts for each frame of a color sequence display (consisting of a plurality of subfields, i.e., the first subfield 601 through fourth subfield 604).

Specifically, FIG. 42A exemplifies the control waveforms for the first subfield 601 through fourth subfield 604 constituting the frame corresponding to green (G); FIG. 42B exemplifies the control waveforms for the first subfield 601 through fourth subfield 604 constituting the frame corresponding to red (R).

The green frame shown in FIG. 42A exemplifies the case in which the light intensity controls of 1+⅛ (OSC), 1+¼ (OSC) and 1+½ (OSC) for the first subfield 601 through third subfield 603, totaling 3+⅞ (OSC), are carried out, and the light intensity control of −3 for the fourth subfield 604 is carried out. As a result, light intensity is increased by the amount of ⅞ (OSC) for the entirety of the green frame.

Meanwhile, the frame of red shown in FIG. 42B exemplifies the case in which the light intensity controls of +1, +1 and 1+½ for first subfield 601 through third subfield 603, totaling 2+½, are carried out, and the light intensity control of −3 for the fourth subfield 604 is carried out. As a result, the light intensity control of −½ (OSC) is carried out for the entirety of the red frame.

As described above, the example of FIGS. 42A and 42B are configured to perform the light intensity controls in which the time widths of a time slot ts are different for the green frame and red frame.

These controls improve the gradation of an image by, for example, making a change in gray scale levels large for the green frame with which the sensitivity of the human eye is high, while making a change in gray scale levels small for colors with which the sensitivity of human eye is low, such as red and blue.

Figure 43:
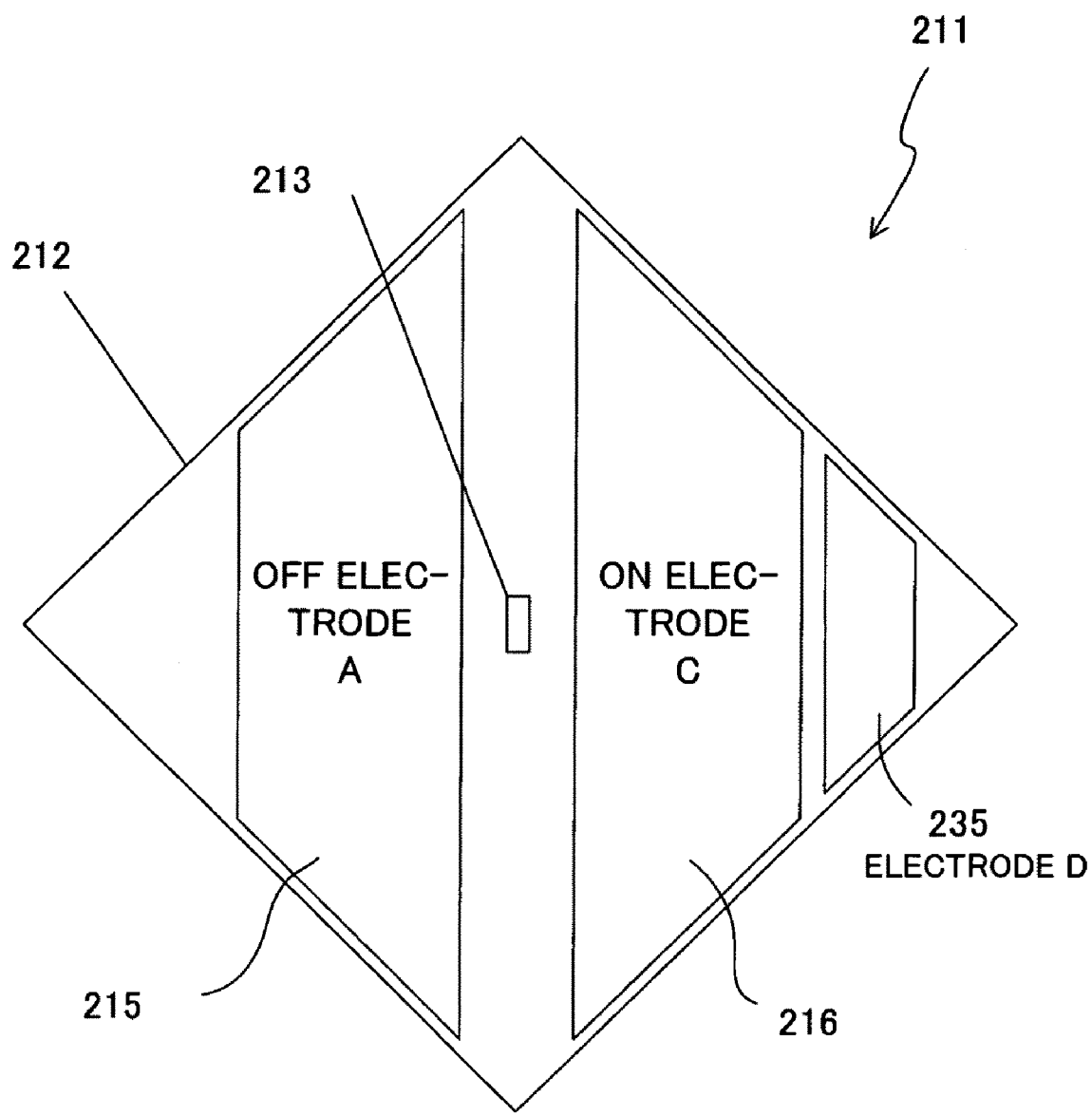
FIG. 43 is a top view diagram illustratively exemplifying the layout configuration of an electrode of the pixel unit shown in FIG. 24.

FIG. 43 is a top view diagram showing the layout configuration of an electrode of the pixel unit shown in FIG. 31C (i.e., FIG. 24).

As shown in FIG. 43, on the ON side of the pixel unit 211, the area size of the electrode C is larger than that of the electrode D.

Therefore, if the voltage Vc of the electrode C and the voltage Vd of the electrode D are the same, the Coulomb force Fc functioning between the electrode C and the mirror 212 is larger than the Coulomb force Fd functioning between the electrode D and the mirror 212.

Figure 44:
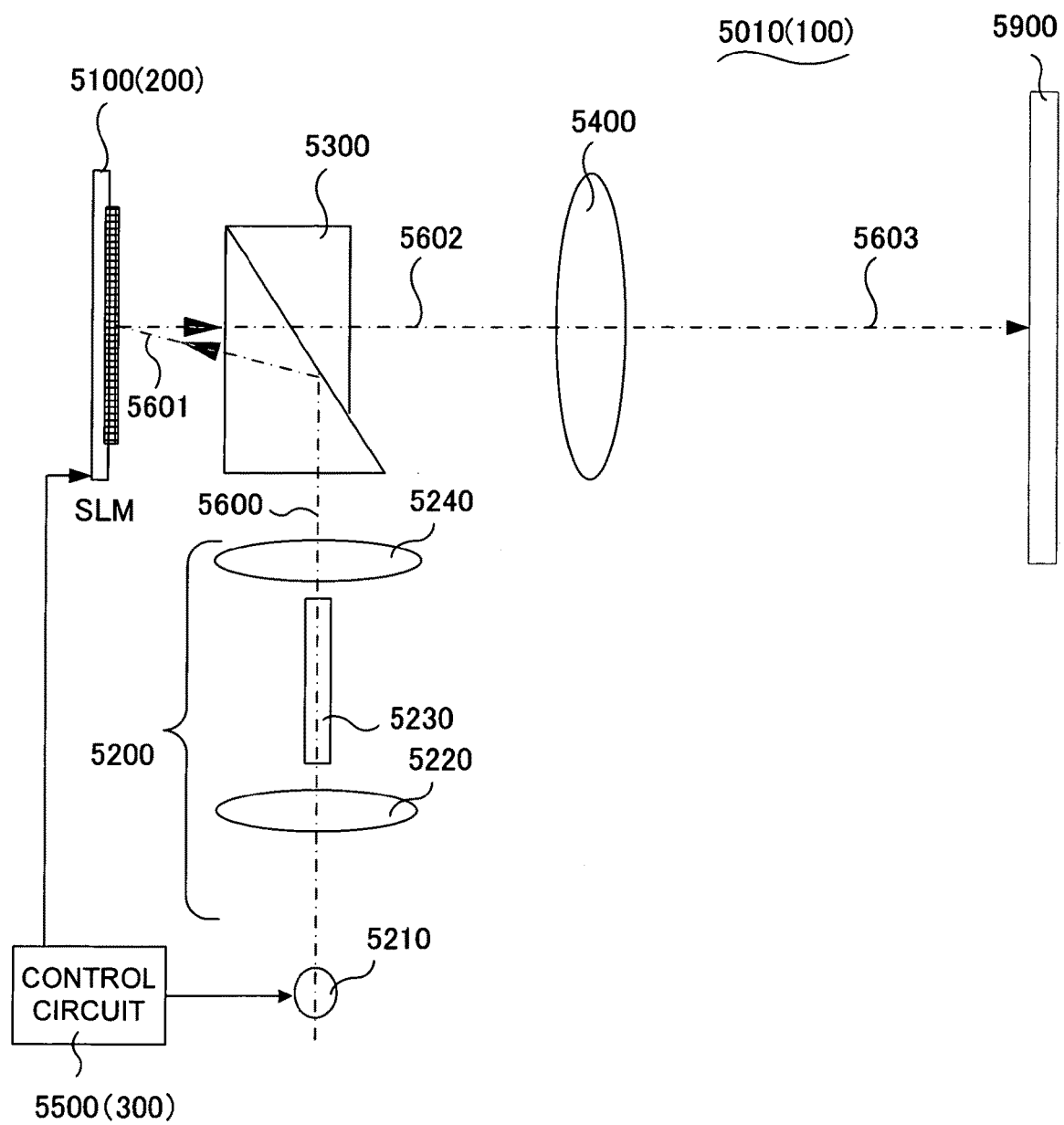
FIG. 44 is a functional block diagram showing the configuration of a projection apparatus according to a preferred embodiment of the present invention.

FIG. 44 is a conceptual diagram showing the configuration of a projection apparatus according to a preferred embodiment of the present invention.

The following is a description of an exemplary configuration of a projection apparatus 100 employing the spatial light modulator 200 and the control apparatus 300 that comprises the timing adjustment unit 240 shown in FIGS. 8, 16, 23, 26, 27 and 29, as a spatial light modulator 5100 and the control units 5500, 5502 and 5506.

As shown in FIG. 44, a projection apparatus 5010 according to the present embodiment comprises a single spatial light modulator (SLM) 5100 (i.e., the spatial light modulator 200), a control unit 5500 (i.e., the control apparatus 300), a Total Internal Reflection (TIR) prism 5300, a projection optical system 5400 and a light source optical system 5200.

The spatial light modulator 5100 is constituted by the above described spatial light modulator 200 comprising the plate line 232.

The projection apparatus 5010 is commonly referred to as a single-panel projection apparatus 5010 comprising a single spatial light modulator 5100.

The projection optical system 5400 is equipped with the spatial light modulator 5100 and TIR prism 5300 in the optical axis of the projection optical system 5400, and the light source optical system 5200, which is equipped in such a manner that the optical axis thereof matches that of the projection optical system 5400.

The TIR prism 5300 causes the illumination light 5600, incoming from the light source optical system 5200 placed onto the side, to enter the spatial light modulator 5100 at a prescribed inclination angle as incident light 5601 and causes a reflection light 5602, reflected by the spatial light modulators 100, to transmit to the projection optical system 5400.

The projection optical system 5400 projects the reflection light 5602 as projection light 5603 to a screen 5900.

The light source optical system 5200 comprises a variable light source 5210 for generating the illumination light 5600, a condenser lens 5220 for focusing the illumination light 5600, a rod type condenser body 5230, and a condenser lens 5240, all of which are sequentially placed in the aforementioned order in the optical axis of the illumination light 5600, which is emitted from the variable light source 5210 and incident to the side face of the TIR prism 5300.

The projection apparatus 5010 employs a single spatial light modulator 5100 for implementing a color display on the screen 5900 by means of a sequential color display method.

Specifically, the variable light source 5210, comprising a red laser light source 5211, a green laser light source 5212 and a blue laser light source 5213 (which are not shown in the drawing), allows independent controls for the light emission states and divides one frame of display data into a plurality of sub-fields (i.e., three sub-fields, that is, red (R), green (G) and blue (B) in the present case). It further causes each of the red 5211, green 5212 and blue 5213 laser light sources to emit each respective light in a time series at the time band corresponding to the sub-field of each color, as described later.

Figure 45:
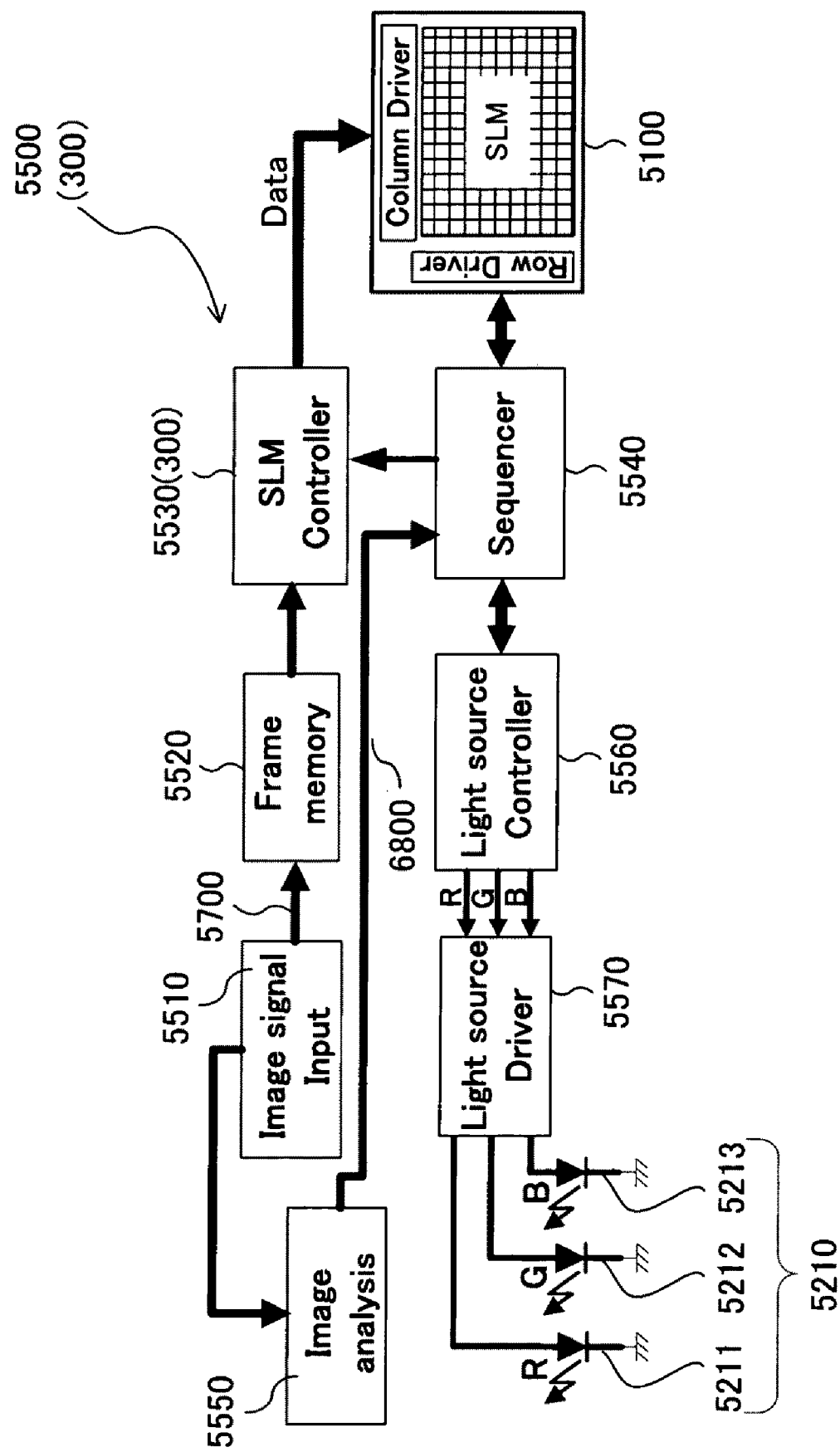
FIG. 45 is a functional block diagram showing an exemplary configuration of a control unit comprised in the projection apparatus shown in FIG. 44.

FIG. 45 is a functional block diagram for showing a configuration of the control unit 5500 implemented in the above described single-panel projection apparatus 5010. The control unit 5500 comprises a frame memory 5520, an SLM controller 5530, a sequencer 5540, a light source control unit 5560 and a light source drive circuit 5570.

The sequencer 5540, includes a microprocessor to control the operation timing of the entire control unit 5500 and the spatial light modulators 5100.

In one exemplary embodiment, the frame memory 5520 retains one frame of input digital video data 5700 received from an external device (not shown in the figure) connected to a video signal input unit 5510. The input digital video data 5700 is updated in real time whenever the display of one frame is completed.

The SLM controller 5530 processes the input digital video data 5700 read from the frame memory 5520, as described later. The SLM controller separates the data, read from the memory 5520, into a plurality of sub-fields according to detailed descriptions below. The SLM controller outputs the data subdivided into subfields to the spatial light modulators 5100 as binary data 5704 and non-binary data 5705, which are used for implementing an the ON/OFF control and oscillation control (which are described later) of a mirror 5112 of the spatial light modulator 5100.

The sequencer 5540 outputs a timing signal to the spatial light modulators 5100 in sync with the generation of the binary data 5704 and non-binary data 5705 at the SLM controller 5530.

The video image analysis unit 5550 outputs a image analysis signal 5800 used for generating various light source pulse patterns (which are described later) corresponding to the input digital video data 5700 inputted from the video signal input unit 5510.

The light source control unit 5560 controls, by way of the light source drive circuit 5570, the operation of the variable light source 5210 emitting the illumination light 5600 on the basis of the video image analysis signal 6800 obtained from the video image analysis unit 5550, by way of the sequencer 5540.

The light source drive circuit 5570 drives the red laser light source 5211, green laser light source 5212 and blue laser light source 5213 of the variable light source 5210 to emit light on the basis of instruction from the light source control unit 5560.

Figure 46:
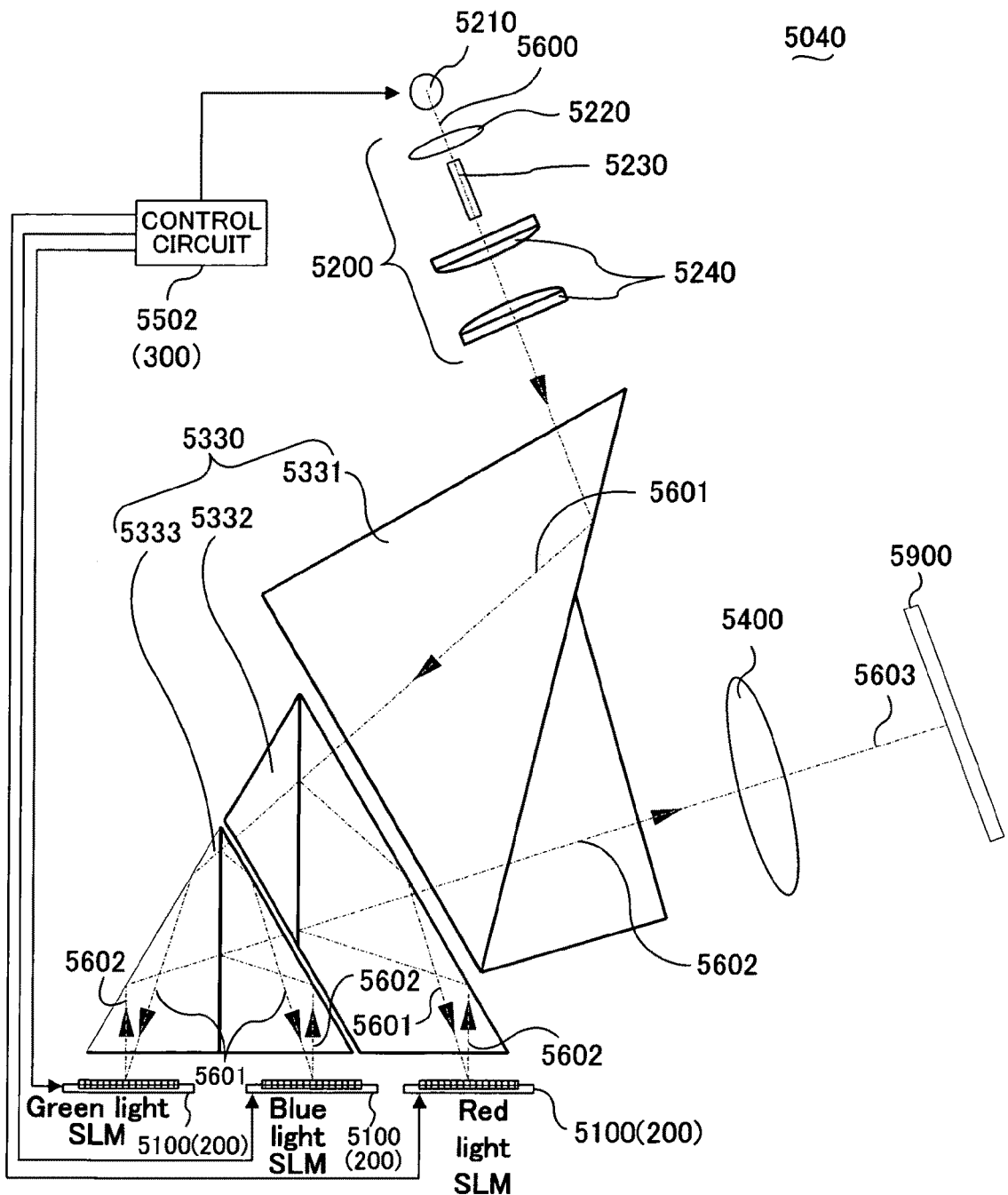
FIG. 46 is a functional block diagram showing a yet another exemplary modification of a multi-panel projection apparatus according to a preferred embodiment of the present invention.

FIG. 46 is a conceptual diagram showing another exemplary modification of a multi-panel projection apparatus according to the present embodiment.

The projection apparatus 5040 is configured to position, so as to be adjacent to one another in the same plane, a plurality of spatial light modulators 5100 (i.e., the spatial light modulators 200) corresponding to the three colors R, G and B on one side of a light separation/synthesis optical system 5330.

This configuration makes it possible to consolidate a plurality of spatial light modulators 5100 into the same packaging unit, for example, a package 201, thereby saving space.

The light separation/synthesis optical system 5330 comprises a TIR prism 5331, a TIR prism 5332 and a TIR prism 5333.

The TIR prism 5331 has the function of guiding illumination light 5600, incident in the lateral direction of the optical axis of the projection optical system 5400, to the spatial light modulators 5100 as incident light 5601.

The TIR prism 5332 has the functions of separating red light from the incident light 5601 and guiding it to the red color-use spatial light modulator 5100 and also of capturing the reflection light 5602 of the separated incident light and guiding it to the projection optical system 5400.

Likewise, the TIR prism 5333 has the functions of separating the incident green and blue lights from the incident light 5601, making them incident to the individual spatial light modulators 5100 equipped correspondently to the each color, and of capturing the reflection lights 5602 of the respective colors to guide them to the projection optical system 5400.

Figure 47:
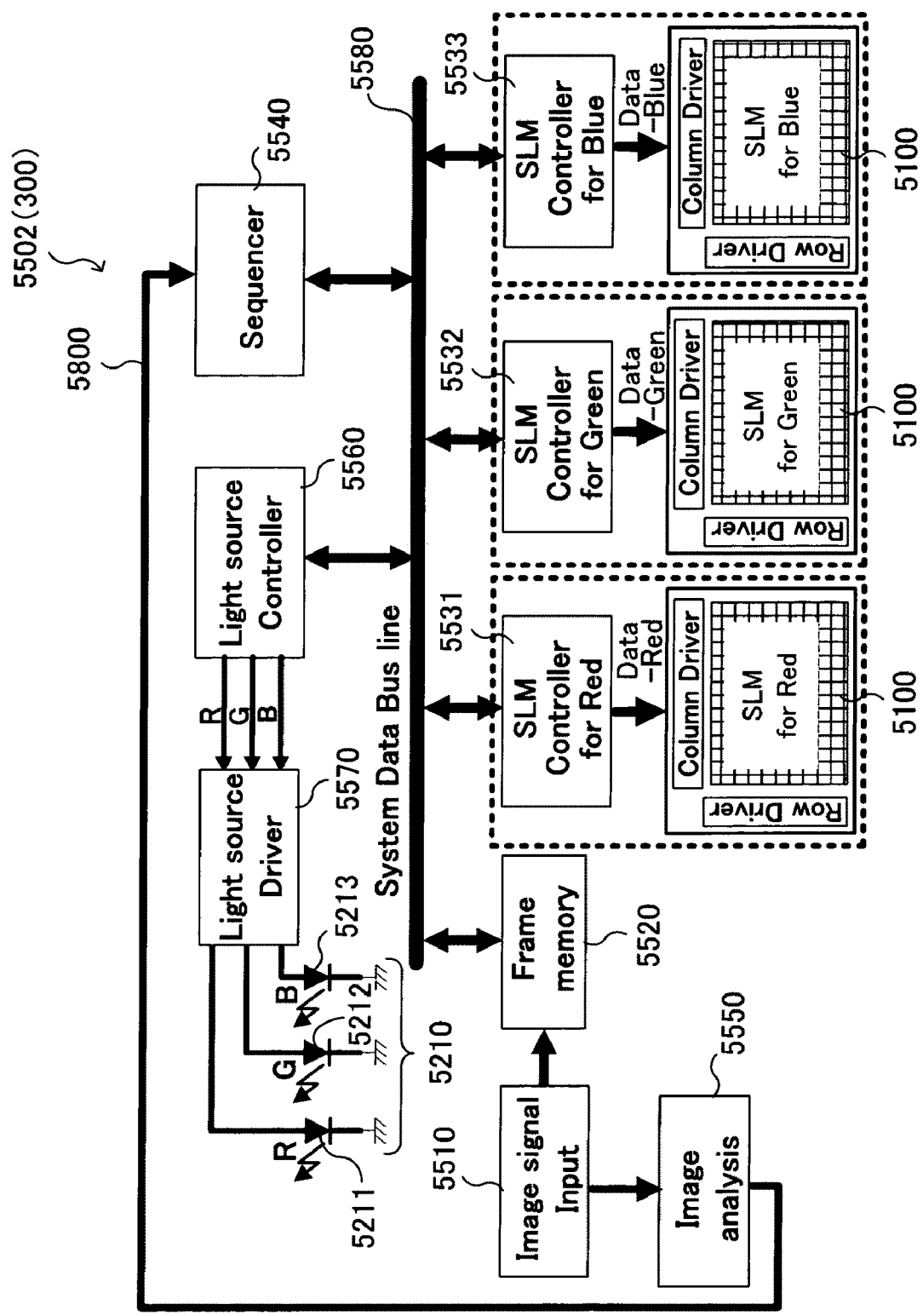
FIG. 47 is a functional block diagram showing an exemplary configuration of the control unit of a multi-panel projection apparatus according to a preferred embodiment of the present invention.

FIG. 47 is a block diagram showing an exemplary configuration of the control unit of a multi-panel projection apparatus according to the present embodiment.

The control unit 5502 comprises a plurality of SLM controllers 5531, 5532 and 5533 used for controlling each of the spatial light modulators 5100 equipped for the respective colors R, G and B, and the configuration of the controllers is the main difference from the above described control unit 5500.

Specifically, each of the SLM controller 5531, SLM controller 5532 and SLM controller 5533, is implemented to process the modulation of a specific color, Red, Green, and Blue. Each modulator is supported on the same substrate as those of the other spatial light modulators 5100. This configuration makes it possible to place the individual spatial light modulators 5100 and the corresponding SLM controller 5531, SLM controller 5532 and SLM controller 5533 close to each other, thereby enabling a high speed data transfer rate.

Further, a system bus 5580 is used to connect the frame memory 5520, light source control unit 5560, sequencer 5540 and SLM controllers 5531 through 5533, in order to speed up and simplify the connection path of each connecting element.

Figure 48:
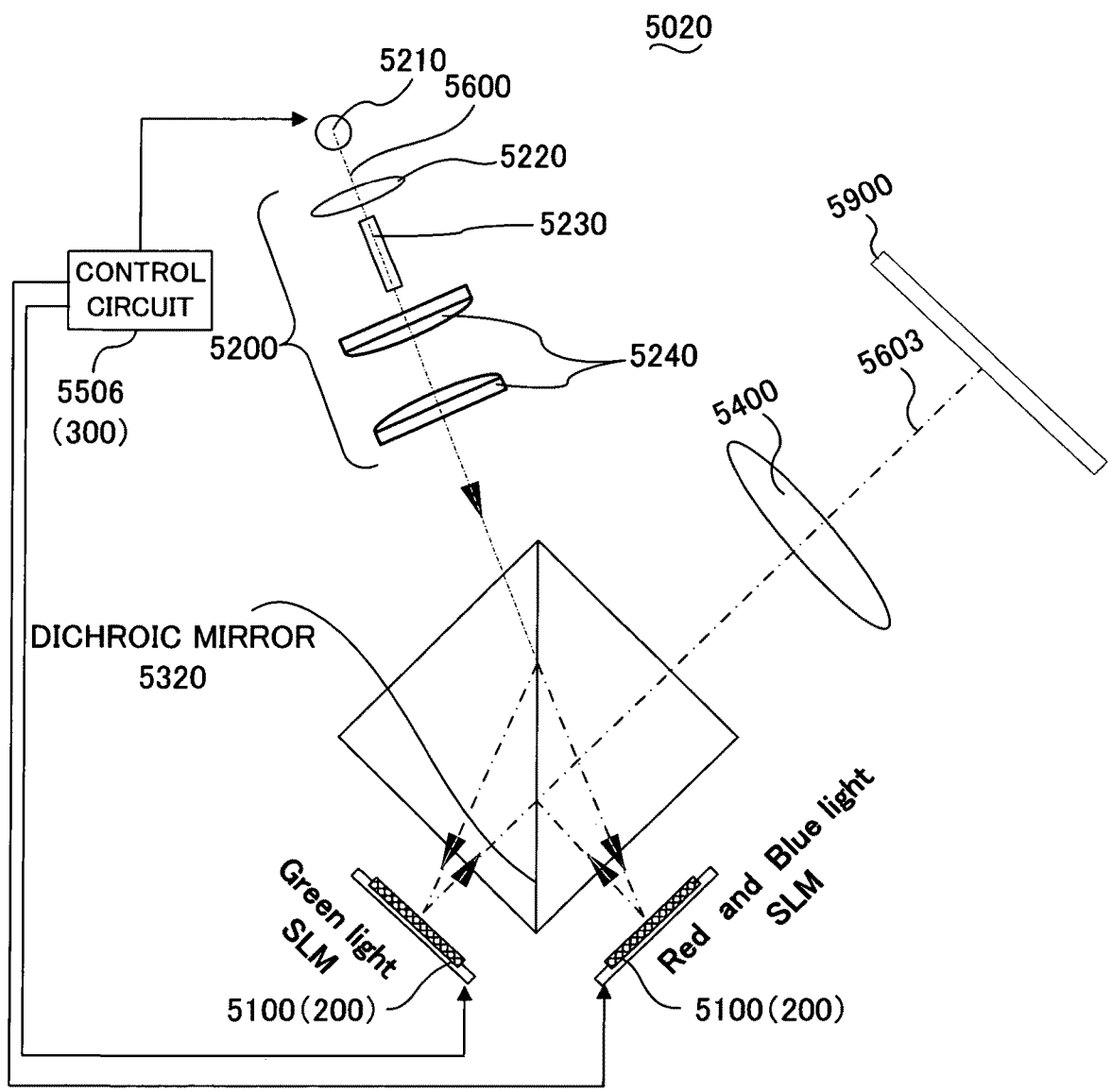
FIG. 48 is a functional block diagram showing an exemplary modification of a multi-panel projection apparatus according to another preferred embodiment of the present invention.

FIG. 48 is a conceptual diagram showing an exemplary modification of a multi-panel projection apparatus according to another preferred embodiment of the present invention.

An exemplary case of the projection apparatus 5020 shown in FIG. 48 is equipped with two spatial light modulators 5100

(i.e., the spatial light modulators 200), each of which comprises the above described plate line 232. One spatial light modulator 200 modulates the green light, while the other spatial light modulator 200 modulates the red and blue lights.

The projection apparatus 5020 comprises a dichroic mirror 5320 as a light separation/synthesis optical system. The dichroic mirror 5320 separates the wavelength component of green light and the wavelength components of red and blue lights from the incident light 5601 from the light source optical system 5200, causing them to branch into the two spatial light modulators 200, respectively. The dichroic mirror 5320 further synthesizes the reflection lights 5602 of the green light with the reflection lights of the red and blue light, each reflected (i.e., modulated) by the corresponding spatial light modulators 200, to guide the synthesized light to the optical axis of the projection optical system 5400, which projects the synthesized light onto a screen 5900 as projection light 5603.

Figure 49:
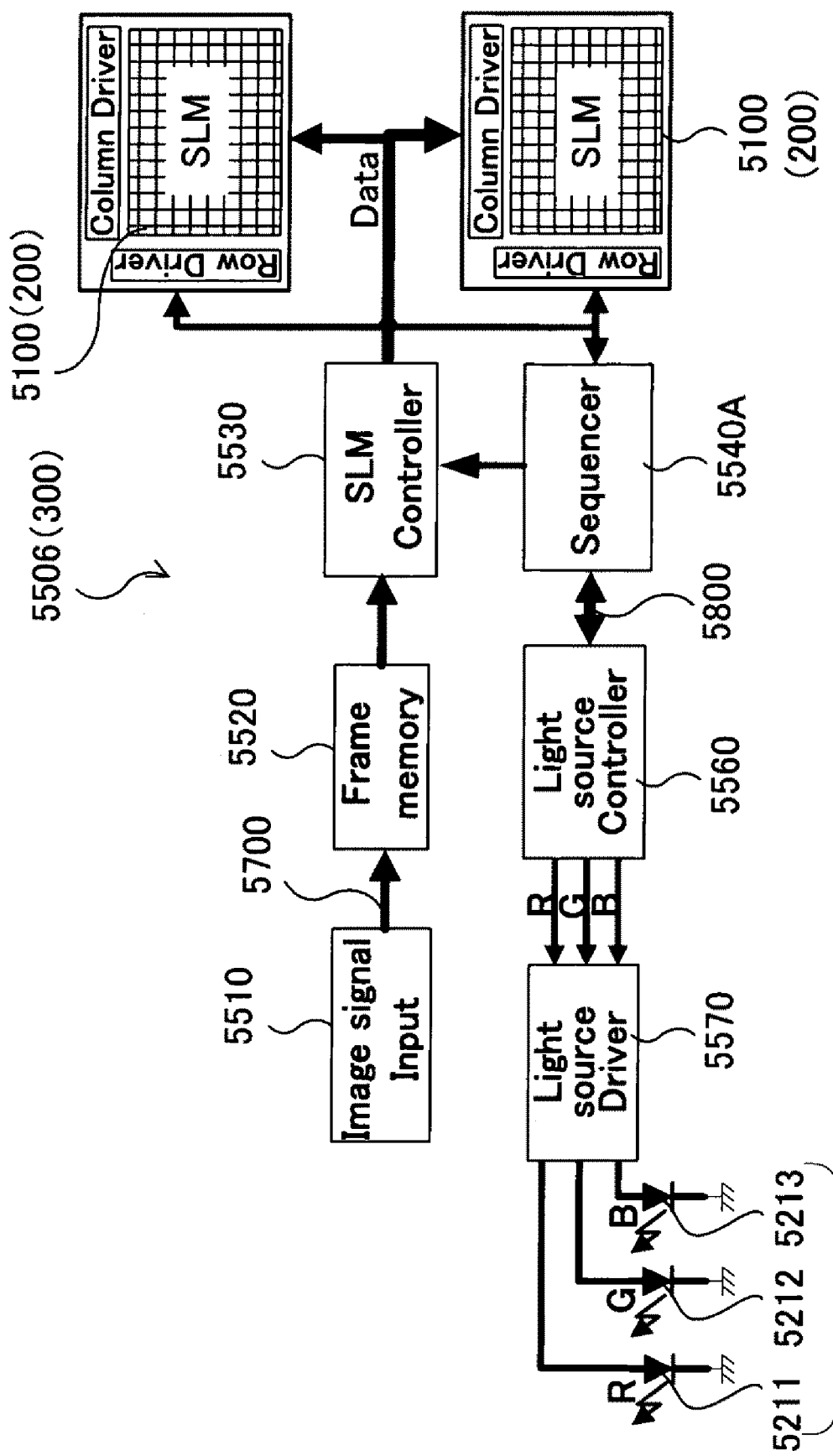
FIG. 49 is a functional block diagram showing an exemplary configuration of the control unit comprised in the projection apparatus shown in FIG. 48.

FIG. 49 is a functional block diagram showing an exemplary configuration of a control unit 5506 equipped in the projection apparatus 5020 comprising the above described two spatial light modulators 200. In this case, the SLM controller 5530 controls two spatial light modulators 5100 (i.e., the spatial light modulators 200), which is the only difference from the configuration shown in FIG. 45.

Figure 50:
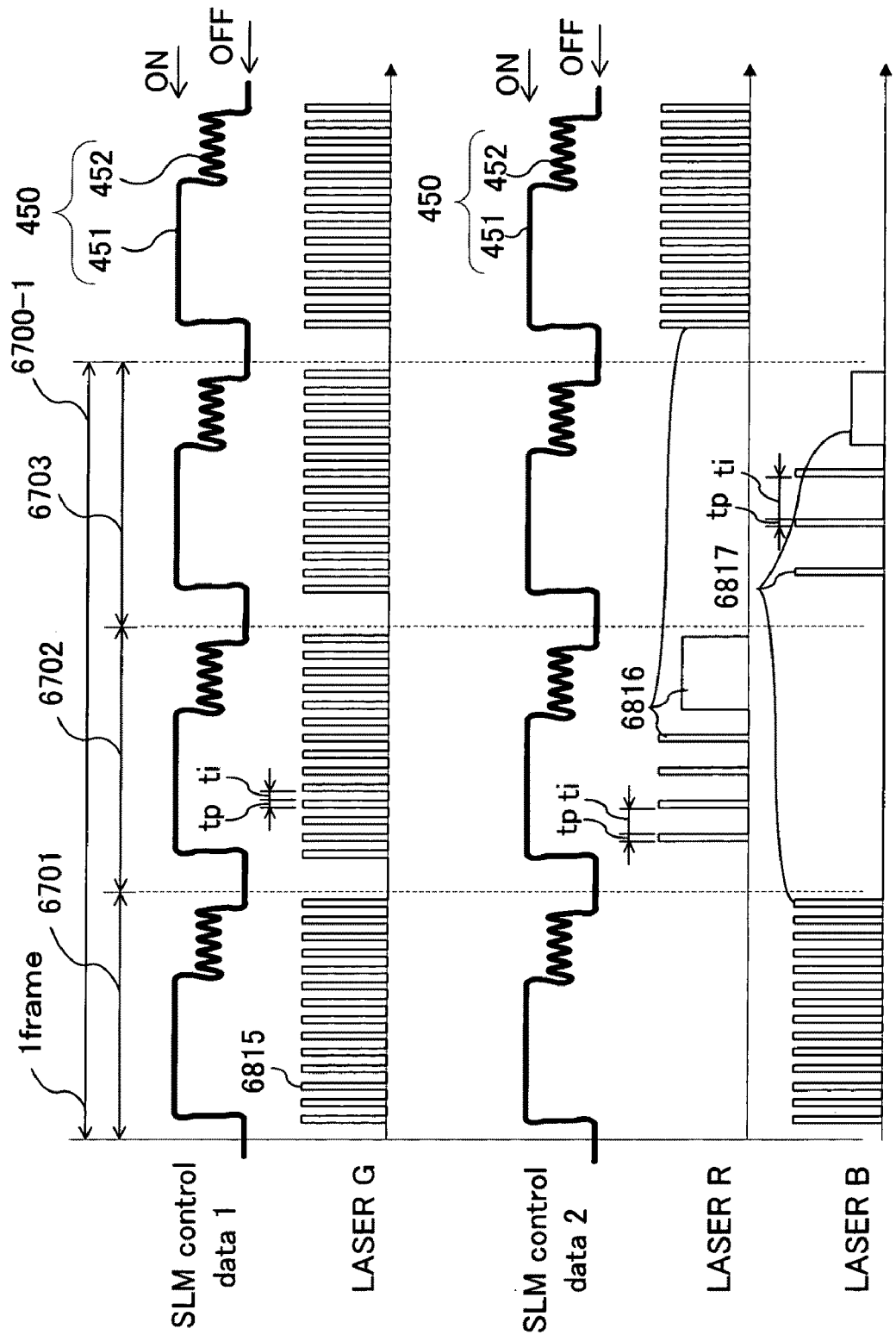
FIG. 50 is a timing diagram showing the waveform of a control signal in the projection apparatus shown in FIG. 48.

FIG. 50 is a chart showing the waveform of a control signal of the projection apparatus according to the present embodiment.

A drive signal (i.e., a mirror control profile 450 shown in FIG. 50) generated by the SLM controller 5530 drives a plurality of spatial light modulators 5100.

The light source control unit 5560 generates a light source profile control signal 5800 corresponding to the mirror control profile 450, a signal for driving an individual spatial light modulators 5100, and inputs the generated signal to the light source drive circuit 5570, which then adjusts the intensity of the laser light (i.e., the illumination light 5600) emitted from each of the red 5211, green 5212 and blue 5213 laser light source.

The control unit 5506 comprised in the projection apparatus 5020 is configured such that a single SLM controller 5530 drives the plurality of spatial light modulators 5100, thereby enabling the irradiation of the illumination light 5600 on the respective spatial light modulators 5100 with the optimal intensity of light without the need to comprise a light source control unit 5560 or light source drive circuit 5570 for each spatial light modulator 5100. This configuration simplifies the circuit configuration of the control unit 5506.

As shown in FIG. 50, the light source control unit 5560 and light source drive circuit 5570 drives the red 5211, green 5212 and blue 5213 laser light source so as to adjust the intensities of individual lasers (i.e., illumination light 5600) of the colors R, G and B in synch with the respective SLM drive signals (i.e., the mirror control profile 450) that is generated by the SLM controller 5530.

In this case, two colors R and B share one spatial light modulator 5100, and therefore, the control is a color sequential method.

Specifically, one frame is constituted by a plurality of subfields, that is, subfields 6701, 6702 and 6703, and the same light source pulse pattern 6815 is repeated in each subfield in one spatial light modulator 5100 corresponding to green (G). Meanwhile, for the red (R) and blue (B) lights that share one spatial light modulator 5100, the pulse emission of the red laser light source 5211 and blue laser light source 5213 are respectively controlled so that the subfields, that is, subfields 6701 through 6703, are alternately used in a time series as indicated by the light source pulse pattern 6816 and light source pulse pattern 6817.

Further, in this case, the emission pulse intervals ti and emission pulse widths tp can be changed in each of the light source pulse pattern 6815 of the green laser, the light source pulse pattern 6816 of the red laser, and the light source pulse pattern 6817 of the blue laser.

The present embodiment makes it possible to improve the number of gray scale levels for each of the colors R, G and B. Combined with the above described method of mirror control achieving a higher number of gray scale levels, it is possible to attain an extremely high grade gray scale up to 12-bit, 14-bit, 16-bit, 18-bit and higher without a need to change a low image transfer rate likewise the conventional 6- to 8-bit. Furthermore, the capability makes it possible to set for a free grayscale characteristic.

The present invention makes it possible to provide a technique enabling the implementation of a higher-grade of gray scale of a display image in a technique for displaying an image employing a spatial light modulation technique without increasing the size of a control circuit for controlling a spatial light modulator.

The present invention may be modified or changed in various manners possible within the spirit and scope of the present invention and is not limited to the configurations put forth in the above described embodiments.

More specifically, the present invention may include embodiments in various manners possible and would be within the scope of the present invention. Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A spatial light modulator, comprising:
    a plurality of pixel elements wherein each of the pixel elements comprises at least a switching element;
    a plurality of control lines connected to at least one of the switching elements; and
    a controller for generating and transmitting a control signal through the control line for controlling the switching element, wherein
    the controller starts transmitting the control signal to a first switching element through a first control line before the control signal applied to a second switching element through a second control line is turned off at a low voltage level.

2. The spatial light modulator according to claim 1, wherein:
    the controller controls the low voltage level substantially at a threshold voltage for operating the switching element.

3. The spatial light modulator according to claim 1, wherein:
    the controller generates the output signals for transmitting therefrom with an interval less than or equal to 20 nanoseconds.

4. The spatial light modulator according to claim 1, further comprising:
    a timing adjuster for adjusting an interval of the control signals output from the controller to the control line in order to control the switching element of the pixel elements.

5. The spatial light modulator according to claim 4, further comprising:
a detector for detecting a result of adjustment amount of the switching elements; and
the timing adjuster further receives and applies the result of adjustment amount from the detector to automatically adjust the interval of the control signals.

6. The spatial light modulator according to claim 4, wherein:
The timing adjuster further receives and applies a signal representing a temperature of the spatial light modulator to adjust the interval of the control signals.

7. The spatial light modulator according to claim 4, wherein:
the timing adjuster further receives and applies a signal representing a number of gray scale levels of the spatial light modulator to adjust the interval of the control signals.

8. The spatial light modulator according to claim 4, further comprising:
a second control line for transmitting control signals to control the pixel element independently from the control signals transmitted on the plurality of control lines, and
a second unit of the controller for generating and transmitting a second control signal to the second control line, wherein the timing adjuster further adjusts the interval of the second control transmitted from the second unit of the controller.

9. The spatial light modulator according to claim 4, further comprising:
a data setup circuit for setting data to the pixel element through the switching element, wherein the timing adjuster further adjusts the interval of operations between setting data to the pixel element.

10. The spatial light modulator according to claim 4, wherein:
the timing adjuster further applies a number of the control lines connected to the switching elements to adjust the interval of the control signals.

11. The spatial light modulator according to claim 1, further comprising:
a data setup circuit for transmitting data to a plurality of control units of the controller and to the pixel element through the switching element.

12. The spatial light modulator according to claim 1, wherein:
the controller comprises at least two control units, wherein at least two control units are connected to a same control line.

13. The spatial light modulator according to claim 1, wherein:
the controller further comprises at least two control units, wherein the control units are placed on an upper and a lower sides surrounding the spatial light modulator, or surrounding a left and a right sides of the spatial light modulator to sandwich a region for placement of the plurality of pixel elements.

14. The spatial light modulator according to claim 1, wherein:
the controller further comprises at least two control units, and
a plurality of the control units further comprise a data setup circuit for setting data to the pixel element through the switching element.

15. The spatial light modulator according to claim 1, wherein:
the controller starts to transmit the control signal to the first switching element through the first control line before the control signal applied to the second switching element through the second control line is turned off at a low voltage level during a time slot for a grayscale representation of a least significant bit (LSB) in applying a pulse width modulation to control the spatial light modulator for displaying an image with gray scales represented by a data comprising several bits.

16. The spatial light modulator according to claim 1, wherein:
the pixel elements arranged as a pixel array comprising more than 921,600 pixel elements.

17. The spatial light modulator according to claim 1, further comprising:
a plurality of the control lines connected to and transmitting signals to control pixel elements extended along a horizontal direction of the spatial light modulator.

18. The spatial light modulator according to claim 1 further comprising:
a digital micromirror device (DMD).

19. The spatial light modulator according to claim 1, further comprising:
a plurality of data setup lines connected to at least one of the switching elements, and
a data setup circuit comprises a plurality of setup units for setting data to the switching element through the data setup line, wherein the setup units are connected is sequentially connected according to an order of each control line connected to the controller for sequentially receiving a data setup timing clock signal from the controller.

20. The spatial light modulator according to claim 1, further comprising:
a plurality of data setup lines connected to at least one of the switching elements, and
a data setup circuit comprises a plurality of setup units for setting data to the switching element through the data setup line, wherein of the setup units drive the data setup lines sequentially according to an order of each control line connected to the controller.

* * * * *